(12) United States Patent
Utsuki et al.

(10) Patent No.: US 8,694,139 B2
(45) Date of Patent: Apr. 8, 2014

(54) INFORMATION PROCESSING APPARATUS, INFORMATION PROCESSING METHOD, INFORMATION PROCESSING SYSTEM, AND INFORMATION PROCESSING PROGRAM

(75) Inventors: Shingo Utsuki, Kanagawa (JP); Manabu Fujiki, Tokyo (JP); Hiroshi Sato, Kanagawa (JP); Junichi Nagahara, Tokyo (JP)

(73) Assignee: Sony Corporation (JP)

( * ) Notice: Subject to any disclaimer, the term of this patent is extended or adjusted under 35 U.S.C. 154(b) by 716 days.

(21) Appl. No.: 12/587,125

(22) Filed: Oct. 1, 2009

(65) Prior Publication Data

US 2010/0088345 A1  Apr. 8, 2010

(30) Foreign Application Priority Data

Oct. 3, 2008  (JP) ................ P2008-258887

(51) Int. Cl.
*G06F 17/00* (2006.01)
(52) U.S. Cl.
USPC .............. 700/94; 715/716; 715/727; 715/729
(58) Field of Classification Search
USPC .............................. 700/94; 715/727, 729, 716
See application file for complete search history.

(56) References Cited

U.S. PATENT DOCUMENTS

| 2006/0095848 | A1* | 5/2006 | Naik | 715/716 |
|---|---|---|---|---|
| 2006/0176275 | A1* | 8/2006 | Delattre | 345/163 |
| 2007/0006717 | A1* | 1/2007 | Myeong et al. | 84/612 |
| 2007/0033202 | A1* | 2/2007 | Casto | 707/100 |
| 2008/0154941 | A1* | 6/2008 | Park | 707/102 |
| 2009/0013254 | A1* | 1/2009 | Walker et al. | 715/727 |

FOREIGN PATENT DOCUMENTS

| JP | 2002-093142 A | 3/2002 |
|---|---|---|
| JP | 2003-084902 A | 3/2003 |
| JP | 2004-046645 A | 2/2004 |
| JP | 2005078762 A | 3/2005 |
| JP | 2007-035150 A | 2/2007 |
| JP | 2007133949 A | 5/2007 |
| JP | 2007164297 A | 6/2007 |
| JP | 2007164932 A | 6/2007 |
| JP | 2007-280461 A | 10/2007 |
| JP | 2007294068 A | 11/2007 |
| JP | 2008047173 A | 2/2008 |
| JP | 2008071228 A | 3/2008 |
| JP | 2008071419 A | 3/2008 |
| JP | 2008102413 A | 5/2008 |
| JP | 2008159165 A | 7/2008 |
| WO | 2005122199 A1 | 12/2005 |
| WO | 2007116633 A1 | 10/2007 |

\* cited by examiner

*Primary Examiner* — Paul McCord
(74) *Attorney, Agent, or Firm* — Lerner, David, Littenberg, Krumholz & Mentlik, LLP

(57) ABSTRACT

An information processing apparatus includes: a storage unit storing content data and first group identification information for identifying first groups in which the content data are arranged in a predetermined unit; a parameter output unit outputting a parameter representing an amount of displacement of an operating object in response to an operation on the operating object which can be displaced in a predetermined range by a user's operation; a selection unit sequentially selecting the content data while the parameter is in a first range and sequentially selecting the first groups by sequentially selecting the first group identification information stored in the storage unit while the parameter is a value in a second range; and a notification unit notifying what content data is selected when the content data are selected by the selection unit and notifying what group is selected when the first groups are selected by the selection unit.

15 Claims, 40 Drawing Sheets

CONFIGURATION OF INFORMATION PROCESSING APPARATUS AND INFORMATION PROCESSING SYSTEM WHICH ARE OUTLINE OF FIRST EMBODIMENT

OUTER CONFIGURATION OF PORTABLE PLAYBACK APPARATUS

CONFIGURATION OF RELEVANT INFORMATION DATABASE

SELECTION TARGETS IN SEARCH MODES

PLAYBACK CONTROL (1) IN SOUND SEARCH MODE

PLAYBACK CONTROL (7) IN SOUND SEARCH MODE

PLAYBACK CONTROL (9) IN SOUND SEARCH MODE

PLAYBACK CONTROL (10) IN SOUND SEARCH MODE

OUTER CONFIGURATION OF PORTABLE PLAYBACK
APPARATUS ACCORDING TO SECOND EMBODIMENT

SELECTION PROCESS FLOW ACCORDING TO SECOND EMBODIMENT

HARDWARE CONFIGURATION (1) OF PORTABLE PLAYBACK
APPARATUS ACCORDING TO THIRD EMBODIMENT

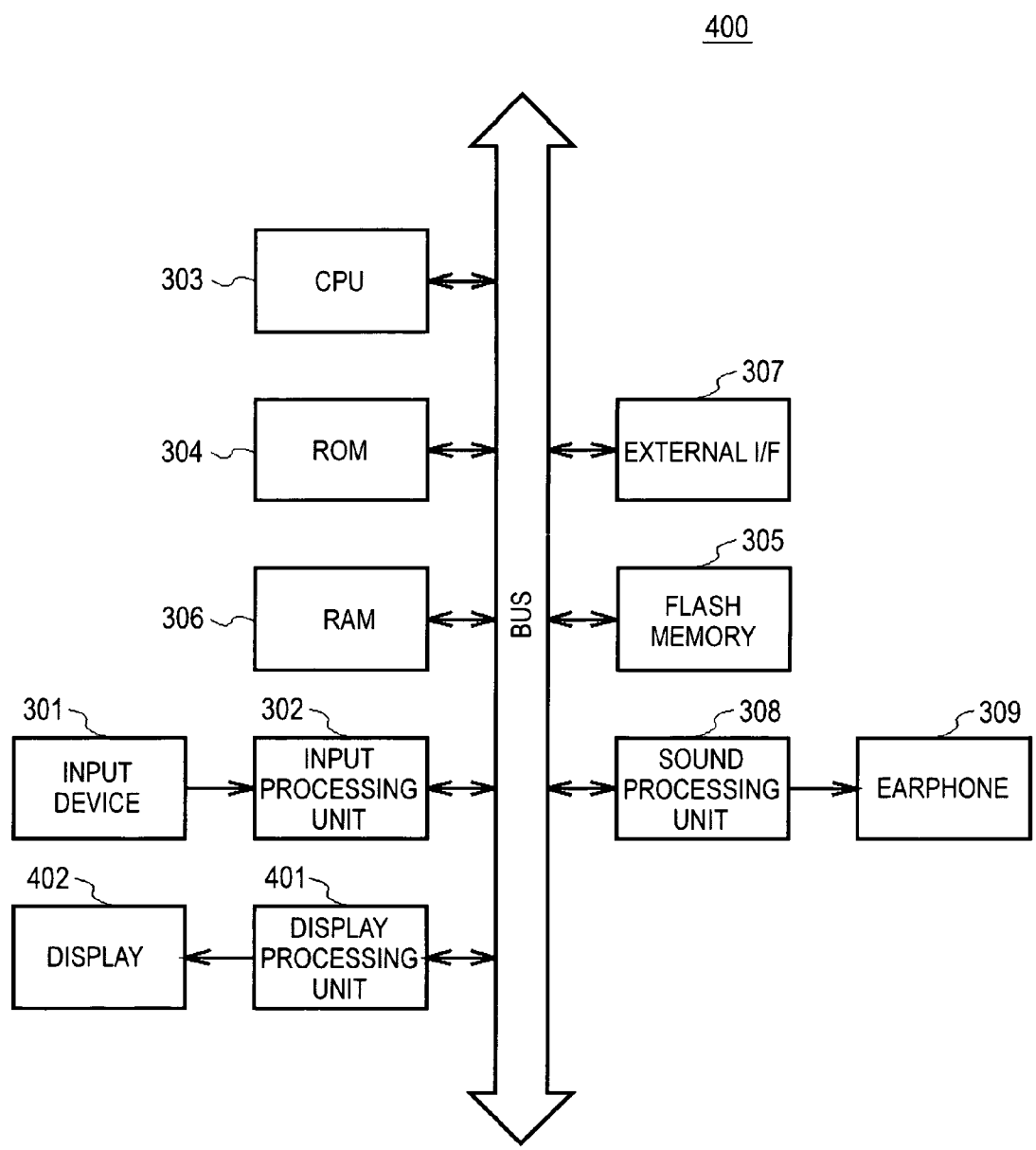

OUTER CONFIGURATION OF PORTABLE IMAGE DISPLAY
APPARATUS ACCORDING TO FOURTH EMBODIMENT

INNER CONFIGURATION OF PORTABLE IMAGE DISPLAY
APPARATUS ACCORDING TO FOURTH EMBODIMENT

CONFIGURATION OF RELEVANT INFORMATION DATABASE
ACCORDING TO FOURTH EMBODIMENT

CONFIGURATION (1) OF GUI PICTURE

CONFIGURATION (2) OF GUI PICTURE

CONFIGURATION (3) OF GUI PICTURE

CONFIGURATION (4) OF GUI PICTURE

CONFIGURATION (5) OF GUI PICTURE

HARDWARE CONFIGURATION OF PORTABLE IMAGE DISPLAY APPARATUS ACCORDING TO FIFTH EMBODIMENT

SYSTEM CONFIGURATION OF PLAYBACK SYSTEM
ACCORDING TO ANOTHER EMBODIMENT

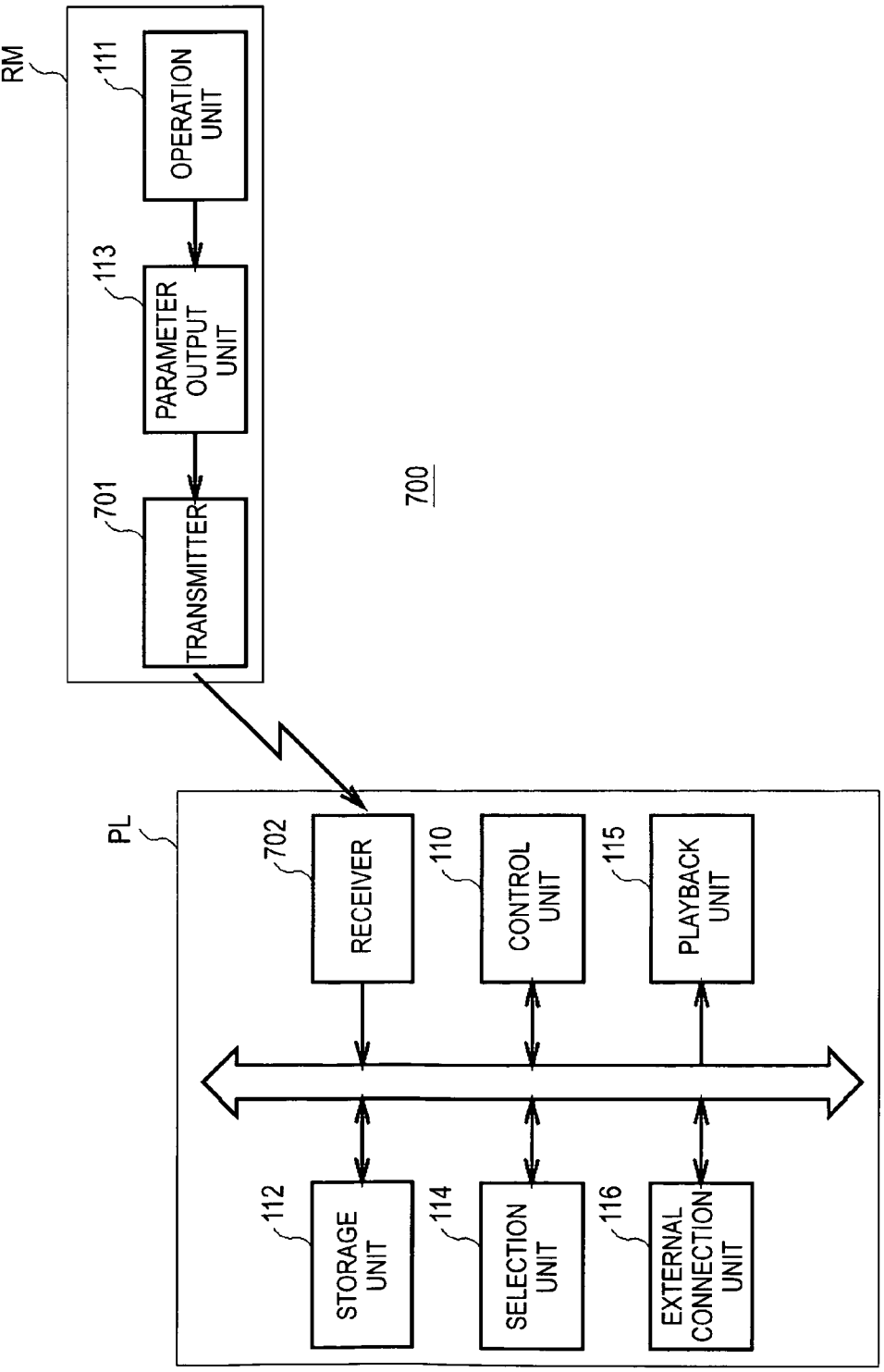

PLAYBACK CONTROL ACCORDING TO ANOTHER EMBODIMENT

OUTER CONFIGURATION OF PORTABLE PLAYBACK
APPARATUS ACCORDING TO ANOTHER EMBODIMENT

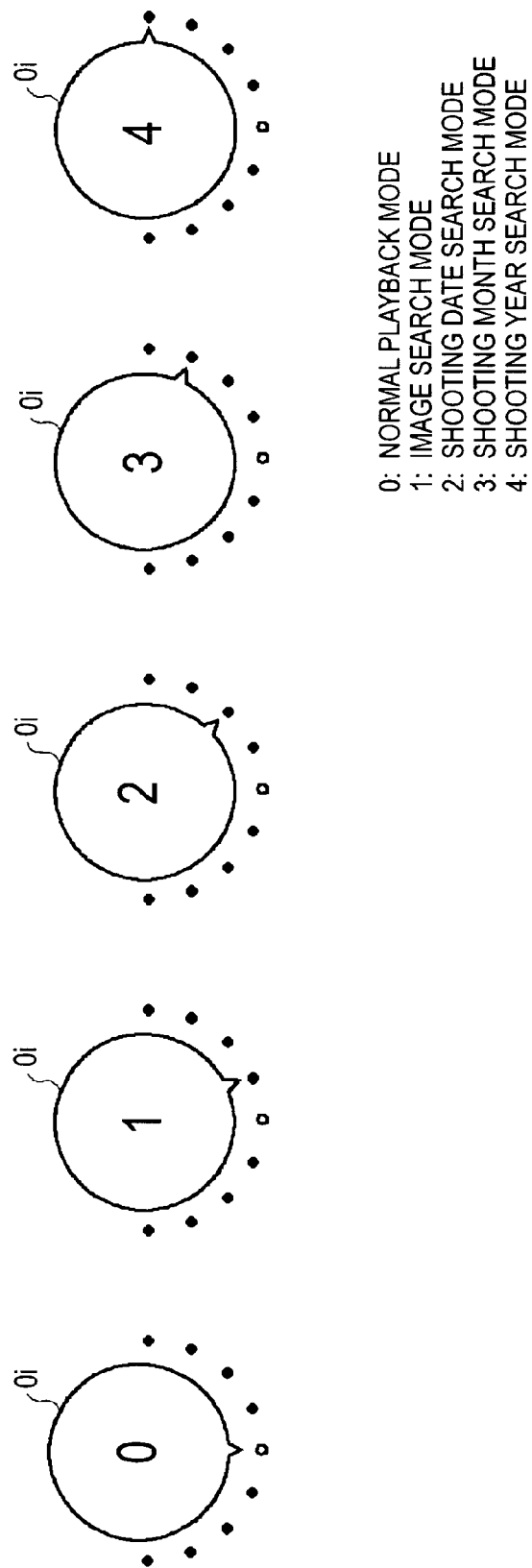
FIG.40 DISPLAY EXAMPLE OF KNOB ICON ACCORDING TO ANOTHER EMBODIMENT
0: NORMAL PLAYBACK MODE
1: IMAGE SEARCH MODE
2: SHOOTING DATE SEARCH MODE
3: SHOOTING MONTH SEARCH MODE
4: SHOOTING YEAR SEARCH MODE

INFORMATION PROCESSING APPARATUS, INFORMATION PROCESSING METHOD, INFORMATION PROCESSING SYSTEM, AND INFORMATION PROCESSING PROGRAM

CROSS-REFERENCE TO RELATED APPLICATION

The present application claims priority from Japanese Patent Application No. JP 2008-258887 filed in the Japanese Patent Office on Oct.3, 2008, the entire content of which is incorporated herein by reference.

BACKGROUND OF THE INVENTION

1. Field of the Invention

The present invention relates to an information processing apparatus, an information processing method, an information processing system, and an information processing program and is suitably used, for example, to search for content data.

2. Related Art

In recent years, record players being equipped with a recording medium such as a hard disk or a flash memory to play back content data stored in a recording medium were widely spread. In such a type of record player, the amount of recordable content data drastically increased with the increase in size of the recording medium and the advancement of data compressing techniques.

Actually, a record player equipped with a flash memory having a memory capacity of several giga bytes can store several hundreds to several thousands of songs of music data, with each song being several mega bytes in size.

As the amount of content data which can be stored in the record player increases, it is more difficult for a user to search for desired content data, thereby deteriorating the searching ability.

Therefore, in the known record player, for example, searching for desired content data is made easy by classifying the content data into plural groups depending on attributes thereof and switching a search range to search for a group and then to search for content data in the group.

In addition, the music data attributes include genres, album titles, and artists' names, for example.

As an operation device for performing a search operation while switching the search range, an operation device having a rotational operation unit capable of being pushed in and rotated was suggested (for example, see JP-A-2007-35150).

In this operation device, the search range can be switched by performing a pushing operation on the rotational operation unit and the searching operation can be carried out in the switched search range by performing a rotating operation on the rotational operation unit.

SUMMARY OF THE INVENTION

In the above-mentioned operation device, the switching of the search range and the searching operation in the switched search range need to be carried out by separate operations. Accordingly, when the switching and the search can be carried out by a single operation, it can be thought that it is possible to more easily allow a user to search for desired content data.

It is desirable to provide an information processing apparatus, an information processing method, an information processing program, and an information processing system, which can search for desired content data more easily than in the past.

According to an embodiment of the invention, there is provided an information processing apparatus including: a storage unit storing content data and first group identification information for identifying first groups in which the content data are arranged in a predetermined unit; a parameter output unit outputting a parameter representing an amount of displacement of an operating object in response to an operation on the operating object which can be displaced in a predetermined range by a user's operation; a selection unit sequentially selecting the content data stored in the storage unit while the parameter output from the parameter output unit is in a first range and sequentially selecting the first groups by sequentially selecting the first group identification information stored in the storage unit while the parameter is a value in a second range; and a notification unit notifying what content data is selected when the content data are selected by the selection unit and notifying what group is selected when the first groups are selected by the selection unit.

In this way, the content data are sequentially selected when the parameter, which represents the amount of displacement of the operating object, output in response to the operation on the operating object which can be displaced in a predetermined range by a user's operation is in the first range, the groups of the content data are sequentially selected when the parameter is a value in the second range, the selected content data is notified when the content data are selected, and the selected group is notified when the groups are selected.

According to another embodiment of the invention, there is provided an information processing system having an operation device and an information processing apparatus. The operation device includes an operation unit which can be displaced in a predetermined range by a user's operation, a parameter output unit outputting a parameter representing an amount of displacement of the operation unit in response to an operation on the operation unit, and a transmitter transmitting the parameter output from the parameter output unit to the outside. The information processing apparatus includes a receiver receiving the parameter transmitted from the operation device, a storage unit storing content data and first group identification information for identifying first groups in which the content data are arranged in a predetermined unit, a selection unit sequentially selecting the content data stored in the storage unit while the parameter received by the receiver is in a first range and sequentially selecting the first groups by sequentially selecting the first group identification information stored in the storage unit while the parameter is a value in a second range, and a notification unit notifying what content data is selected when the content data are selected by the selection unit and notifying what group is selected when the first groups are selected by the selection unit.

In this way, the parameter, which represents the amount of displacement of the operation unit, output in response to the operation on the operation unit which can be displaced in a predetermined range by a user's operation is transmitted from the operation device to the information processing apparatus, the content data are sequentially selected when the parameter is a value in the first range, the groups of the content data are sequentially selected when the parameter is a value in the second range, the selected content data is notified when the content data are selected, and the selected group is notified when the groups are selected.

According to the embodiments of the invention, it is possible to switch a selection target between the content data and the groups thereof using the amount of displacement by a single operation and to sequentially select the content data or the groups while allowing the user to recognize the selected content data or group.

According to the above-mentioned embodiments of the invention, it is possible to switch a selection target between the content data and the groups thereof using the amount of displacement by a single operation and to sequentially select the content data or the groups while allowing the user to recognize the selected content data or group. Accordingly, it is possible to provide an information processing apparatus, an information processing method, an information processing program, and an information processing system, which can search for desired content data more easily than in the past.

BRIEF DESCRIPTION OF THE DRAWINGS

FIG. 25 is a diagram schematically illustrating the hardware configuration (2) of the portable playback apparatus according to the third embodiment.

FIG. 37 is a block diagram illustrating the inner configuration of a playback system according to another embodiment of the invention.

FIG. 40 is a diagram schematically illustrating a display example of a knob icon according to another embodiment of the invention.

DESCRIPTION OF PREFERRED EMBODIMENTS

Hereinafter, embodiments of the invention will be described in detail with reference to the accompanying drawings.

1. First Embodiment 1-1. Outline of First Embodiment

First, the outline of a first embodiment of the invention will be described. After describing the outline, specific examples of the first embodiment will be described.

Figure 1A:
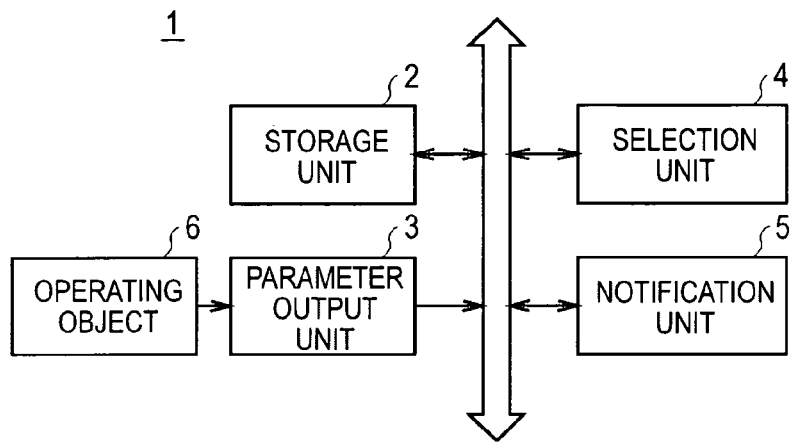
FIGS. 1A and 1B are block diagrams illustrating the configuration of an information processing apparatus and an information processing system which is the outline of a first embodiment of the invention.

In FIG. 1A, reference numeral 1 represents an information processing apparatus which is an outline of the first embodiment. The information processing apparatus 1 includes a storage unit 2, a parameter output unit 3, a selection unit 4, and a notification unit 5.

The storage unit 2 stores content data (for example, music data) and first group identification information (for example, album titles or artists' names) for identifying first groups (for example, albums or artists) in which the content data are arranged in a predetermined unit. The parameter output unit 3 outputs a parameter representing an amount of displacement of an operating object 6, which can be displaced in a predetermined range by a user's operation, in response to the operation on the operating object 6.

The selection unit 4 sequentially selects the content data stored in the storage unit 2 while the parameter output from the parameter output unit 3 is in a first range. The selection unit 4 sequentially selects the first groups by sequentially selecting the first group identification information stored in the storage 2 while the parameter is a value in a second range. The notification unit 5 notifies what content data is selected when the content data are selected by the selection unit 4 and notifies what group is selected when the first groups are selected by the selection unit 4.

According to this configuration, the information processing apparatus 1 can switch a selection target between the content data and the groups thereof using the amount of displacement by a single operation. In addition, the information processing apparatus 1 can sequentially select the content data or the groups while allowing the user to recognize the selected content data or the groups thereof. Accordingly, the information processing apparatus 1 can search for desired content data more easily than in the past.

In addition, the operating object 6 may be a member which can be displaced in a predetermined range by a user's operation, such as a dial, and may be embodied by hardware or may be embodied by a GUI (Graphical User Interface).

Figure 1B:
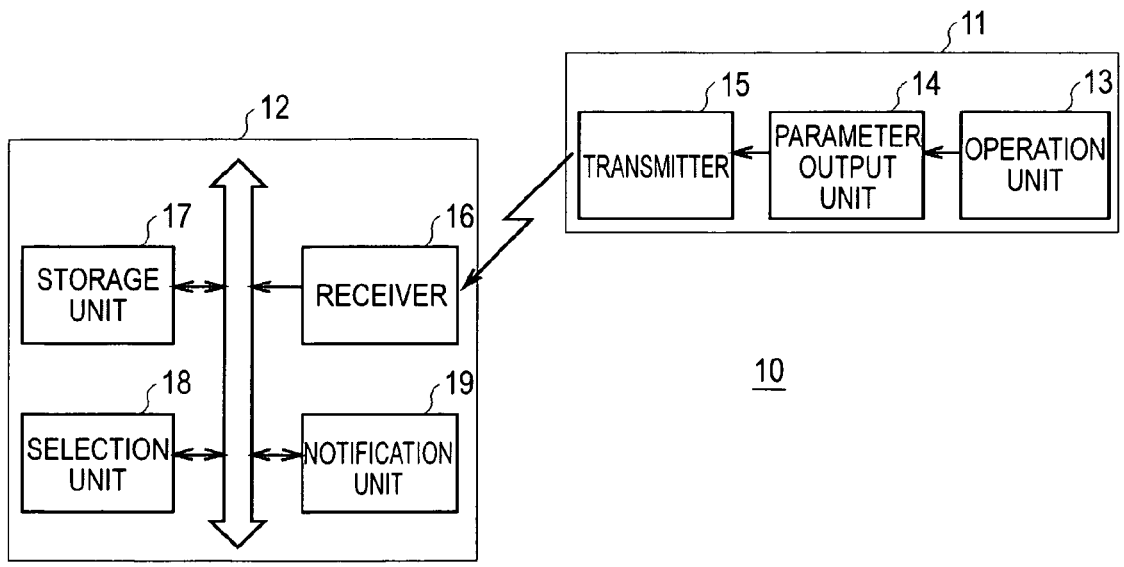

Like the information processing system 10 shown in FIG. 1B, the operating object 6 may be externally connected as an operation device 11 to the information processing apparatus and a parameter may be transmitted from the operation device 11 to the information processing apparatus 12.

In this case, the operation device 11 includes an operation unit 13, a parameter output unit 14, and a transmitter 15. The operation unit 13 can be displaced in a predetermined range by a user's operation. The parameter output unit 14 outputs a parameter representing an amount of displacement of the operation unit 13 in response to the operation on the operation unit 13. The transmitter 15 transmits the parameter output from the parameter output unit 14 to the external information processing apparatus 12.

On the other hand, the information processing apparatus 12 includes a receiver 16, a storage unit 17, a selection unit 18, and a notification unit 19. The receiver receives the parameter transmitted from the operation device 11. The storage unit 17 stores content data and first group identification information for identifying first groups in which the content data are arranged in a predetermined unit.

The selection unit 18 sequentially selects the content data stored in the storage unit 17 when the parameter received by the receiver 16 is in a first range and sequentially selects the first groups by sequentially selecting the first group identification information stored in the storage unit 17 when the parameter is a value in a second range. The notification unit 19 notifies what content data is selected when the content data are selected by the selection unit 18 and notifies what group is selected when the first groups are selected by the selection unit 18.

According to this configuration, similarly to the information processing apparatus 1, the information processing system 10 can switch a selection target between the content data and the groups thereof using the amount of displacement by a single operation. In addition, the information processing system 10 can sequentially select the content data or the groups thereof while allowing the user to recognize the selected content data or group. Accordingly, the information processing system 10 can search for desired content data more easily than in the past.

Figure 2A:
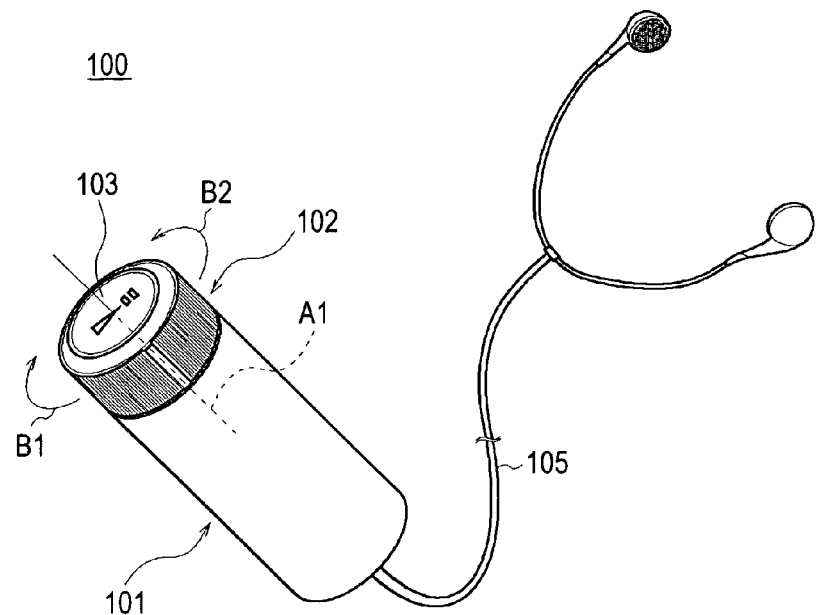
FIGS. 2A and 2B are diagrams schematically illustrating the outer configuration of a portable playback apparatus.
Figure 2B:
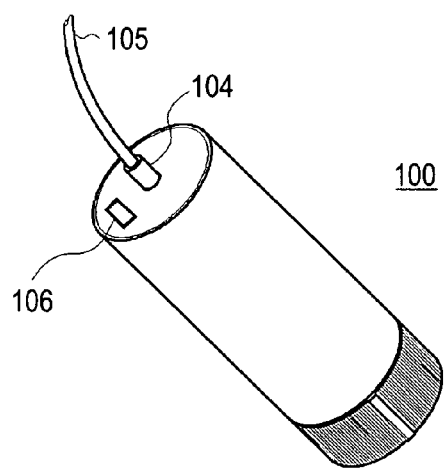

1-2. Specific Example of First Embodiment
1-2-1. Outer Configuration of Portable Playback Apparatus In FIGS. 2A and 2B, reference numeral 100 represents the outer configuration of a portable playback apparatus which is a specific example of the above-mentioned information processing apparatus 1.

The portable playback apparatus 100 includes a chassis 101 having a substantially columnar shape. An end portion of the chassis 101 is provided with a rotational operation unit 102 having a substantially columnar dial shape along the shape of the chassis 101. That is, the portable playback apparatus 100 has a substantially columnar shape as a whole with the chassis 101 and the rotational operation unit 102 and the size thereof is selected as such a size that can be grasped, for example, with one hand.

The rotational operation unit 102 is mounted on the chassis 101 so as to rotate in the clockwise rotating direction indicated by arrow B1 and in the counterclockwise rotating direction indicated by arrow B2 about the center axis A1 in the longitudinal direction of the chassis 101 as the rotational operation unit 102 is viewed from above.

The rotational operation unit 102 is urged to a predetermined reference position by an inner urging member (for example, a spring) and can rotate, for example, in the range of ±100 degree from the reference position by the user's operation. Here, the counterclockwise rotating direction indicted by arrow B2 is the + direction and the clockwise rotating direction indicated by arrow B1 is the − direction.

The top surface of the rotational operation unit 102 is provided with a play/pause button 103.

The other end portion of the chassis 101 is provided with an earphone terminal 104 where earphones 105 can be connected to the earphone terminal 104.

The other end portion is provided with an external connection terminal 106 for connection to an external apparatus (for example, a personal computer) and a cable (not shown) can be connected to the external connection terminal 106. The portable playback apparatus 100 can be connected to the external apparatus via the cable connected to the external connection terminal 106.

When music data is transmitted from the external apparatus connected thereto via the cable, the portable playback apparatus 100 stores the transmitted music data in a storage unit (not shown) in the chassis 101. Thereafter, when the cable is separated and the play/pause button 103 is pushed, the portable playback apparatus 100 starts playing back the music data stored in the storage unit of the chassis 101.

The portable playback apparatus 100 outputs a sound based on a sound signal obtained by playing back the music data from the earphones 105 connected to the earphone terminal 104. In this way, the portable playback apparatus 100 plays back the music data.

The portable playback apparatus 100 can search for the music data by the use of a sound of a climax part or an announcement in response to the rotating operation of the rotational operation unit 102. This search is also called sound search and the details of the sound search will be described later.

Figure 3:
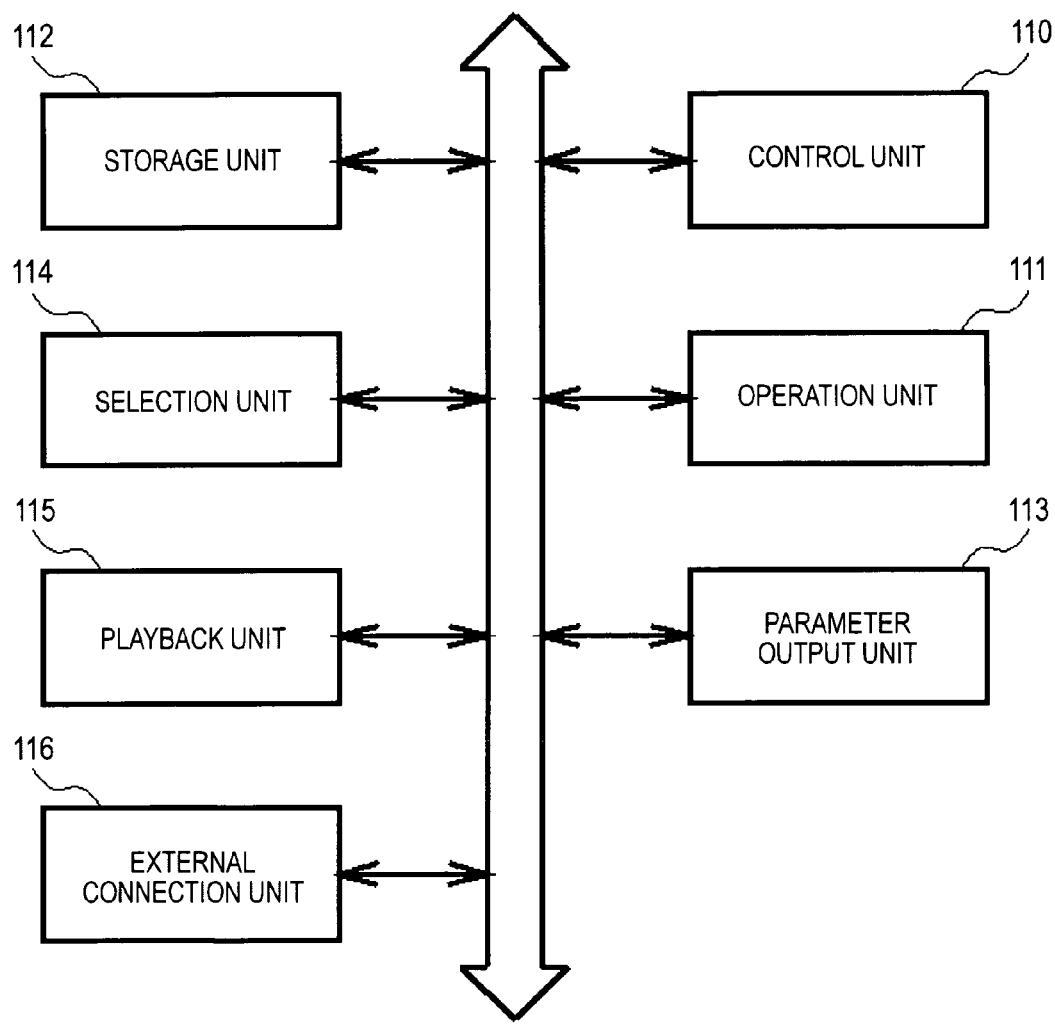
FIG. 3 is a diagram schematically illustrating the inner configuration of the portable playback apparatus.

1-2-2. Inner Configuration (Functional Configuration) of Portable Playback Apparatus The inner configuration of the portable playback apparatus 100 will be described now. As shown in FIG. 3, the portable playback apparatus 100 includes a control unit 110, an operation unit 111, a storage unit 112, a parameter output unit 113, a selection unit 114, a playback unit 115, and an external connection unit 116.

The operation unit 111 includes the above-mentioned rotational operation unit 102 and the above-mentioned play/pause button 103. The playback unit 115 includes the above-mentioned earphone terminal 104. The external connection unit 116 includes the above-mentioned external connection terminal 106.

Here, the storage unit 112 is a functional unit corresponding to the storage unit 2 of the information processing apparatus 1 and the parameter output unit 113 is a functional unit corresponding to the parameter output unit 3 of the information processing apparatus 1. The selection unit 114 is a functional unit corresponding to the selection unit 4 of the information processing apparatus 1 and the playback unit 115 is a functional unit corresponding to the notification unit 5 of the information processing apparatus 1.

When music data is transmitted from the external apparatus in the state where it is connected to the external apparatus via the external connection unit 116 and the cable, the portable playback apparatus 100 stores the transmitted music data in the storage unit 112.

At this time, relevant music data information is transmitted along with the music data from the external apparatus. The portable playback apparatus 100 also stores the relevant information in the storage unit 112. The relevant information includes attribute information such as music titles for identifying the music based on the music data, artists' names for identifying an artist, album titles for identifying the album to which the music belongs, and track numbers of the album. The relevant information also includes attribute information such as jacket images of albums or climax positions of the music.

Figure 4:
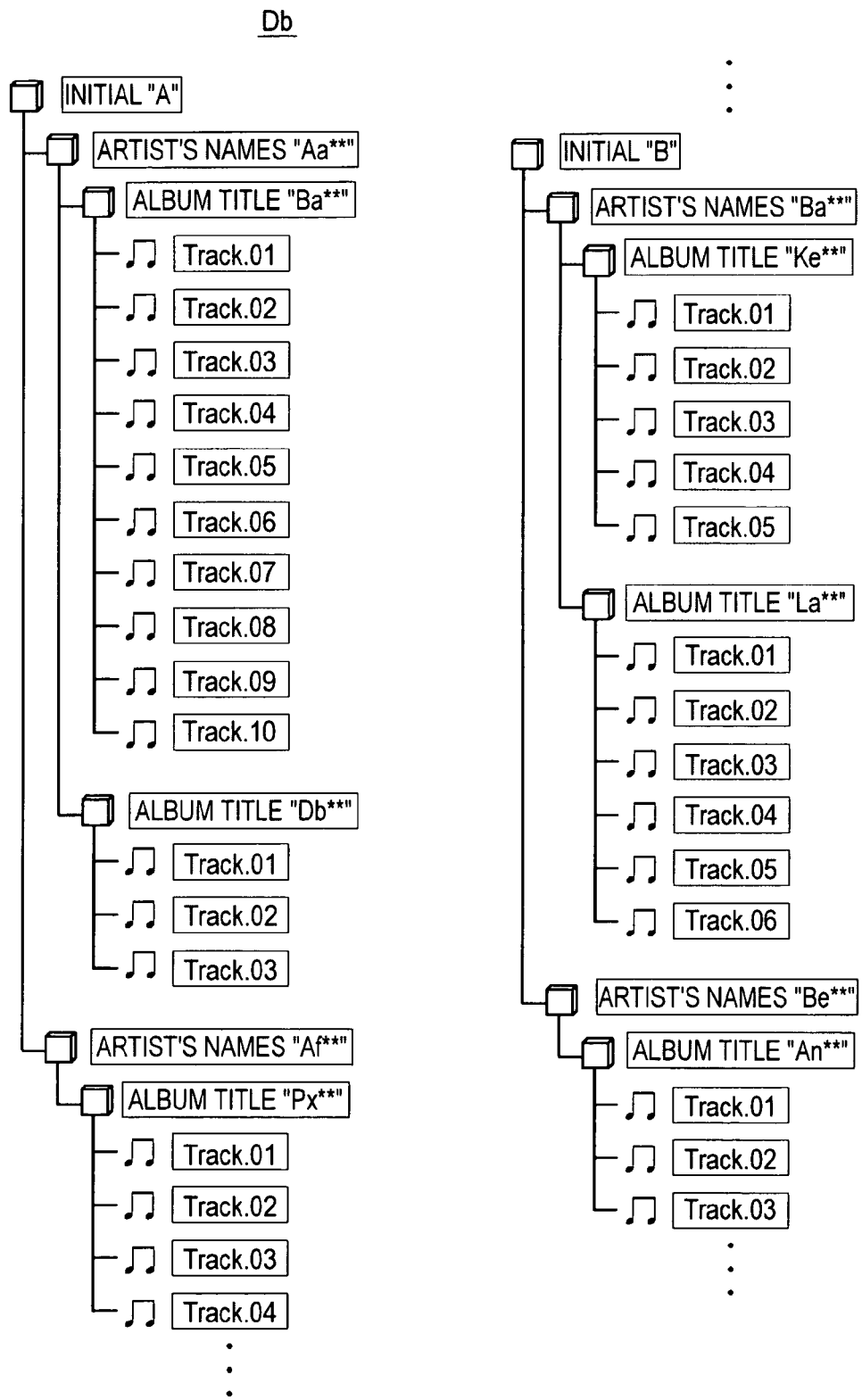
FIG. 4 is a diagram schematically illustrating the configuration of a relevant information database.

In the portable playback apparatus 100, the control unit 110 constructs a relevant information database Db with a hierarchical structure shown in FIG. 4 on the basis of the relevant information. The relevant information database Db has a structure in which initials (such as "A" and "B" as the initial characters) of the artists' names are disposed in the uppermost layer and the artists' names having the initials as the initial characters are disposed in the next layer. In addition, in the relevant information database Db, album titles of artists' albums are disposed in the layer just below of the artists' names. In the relevant information database Db, tracks belonging to the albums are disposed in the lowermost layer below the album titles.

The tracks in the lowermost layer correspond to the music data stored in the storage unit 112.

The layers of the relevant information database can be respectively sorted. For example, in the initial setting, initials are sorted in alphabetical order and the artists' names in the layer just below the initials are sorted in alphabetical order of the initials. The album titles in the layer just below them are sorted in alphabetical order of the artists' names and the tracks in the layer just below them are sorted in numerical order of the track numbers for each album title.

That is, the respective layers are sorted after the upper layer is sorted. For example, the tracks (that is, the music data) in the lowermost layer are sorted after the initials, the artists' names, and the album titles are sorted as the upper layers.

The relevant information includes artist-name sound data for announcing the artists' names, which are used in a sound search to be described later and album-title sound data for announcing the album titles. Separately from the sound data, initial sound data for announcing the initials are stored in the storage unit 112 in advance.

Thereafter, when the cable is separated and the play/pause button 103 of the operation unit 111 is pushed, the portable playback apparatus 100 is changed to a normal playback mode and the selection unit 114 selects one piece of music data stored in the storage unit 112. Then, the playback unit 115 starts playing back the music data.

The playback unit 115 outputs the sound (that is, the music sound) based on the sound signal obtained by playing back the music data from the earphones 105. In this way, the portable playback apparatus 100 can allow a user to listen to the music sound based on the music data.

When the rotational operation unit 102 of the operation unit 111 is rotationally operated, the portable playback apparatus 100 is changed to a sound search mode and music data with sounds is searched for.

Specifically, in the portable playback apparatus 100, when the rotational operation unit 102 of the operation unit 111 is rotationally operated, the parameter representing the amount of rotation is output from the parameter output unit 113 and the parameter is sent to the selection unit 114 and the playback unit 115.

Figure 5:
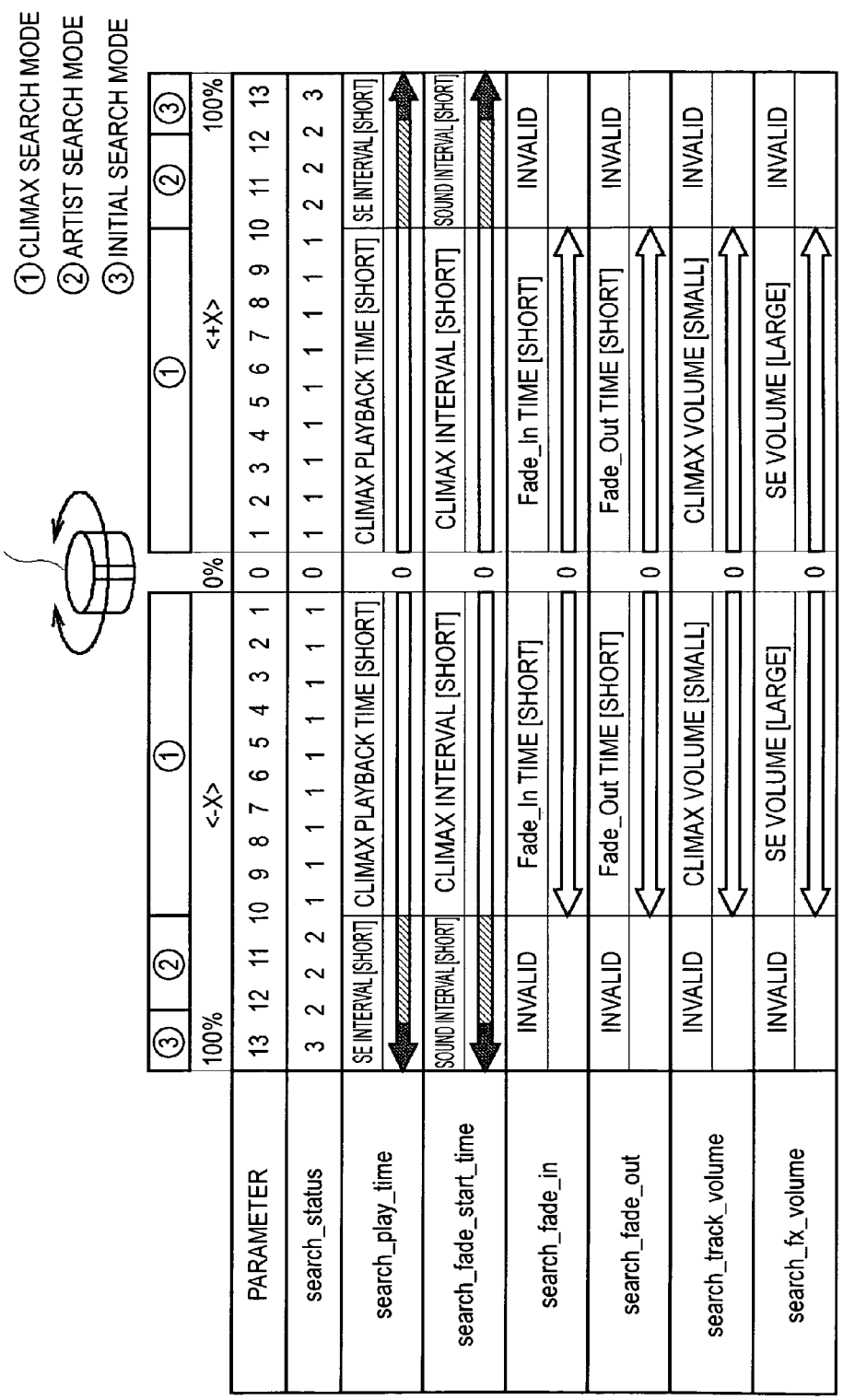
FIG. 5 is a diagram schematically illustrating the relation among an amount of rotation of a rotational operation unit, a parameter, and a set value.

Here, as shown in FIG. 5, the parameter output unit 113 outputs "0" as the parameter when the rotational operation unit 102 is located at the reference position and outputs "13" as the parameter when the rotational operation unit 102 is located at the position of +90 degree. In addition, the parameter output unit 113 outputs a parameter in the range of "1" to "12" depending on the amount of rotation when the rotational operation unit 102 is located from the reference position to a position of +90 degree.

That is, when the rotational operation unit 102 is rotationally operated in the + direction, the parameter output unit 113 outputs the 14-step parameters of "0" to "13" depending on the amount of rotation (between 0% (reference position) and 100% (+90 degree)).

When the rotational operation unit 102 is rotationally operated in the − direction, the parameter output unit 113 outputs the 14-step parameters of "0" to "13" depending on the amount of rotation (between 0% (reference position) and 100% (−90 degree)).

In order to distinguish the rotation in the + direction and the rotation in the − direction from each other, the parameter output unit 113 attaches a sign of + to the parameter representing the amount of rotation in the + direction and attaches a sign of − to the parameter representing the amount of rotation in the − direction.

The selection unit 114 switches the selection target (that is, the search range) depending on the parameter (that is, the amount of rotation of the rotational operation unit 102) output from the parameter output unit 113 using the relevant information database Db stored in the storage unit 112.

Figure 6:
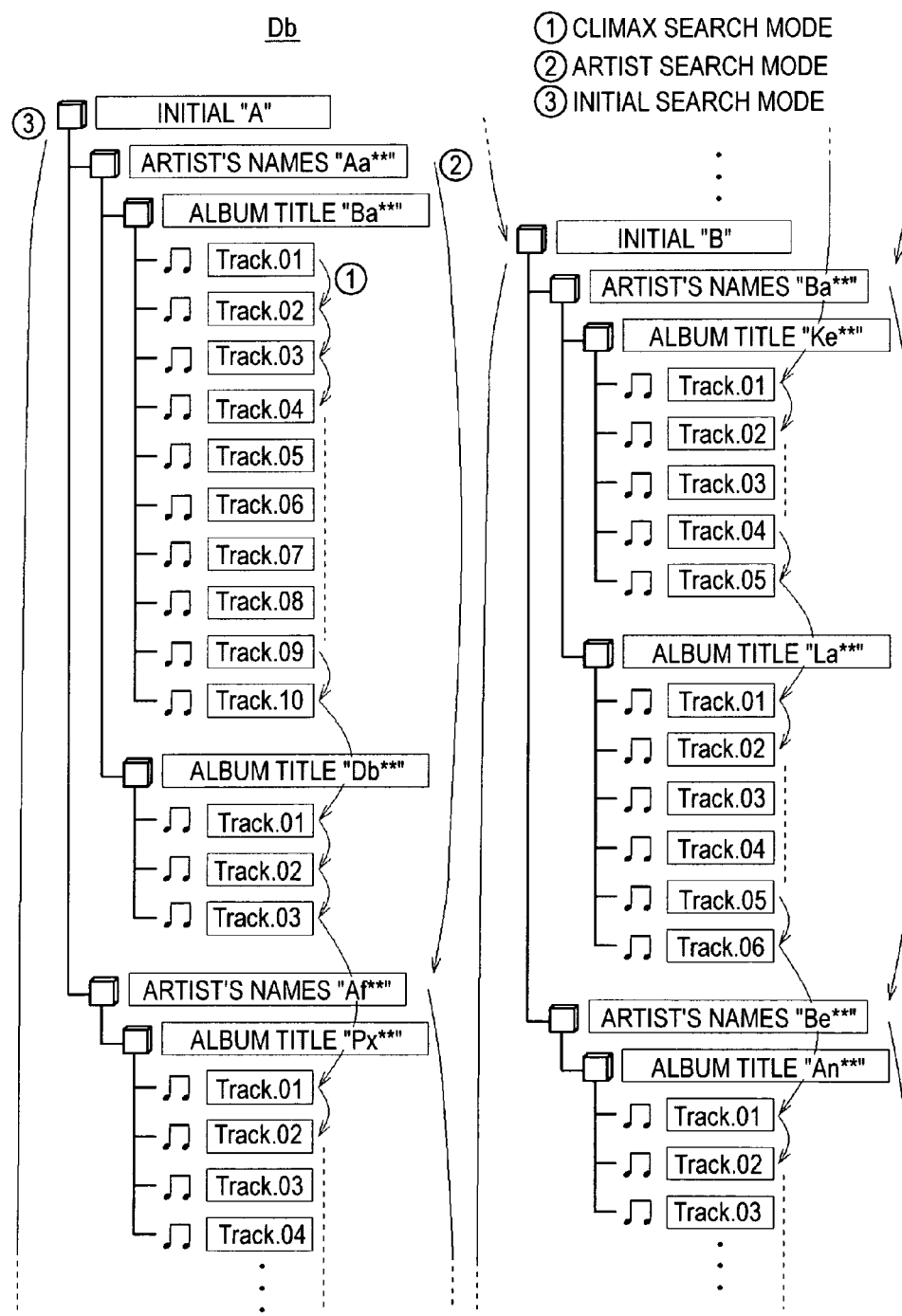
FIG. 6 is a diagram schematically illustrating a selection target in search modes.

That is, as shown in FIG. 6, when the parameter is a value in the range of "1" to "9", the selection unit 114 sets the tracks (music data) in the lowermost layer registered in the relevant information database Db as the selection target and selects the tracks, when a predetermined time lapses (for example, several seconds), in the sorted order.

Here, the tracks registered in the relevant information database Db are sorted in track number order for each album title after the initials, the artists' names, and the album titles as the upper layers are sorted, as described above.

At this time, the tracks in the lowermost layer are roughly grouped in alphabetical order for each sorted initial and are grouped into groups of artists' names sorted in alphabetical order for each initial. The tracks are grouped for each album title sorted in alphabetical order in each artist's name and are finally arranged in track number order in each album title.

That is, all the tracks are grouped in order of initials, artists' names, and album titles and are arranged in a line.

The selection unit 114 sequentially selects the tracks grouped in order of initials, artists' names, and album titles, which are arranged in a line. In this case, the selection unit 114 recognizes the first track as the track next to the final track.

At this time, the playback unit 115 plays back the climax part of the track selected by the selection unit 114.

In this way, when the parameter output from the parameter output unit 113 is in the range of "1" to "9", the portable playback apparatus 100 sequentially selects the track and plays back the climax part of the selected track.

That is, the portable playback apparatus 100 can allow a user to search for desired music by sequentially playing back the climax parts of the tracks. When the desired music is searched for by playing back the climax parts of the tracks, it is called a climax search and when the portable playback apparatus 100 is in the sound search mode, it is in a climax search mode.

In the climax search mode, it is assumed that the track selected by the selection unit 114 is changed from a track grouped into a particular artist's name to a track grouped into another artist's name. That is, it is assumed that the selected artist's name is changed in response to the selection of a track by the selection unit 114. Then, the playback unit 115 plays back the artist-name sound data corresponding to the changed artist's name.

In the climax search mode, it is assumed that the track selected by the selection unit 114 is changed from a track grouped into a particular album title to a track grouped into another album title. That is, it is assumed that the selected album title is changed in response to the selection of a track by the selection unit 114. Then, the playback unit 115 plays back the artist-name sound data corresponding to the changed album title.

In this way, the portable playback apparatus 100 can allow the user to easily recognize by means of a vocalized sound the album of the artist to which the currently selected track belongs.

When the parameter is a value in the range of "10" to "12", the selection unit 114 sets the artists' names in the layer above the track registered in the relevant information database Db as the selection target and selects the artists' names in the sorted order after a predetermined time lapses.

At this time, the playback unit 115 plays back the artist-name sound data corresponding to the artist's name selected by the selection unit 114.

In this way, when the parameter output from the parameter output unit 113 is in the range of "10" to "12", the portable playback apparatus 100 sequentially selects the artists' names and plays back the artist-name sound data corresponding to the selected artist's name.

That is, the portable playback apparatus 100 can allow the user to search for a desired artist's name by sequentially playing back the artist-name sound data. When a desired artist's name is searched for by playing back the artist-name sound data it is called an artist search and the portable playback apparatus 100 is in the artist search mode of the sound search mode.

When the parameter has a value of "13", the selection unit 114 sets the initials in the layer above the artists' names registered in the relevant information database Db as the selection target and selects the initials in the sorted order after a predetermined time lapses.

At this time, the playback unit 115 plays back the initial sound data corresponding to the initial selection by the selection unit 114.

In this way, when the parameter output from the parameter output unit 113 has a value of "13", the portable playback apparatus 100 sequentially selects the initials and plays back the initial sound data corresponding to the initial selection.

That is, the portable playback apparatus 100 can allow the user to search for a desired initial by sequentially playing back the initial sound data. When the desired initial is searched for by playing back the initial sound data it is called initial search and the portable playback apparatus 100 is in the initial search mode of the sound search mode.

When the sign of the parameter is "−", the selection unit 114 selects the selection targets in the opposite direction where the sign of the parameter is "+".

The playback unit 115 plays back various sound effect data in response to the selection of the tracks, the artists' names, or the initials by the selection unit 114. Various sound effect data are stored in the storage unit 112 in advance and the details thereof will be described later.

The portable playback apparatus 100 can search for music data while switching the search mode between the initial search mode, the artist search mode, and the climax search mode depending on the amount of rotation by a single operation of rotating the rotational operation unit 102.

Here, the portable playback apparatus 100 can perform a rough search, such as the initial search, as the amount of rotation of the rotational operation unit 102 increases and can perform a detailed search, such as the climax search, as the amount of rotation decreases. Accordingly, it is possible to provide a user with a more intuitive search operation.

Since the portable playback apparatus 100 can allow the user to recognize the initial, the artist's name, and the music title selected with a sound, it is possible for the user to easily recognize the selected music without any display unit.

The user can easily search for desired music data from a large amount of music data stored in the portable playback apparatus 100 by the using only a hand to operate the rotational operation unit 102 and listening to the sound emitted from the earphones 105.

Thereafter, when the rotational operation unit 102 is returned to the reference position (that is, when the parameter output from the parameter output unit 113 is "0"), the portable playback apparatus 100 is returned to the normal playback mode from the sound search mode.

At this time, when a track is selected just before returning to the normal playback mode, the selection unit 114 continuously selects the track. The playback unit 115 continuously plays back the music data of which the climax part is played back just before returning to the normal playback mode.

When an artist's name is selected just before returning to the normal playback mode, the selection unit 114 selects one track grouped into the artist's name (one music piece composed by the artist with the selected artist's name).

When an initial is selected just before returning to the normal playback mode, the selection unit 114 selects one track grouped into the initial (one music piece composed by the artist with the artist's name of the selected initial).

The playback unit 115 plays back the music data corresponding to the track selected by the selection unit 114.

When the portable playback apparatus 100 is changed from the sound search mode to the normal playback mode by returning the rotational operation unit 102 to the reference position, the music data corresponding to the initial, the artist's name, and the climax part selected just before the change in mode is played back.

In this way, the portable playback apparatus 100 can allow the user, having searched for the desired music data by the use of the initial search, the artist's name search, and the climax search in the sound search mode, to listen to the piece of music corresponding to the music data at once.

1-2-3. Playback Control in Sound Search Mode

The playback control of various sound data (such as the climax part of music data, the initial sound data, the artist-name sound data, the album-title sound data, and the sound effect data) in the above-mentioned sound search mode will be described now in detail.

This playback control is carried out in cooperation with the selection unit 114 and the playback unit 115 of the portable playback apparatus 100. Together the initial sound data, the artist-name sound data, and the album-title sound data correspond to the announcement of sound data.

The playback unit 115 of the portable playback apparatus 100 is changed to the sound search mode and plays back various sound data, when the rotational operation unit 102 is operated as described above. The playback unit 115 of the portable playback apparatus 100 changes the search mode (climax search mode, artist search mode, and initial search mode), and the playback time, the playback interval, and the playback volume of the various sound data, depending on the amount of rotation of the rotational operation unit 102.

Here, set values for changing the search mode and the playback time, the playback interval, and the playback volume of the various sound data which are set in the portable playback apparatus 100 will be described now.

Specifically, as shown in FIG. 5, in the portable playback apparatus 100, the set values for changing the search mode and the playback time, the playback interval, and the playback volume of the various sound data depending on the amount of rotation (that is, the above-mentioned parameter) of the rotational operation unit 102 are stored in the storage unit 112.

As one of the set values, a set value (which is referred to as "search_status") indicating the current search mode is known.

The search_status is set to the value "1" representing the climax search mode as the value corresponding to the parameter with a value in the range of "1" to "9" which is output from the parameter output unit 113.

The search_status is set to a value of "2" representing the artist search mode as the value corresponding to a parameter in the range of "10" to "12" output from the parameter output unit 113.

The search_status is set to a value of "2" representing the initial search mode as the value corresponding to the parameter of "13" output from the parameter output unit 113.

That is, the portable playback apparatus 100 changes the current search mode depending on the search_status.

As one set value, the set value (which is also referred to as "search_play_time") indicating the playback time of the climax part in the climax search mode and the playback interval of the sound effect data in the artist search mode and the initial search mode is known.

In the search_play_time, the value corresponding to a parameter in the range of "1" to "9", a value corresponding to a parameter in the range of "10" to "12", and a value corresponding to a parameter of "13", which are output from the parameter output unit 113, are different from each other in meaning.

That is, the search_play_time is set to the value representing the playback time of the climax part in the climax search mode as the value corresponding to a parameter in the range of "1" to "9" output from the parameter output unit 113. This vale is set so that the playback time of the climax part decreases as the value of the parameter increases from "1" to "9".

That is, in the climax search mode, the portable playback apparatus 100 changes the playback time of the climax part depending on the search_play_time.

The search_play_time is set to a value representing the playback interval of the sound effect data in the artist search mode as the value corresponding to a parameter in the range of "10" to "12" output from the parameter output unit 113. This vale is set so that the playback interval of the sound effect data decreases as the value of the parameter increases from "10" to "12".

That is, in the artist search mode, the portable playback apparatus 100 changes the playback interval of the sound effect data depending on the search_play_time.

The search_play_time is set to a value representing the playback interval of the sound effect data in the initial search mode as the value corresponding to a parameter of "13" output from the parameter output unit 113.

In the initial search mode, the portable playback apparatus 100 changes the playback interval of the sound effect data depending on the search_play_time.

As one set value, the set value (which is also referred to as "search_fade_start_time") representing the playback interval of the climax part in the climax search mode and the playback interval of the announcement of the sound data in the artist search mode and the initial search mode is known.

In the search_fade_start_time, a value corresponding to a parameter in the range of "1" to "9", a value corresponding to a parameter in the range of "10" to "12", and a value corresponding to a parameter of "13", which are output from the parameter output unit 113, are different from each other in meaning.

That is, the search_fade_start_time is set to the value representing the playback interval of the climax part in the climax search mode as the value corresponding to a parameter in the range of "1" to "9" output from the parameter output unit 113. This vale is set so that the playback interval of the climax part decreases as the value of the parameter increases from "1" to "9".

That is, in the climax search mode, the portable playback apparatus 100 changes the playback interval of the climax part depending on the search_fade_start_time.

The search_fade_start_time is set to the value representing the playback interval of the announcement of the sound data in the artist search mode as a value corresponding to a parameter in the range of "10" to "12" output from the parameter output unit 113. This vale is set so that the playback interval of the announced sound data decreases as the value of the parameter increases from "10" to "12".

That is, in the artist search mode, the portable playback apparatus 100 changes the playback interval of the announcement of the sound data depending on the search_fade_start_time.

The search_fade_start_time is set to a value representing the playback interval of the announcement sound data in the initial search mode as the value corresponding to a parameter of "13" output from the parameter output unit 113.

In the initial search mode, the portable playback apparatus 100 sets the playback interval of the announcement of the sound data depending on the search_fade_start_time.

As one set value, the set value (which is also referred to as "search_fade_in") representing the fade-in time at the time of starting the playback of the climax part in the climax search mode is known.

The search_fade_in is a set value which is valid only when the parameter output from the parameter output unit 113 is in a range of "1" to "9" (that is, only in the climax search mode).

That is, the search_fade_in is set to a value representing the fade-in time in the climax search mode as a value corresponding to a parameter in the range of "1" to "9" output from the parameter output unit 113. This value is set so that the fade-in time decreases as the value of the parameter increases from "1" to "9".

That is, in the climax search mode, the portable playback apparatus 100 changes the fade-in time depending on the search_fade_in.

As one set value, the set value (which is also referred to as "search_fade_out") representing the fade-out time at the time of ending the playback of the climax part in the climax search mode is known.

The search_fade_out is a set value which is valid only when a parameter output from a parameter output unit 113 is in the range of "1" to "9" (that is, only in the climax search mode).

That is, the search_fade_out is set to a value representing the fade-out time in the climax search mode as a value corresponding to a parameter in the range of "1" to "9" output from the parameter output unit 113. This value is set so that the fade-out time decreases as the value of the parameter increases from "1" to "9".

That is, in the climax search mode, the portable playback apparatus 100 changes the fade-out time depending on the search_fade_out.

As one set value, the set value (which is also referred to as "search_track_volume") for adjusting the playback volume of the climax part in the climax search mode is known. The search_track_volume is not the set value representing the playback volume of the track (climax part) itself, but is the set value for adjusting the playback volume particularly specified.

The search_track_volume is a set value which is valid only when the parameter output from the parameter output unit 113 is in the range of "1" to "9" (that is, only in the climax search mode).

That is, the search_track_volume is set to a value for adjusting the playback volume of the climax part in the climax search mode as a value corresponding to the parameter in the range of "1" to "9" output from the parameter output unit 113. This value is set so that the playback volume decreases as the value of the parameter increases from "1" to "9".

That is, in the climax search mode, the portable playback apparatus 100 changes the playback volume of the climax part depending on the search_track_volume.

As one set value, the set value (which is also referred to as "search_fx_volume") for adjusting the playback volume of the sound effect data (search_fx to be described later) in the climax search mode is known. The search_fx_volume is not the set value representing the playback volume of the sound effect data itself, but is the set value for adjusting the playback volume particularly specified.

The search_fx_volume is a set value which is valid only when the parameter output from the parameter output unit 113 is in the range of "1" to "9" (that is, only in the climax search mode).

That is, the search_fx_volume is set to a value for adjusting the playback volume of the sound effect data in the climax search mode as a value corresponding to a parameter in the range of "1" to "9" output from the parameter output unit 113. This value is set so that the playback volume increases as the value of the parameter increases from "1" to "9".

That is, in the climax search mode, the portable playback apparatus 100 changes the playback volume of the sound effect data depending on the search_fx_volume.

On the basis of the above-mentioned set values, the portable playback apparatus 100 changes the search mode and the playback time, the playback interval, and the playback volume of various sound data in the sound search mode.

Figure 7:
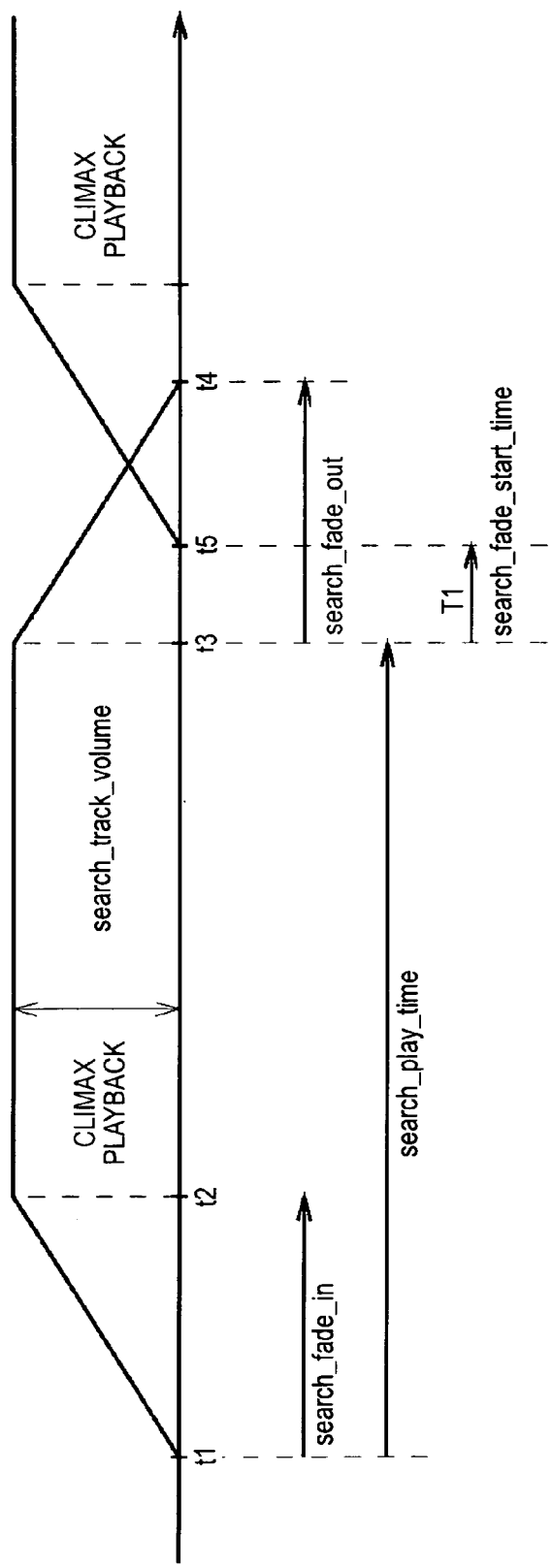
FIG. 7 is a timing diagram illustrating a playback control (1) in a sound search mode.

The relations among the playback time of the climax part, the playback interval of the climax part, the fade-in time, and the fade-out time will be described with reference to the timing diagram shown in FIG. 7.

That is, it is assumed that the playback unit 115 of the portable playback apparatus 100 starts the playback of the climax part of a particular track (music data) at a particular time t1 in the climax search mode. The playback unit 115 performs a fade-in process by increasing the playback volume of the climax part from a value of 0 to a value specified by the search_track_volume between time t1 and time t2.

The time from time t1 to time t2 is set as the fade-in time. That is, the fade-in time is specified by the search_fade_in.

Thereafter, the playback unit 115 continuously plays back the climax part without changing the playback volume from time t2 to time t3. The playback unit 115 performs a fade-out process by decreasing the playback volume of the climax part from the value specified by the search_track_volume to 0 between time t3 and time t4 and ends the playback of the climax part of the track at time t4.

The playback unit 115 starts the playback of the climax part of the next track at time t5 in a particular time T1 from time t3.

The time from time t1 to time t3 is set as the playback time of the climax part. That is, the playback time is specified by the search_play_time.

The time from time t3 to time t4 is set as the fade-out time. That is, the fade-out time is specified by the search_fade_out.

The time T1 from time t3 to time t5, that is, the time T1 until the fade-in process is started on the next climax part after starting the fade-out process on the climax part, is set as the playback interval of the climax part. That is, this playback interval is specified by the search_fade_start_time.

When the search_fade_start_time is shorter than the search_fade_out, the fade-out process of the climax part of a track and the fade-in process of the climax part of the next track overlap with each other like from time t5 to time t4. In this case, the playback unit 115 performs a cross fade-in process.

On the basis of the above-mentioned description, how the search mode and the playback time, the playback interval and the playback volume of various sound data change will be described in detail with reference to the timing diagrams shown in FIGS. 8 to 19.

Figure 8:
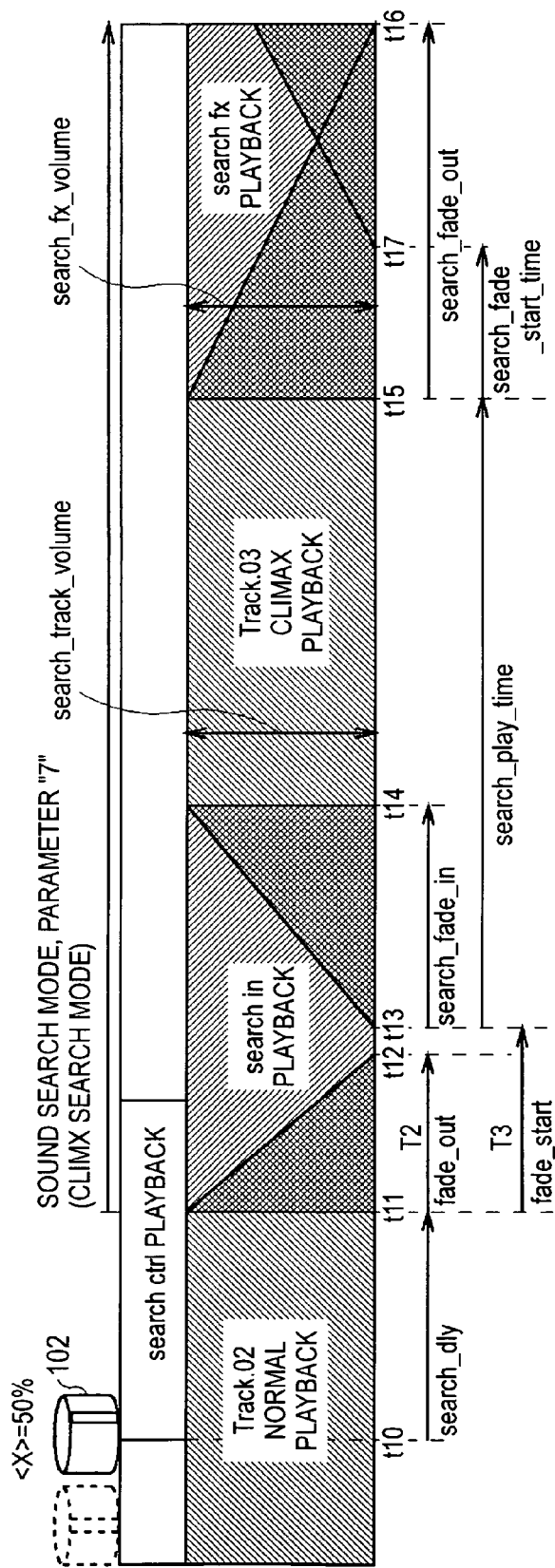
FIG. 8 is a timing diagram illustrating the playback control (2) in the sound search mode.

As shown in FIG. 8, it is assumed that the playback unit 115 of the portable playback apparatus 100 is normally playing back a track (for example, Track. 02) selected by the selection unit 114. Here, at time t10, it is assumed that the rotational operation unit 102 rotates from the reference position to the position corresponding to the amount of rotation of 50%.

Since the parameter output from the parameter output unit 113 is changed from "0" to "7", the selection unit 114 and the playback unit 115 detect the rotation of the rotational operation unit 102. Then, the playback unit 115 mixes sound effect data (also referred to as "search ctrl") for notifying that the rotation of the rotational operation unit 102 is detected into Track. 02 in the current playback and plays back the mixed sound. The part overlapping up and down in the drawing is a part to be mixed and played back.

In this way, by playing back the search ctrl the portable playback apparatus 100 can allow the user to recognize that the rotation of the rotational operation unit 102 is detected.

The selection unit 114 waits from time t10 to time t11. In the meantime, the playback unit 115 continuously plays back Track. 02.

The waiting time from time t10 to time t11 is a time provided to determine whether the user operates the rotational operation unit 102 to use the sound search mode. The waiting time is specified by the search_dly as one set value stored in the storage unit 112. The search_dly is a constant value without depending on the parameter.

That is, when the parameter is returned to a value of "0" in the waiting time, the selection unit 114 and the playback unit 115 determine that a user does not rotationally operate the rotational operation unit 102 to use the sound search mode, does not accept the rotating operation, and it operates in the normal playback mode.

On the contrary, when the parameter has a value of "1" or more in the waiting time, the selection unit 114 and the playback unit 115 determine that the user rotationally operates the rotational operation unit 102 to use the sound search mode and accept the rotating operation at time t11. At this time, the selection unit 114 and the playback unit 115 are switched to the sound search mode.

When the parameter has a value of "7", the selection unit 114 and the playback unit 115 are switched to the climax search mode of the sound search mode, because the corresponding search_status is "1" which represents the climax search mode.

When it is switched to the sound search mode, the playback unit 115 mixes the sound effect data (also referred to as "search in") for notifying the switching to the sound search mode into Track. 02 in the current playback and plays back the mixture.

In this way, the portable playback apparatus 100 can allow the user to recognize that it is switched to the sound search mode by playing back the search in.

The playback unit 115 performs the fade-out process of Track. 02 between time t11 and time t12 in the time T2 thereafter while playing back the search in and ends the playback of Track. 02 at time t12. The time (fade-out time) T2 is specified by the fade_out as a set value stored in the storage unit 112. The fade-out is set to be constant without being dependent on the parameter.

The selection unit 114 selects subsequent music data (for example, Track. 03) between time t11 and time t13 in the set time T3 thereafter. Then, the playback unit 115 starts the playback of the climax part of Track. 03 selected by the selection unit 114 at time t13. The time T3 is specified by the fade_start as a set value stored in the storage unit 112. The fade_start is set to be constant without depending on the parameter.

The playback unit 115 performs the fade-in process by increasing the playback volume of the climax part from a value of 0 to a value specified by the search_track_volume between time t13 to time t14 specified by the search-fade_in. The search_fade_in and the search_track_volume are values corresponding to a parameter ("7" in this case) output from the parameter output unit 113.

Thereafter, the playback unit 115 continuously plays back the climax part of Track. 03 without changing the playback volume specified by the search_play_time from time t14 to time t15. The search_play_time is also a value corresponding to a parameter ("7" in this case) output from the parameter output unit 113.

At time t15, the playback unit 115 mixes the sound effect data (also referred to as "search fx") for notifying the switching of the track into Track. 03 in the current playback and plays back the mixture. The playback unit 115 plays back the search fx with the playback volume specified by the search_fx_volume. The search_fx_volume is also a value corresponding to a parameter ("7" in this case) output from the parameter output unit 113.

The playback unit 115 performs the fade-out process by decreasing the playback volume of the climax part of Track. 03 between time t15 and time t16 specified by the search_fade_out while playing back the search fx. The playback unit 115 ends the playback of the climax part of Track. 03 at time t16. The search_fade_out is also a value corresponding to a parameter ("7" in this case) output from the parameter output unit 113.

The selection unit 114 selects the next music data (for example, Track. 04) between time t15 and time t17 specified by the search_fade_start_time. Then, the playback unit 115 starts the playback of the climax part of Track. 04 selected by the selection unit 114 at time t17. The search_fade_start_time is also a value corresponding to a parameter ("7" in this case) output from the parameter output unit 113.

Since the search_fade_start_time is shorter than the search_fade_out, the playback unit 115 performs the cross fade process between time t17 and time t16.

In this way, the portable playback apparatus 100 sequentially plays back the climax parts of the tracks while sequentially switching the tracks to be selected, in the climax search mode.

The portable playback apparatus 100 plays back the search fx for notifying the switching of the track between the playback of the climax part of a certain track and the playback of the climax part of the next track.

Accordingly, the portable playback apparatus 100 can allow the user to recognize the switching of the track and to sequentially listen to the climax parts thereof, thereby allowing the user to easily search for a desired music piece.

Figure 9:
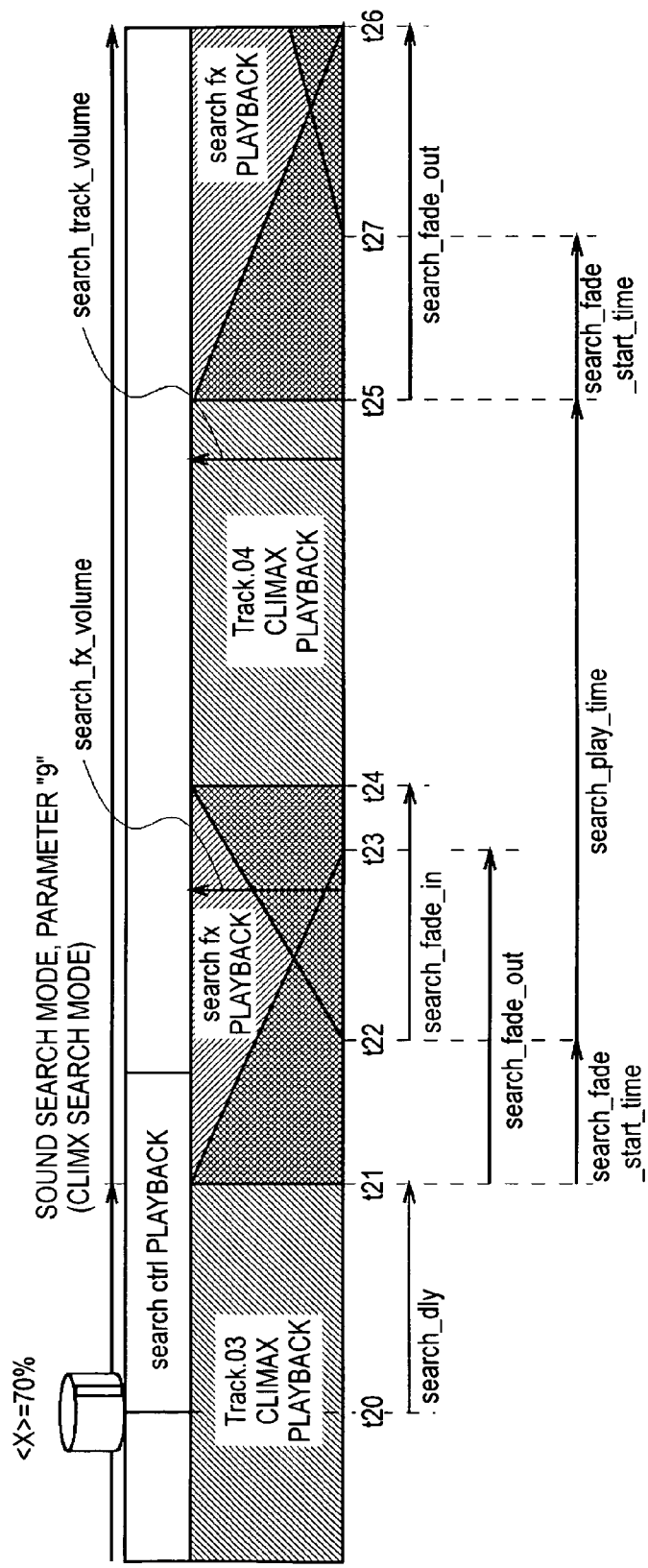
FIG. 9 is a timing diagram illustrating the playback control (3) in the sound search mode.

As shown in FIG. 9, between time t14 and time t15, that is, at time t20 in the course of playing back the climax part of Track. 03, it is assumed that the rotational operation unit 102 is rotationally operated from a position corresponding to an amount of rotation of about 50% to a position corresponding to an amount of rotation of about 70% by the user at time t20.

Since the parameter output from the parameter output unit 113 at this time is changed from "7" to "9", the selection unit 114 and the playback unit 115 detect the rotation of the rotational operation unit 102. Then, the playback unit 115 mixes the sound effect data ("search ctrl") for notifying that the rotation of the rotational operation unit 102 is detected into Track. 03 in the current playback and plays back the mixture.

The selection unit 114 waits from time t20 to time t21 specified by the search_dly. In the meantime, the playback unit 115 continuously plays back the climax of Track. 03.

When it is determined that the user rotationally operates the rotational operation unit 102 to use the sound search mode on the basis of the fact that the parameter has a value of "1" or greater between time t20 and time t21, the selection unit 114 and the playback unit 115 accepts the rotating operation at time t21.

When the parameter has a value of "9", the selection unit 114 and the playback unit 115 operate in the climax search mode on the basis of the fact that the corresponding search_status has a value of "1" representing the climax search mode. In this case, the playback time and the playback interval of the climax part, the fade-in time, and the fade-out time are shorter than those when the parameter has a value of "7", and the playback volume of the sound effect data is controlled to increase instead of reducing the playback volume of the climax part.

At time t21, the playback unit 115 mixes the sound effect data (search fx) for notifying the switching of the track into Track. 03 in the current playback and plays back the mixture. The playback unit 115 plays back the search fx with the playback volume specified by the search_fx_volume. The search_fx_volume is also a value corresponding to the parameter ("9" in this case) output from the parameter output unit 113.

The playback unit 115 performs the fade-out process by decreasing the playback volume of the climax part of Track. 03 up to 0 between time t21 and time t23 specified by the search_fade_out while playing back the search fx. The playback unit 115 ends the playback of the climax part of Track. 03 at time t23. The search_fade_out is also a value corresponding to the parameter ("9" in this case) output from the parameter output unit 113.

The selection unit 114 selects the next track (for example, Track. 04) between time t21 and time t22 specified by the search_fade_start_time. Then, the playback unit 115 starts the playback of the climax part of Track. 04 selected by the selection unit 114 at time t22. The search_fade_start_time is also a value corresponding to the parameter ("9" in this case) output from the parameter output unit 113.

The playback unit 115 performs the fade-in process by increasing the playback volume of the climax part from a value of 0 to a value specified by the search_track_volume between time t22 to time t24 specified by the search_fade_in. The search_fade_in and the search_track_volume are values corresponding to the parameter ("9" in this case) output from the parameter output unit 113.

Thereafter, the playback unit 115 continuously plays back the climax part of Track. 04 without changing the playback volume from time t24 to time t25 specified by the search_play_time. The search_play_time is also a value corresponding to the parameter ("9" in this case) output from the parameter output unit 113.

At time t25, the playback unit 115 mixes the sound effect data (search fx) for notifying the switching of the track with Track. 04 in the current playback and plays back the mixture. The playback unit 115 plays back the search fx with the playback volume specified by the search_fx_volume. The search_fx_volume is also a value corresponding to the parameter ("9" in this case) output from the parameter output unit 113.

The playback unit 115 performs the fade-out process by decreasing the playback volume of the climax part of Track. 04 up to 0 between time t25 and time t26 specified by the search_fade_out while playing back the search fx. The playback unit 115 ends the playback of the climax part of Track. 04 at time t26. The search_fade_out is also a value corresponding to the parameter ("9" in this case) output from the parameter output unit 113.

The selection unit 114 selects the next music data (for example, Track. 05) between time t25 and time t27 specified by the search_fade_start_time. Then, the playback unit 115 starts the playback of the climax part of Track. 05 selected by the selection unit 114 at time t27. The search_fade_start_time is also a value corresponding to the parameter ("9" in this case) output from the parameter output unit 113.

Since the search_fade_out is longer than the search_fade_start_time, the playback unit 115 performs the cross fade process between time t27 and time t26.

Figure 10:
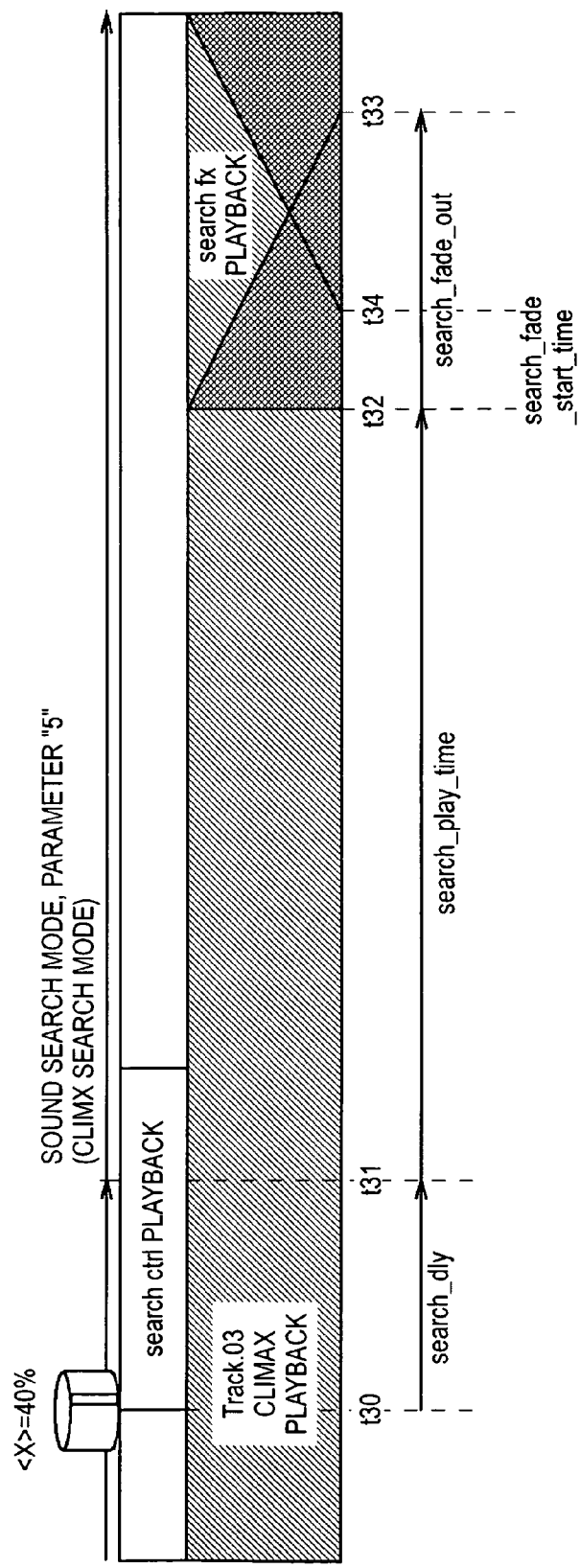
FIG. 10 is a timing diagram illustrating the playback control (4) in the sound search mode.

As shown in FIG. 10, between time t14 and time t15, that is, at time t30 in the course of playing back the climax part of Track. 03, it is assumed that the rotational operation unit 102 is rotationally operated from a position corresponding to an amount of rotation of about 50% to a position corresponding to an amount of rotation of about 40% by the user.

Since the parameter output from the parameter output unit 113 at this time is changed from "7" to "5", the selection unit 114 and the playback unit 115 detect the rotation of the rotational operation unit 102. Then, the playback unit 115 mixes the sound effect data (search ctrl) for notifying that the rotation of the rotational operation unit 102 is detected into Track. 03 in the current climax playback and plays back the mixture.

The selection unit 114 waits from time t30 to time t31 specified by the search_dly. In the meantime, the playback unit 115 continuously plays back the climax of Track. 03.

When it is determined that the user rotationally operates the rotational operation unit 102 to use the sound search mode on the basis of the fact that the parameter has a value of "1" or greater between time t30 and time t31, the selection unit 114 and the playback unit 115 accepts the rotating operation at time t31.

When the parameter has a value of "5", the selection unit 114 and the playback unit 115 operate in the climax search mode on the basis of the fact that the corresponding search_status has a value of "1", representing the climax search mode. In this case, the playback time and the playback interval of the climax part, the fade-in time, and the fade-out time are longer than those when the parameter has a value of "7", and the playback volume of the sound effect data is controlled to decrease instead of enhancing the playback volume of the climax part.

Then, the playback unit 115 extends the playback of the climax part of Track. 03 from time t31 to time t32 specified by the search_play_time corresponding to the parameter ("5" in this case).

At time t32, the playback unit 115 mixes the sound effect data (search fx) for notifying the switching of the track with Track. 03 in the current climax playback and plays back the mixture.

The playback unit 115 performs the fade-out process by decreasing the playback volume of the climax part of Track. 03 up to 0 between time t32 and time t33 specified by the search_fade_out while playing back the search fx. The playback unit 115 ends the playback of the climax part of Track. 03 at time t33. The search_fade_out is also a value corresponding to the parameter ("5" in this case) output from the parameter output unit 113.

The selection unit 114 selects the next track (for example, Track. 04) between time t32 and time t34 specified by the search_fade_start_time. Then, the playback unit 115 starts the playback of the climax part of Track. 04 selected by the selection unit 114 at time t34. The search_fade_start_time is also a value corresponding to the parameter ("5" in this case) output from the parameter output unit 113.

As described above, when the rotational operation unit 102 is rotationally operated in the climax search mode, the portable playback apparatus 100 changes the playback time and the playback interval of the climax part, the fade-in time, and the fade-out time depending on the amount of rotation.

That is, the portable playback apparatus 100 shortens the playback time of the track (climax part) and the time until it is switched to the next track (climax part) as the amount of rotation of the rotational operation unit 102 increases, and elongates the time as the amount of rotation decreases.

In other words, the portable playback apparatus 100 switches the tracks faster as the amount of rotation of the rotational operation unit 102 increases and switches more slowly the tracks as the amount of rotation decreases.

Accordingly, in the climax search mode, the portable playback apparatus 100 can allow the user to carry out the fast search as the amount of rotation of the rotational operation unit 102 increases and to carry out the slow search as the amount of rotation decreases, thereby providing a more intuitive search operation to the user.

Figure 11:
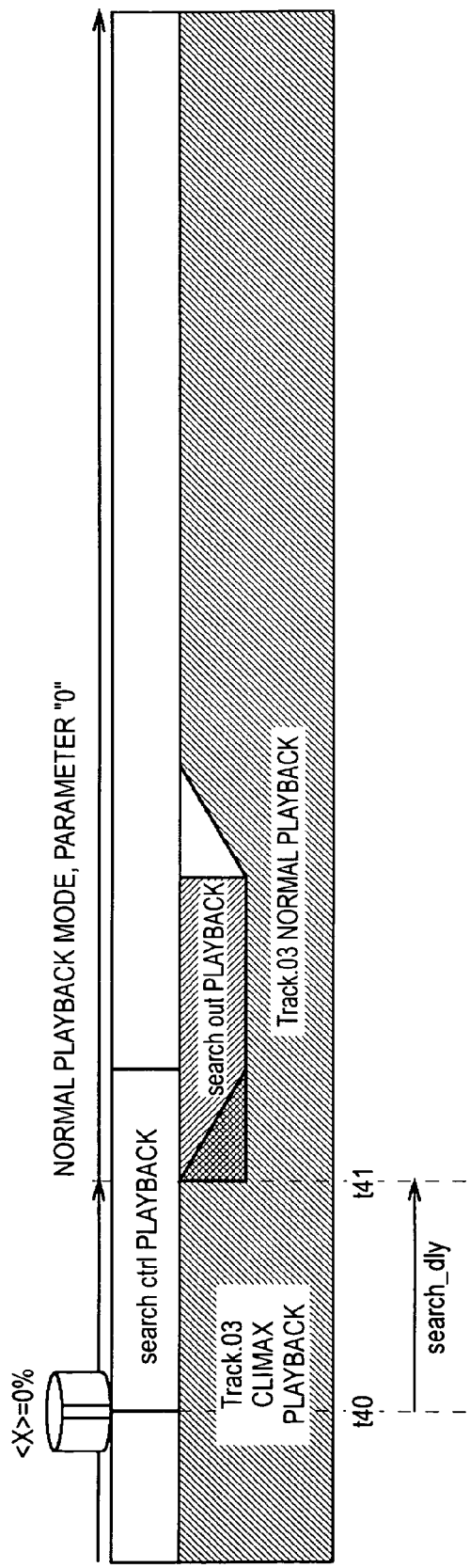
FIG. 11 is a timing diagram illustrating the playback control (5) in the sound search mode.

As shown in FIG. 11, between time t14 and time t15, that is, at time t40 in the course of playing back the climax part of Track. 03, it is assumed that the rotational operation unit 102 is returned from a position corresponding to an amount of rotation of about 50% to a reference position by the user.

Since the parameter output from the parameter output unit 113 at this time is changed from "7" to "0", the selection unit 114 and the playback unit 115 detect the rotation of the rotational operation unit 102. Then, the playback unit 115 mixes the sound effect data (search ctrl) for notifying that the rotation of the rotational operation unit 102 is detected into Track. 03 in the current climax playback and plays back the mixture.

The selection unit 114 waits from time t40 to time t41 specified by the search_dly. In the meantime, the playback unit 115 continuously plays back the climax of Track. 03.

When it is determined that the user rotationally operates the rotational operation unit 102 to use the normal playback mode on the basis of the fact that the parameter has a value of "0" at time t41, the selection unit 114 and the playback unit 115 accept the rotating operation at time t41. The selection unit 114 and the playback unit 115 are changed from the climax search mode to the normal playback mode.

When it is switched to the normal playback mode, the playback unit 115 plays back the sound effect data (also referred to as "search out") for notifying that it is switched to the normal playback mode.

The portable playback apparatus 100 can allow the user to recognize that it is switched to the normal playback mode (that is, that the sound search mode is omitted) by playing back the search out.

The playback unit 115 starts the normal playback of Track. 03 while playing back the search out at time t41. In this case, the playback unit 115 plays back the part successive to the climax part played back at time t41.

In the part where the playback of the search out and the normal playback of Track. 03 overlap, the playback volume of Track. 03 is temporarily suppressed.

When the playback of the search out is started, the playback volume of Track. 03 is suppressed with the fade out and slowly returns to 100% with the fade-in when the playback of the search out is ended.

When the climax search mode is changed to the normal playback mode, the portable playback apparatus 100 normally plays back the track of which the climax is played back in the climax search mode.

Accordingly, the portable playback apparatus 100 can allow the user to smoothly progress from searching for a desired track to listening to the desired track.

Figure 12:
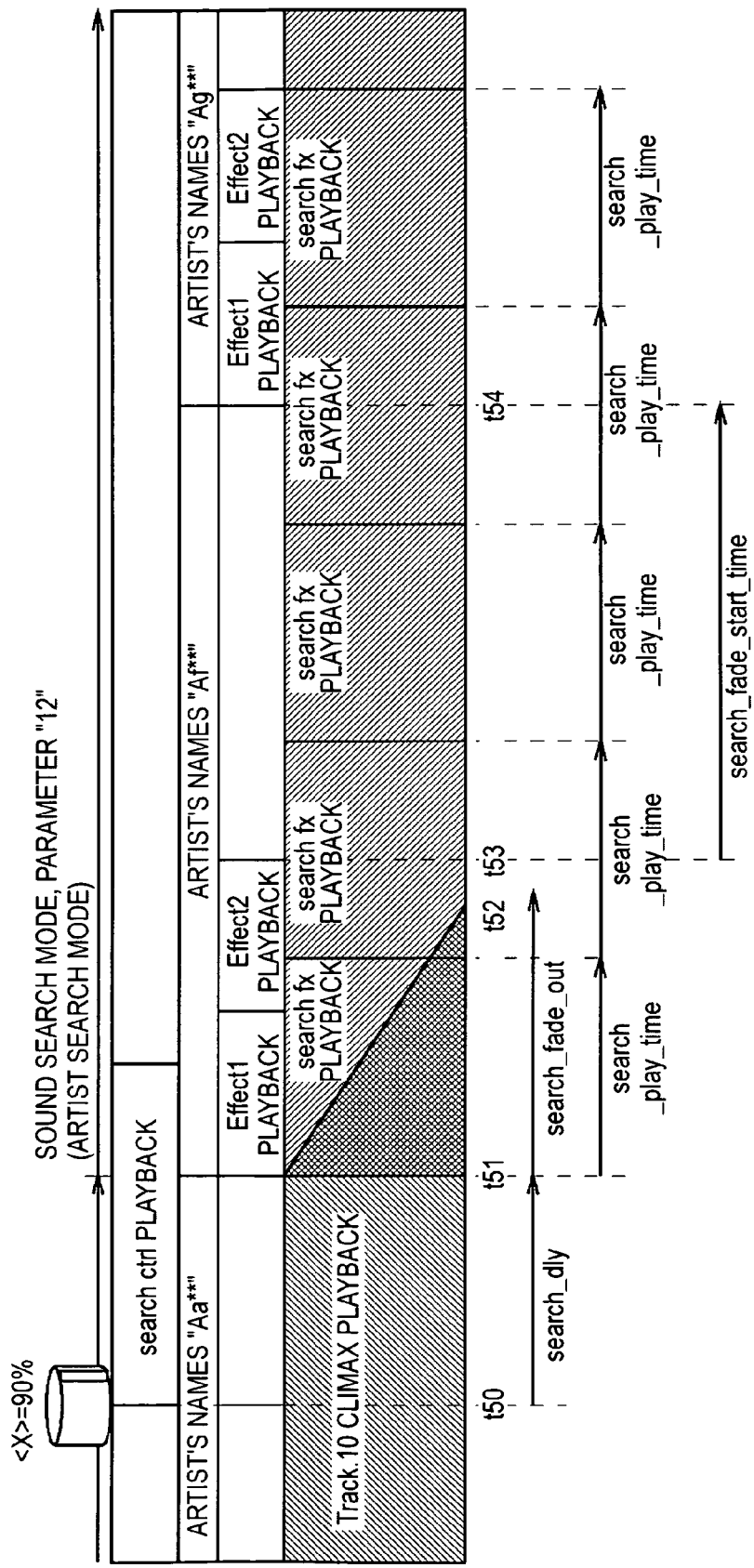
FIG. 12 is a timing diagram illustrating the playback control (6) in the sound search mode.

As shown in FIG. 12, at time t50 in the course of playing back the climax part of Track. 10 grouped into the artist's name "Aa**" in the climax search mode, it is assumed that the rotational operation unit 102 is rotationally operated to a position corresponding to an amount of rotation of about 90% by the user.

Since the parameter output from the parameter output unit 113 at this time is changed to "12", the selection unit 114 and the playback unit 115 detect the rotation of the rotational operation unit 102. Then, the playback unit 115 mixes the sound effect data (search ctrl) for notifying that the rotation of the rotational operation unit 102 is detected with Track. 10 in the current climax playback and plays back the mixture.

The selection unit 114 waits from time t50 to time t51 specified by the search_dly. In the meantime, the playback unit 115 continuously plays back the climax of Track. 10.

When it is determined that the user rotationally operates the rotational operation unit 102 to use the sound search mode on the basis of the fact that the parameter has a value of "1" or more between time t50 and time t51, the selection unit 114 and the playback unit 115 accept the rotating operation at time t51.

When the parameter has a value of "12", the selection unit 114 and the playback unit 115 operate in the artist search mode on the basis of the fact that the corresponding search_status has a value of "2", representing the artist search mode.

The selection unit 114 selects the next artist's name "Af" of the artist's name "Aa" at time t51. The playback unit 115 sequentially plays back the sound effect data (Effect 1) for notifying the switching of the group (the artist's name in this case) and the artist-name sound data (Effect 2) corresponding to the artist's name selected by the selection unit 114 at time t51.

In this way, the portable playback apparatus 100 can allow the user to recognize the switched artist's name by sequentially playing back Effect 1 and Effect 2.

The playback unit 115 repeatedly plays back the search fx for notifying the switching of the track at time t51 at the interval specified by the search_play_time. The search_play_time is a value corresponding to the parameter ("12" in this case) output from the parameter output unit 113.

Since the switching of the track is not carried out in the artist search mode, the search fx is not to notify the switching of the track, but to notify that the switching of the track is more rapid than that in the climax search mode. Therefore, the playback interval of the search fx is set to be shorter than the playback interval in the climax search mode.

The playback unit 115 performs the fade-out process by decreasing the playback volume of the climax part of Track. 10 to 0 between time t51 and time t52 specified by the search_fade_out. The playback unit 115 ends the playback of the climax part of Track. 10 at time t52. Since the search_fade_out is invalid in the artist search mode, the search_fade_out in the climax search mode, just before being switched to the artist search mode, is used.

The playback unit 115 mixes Effect 1 and Effect 2 with the search fx and the climax part of Track. 10 and plays back the mixture.

Thereafter, when the playback of Effect 2 by the playback unit 115 ends at time t53, the selection unit 114 selects the next artist's name "Ag**" between time t53 and time t54 specified by the search_fade_start_time. The search_fade_start_time is a value corresponding to the parameter ("12" in this case) output from the parameter output unit 113.

The switching interval of the artist's name specified by the search_fade_start_time is set to be longer than the switching interval of the track specified by the search fx.

The playback unit 115 sequentially plays back the sound effect data (Effect 1) for notifying the switching of the artist's name and the artist-name sound data (Effect 2) corresponding to the artist's name selected by the selection unit 114 at time t54.

The playback unit 115 mixes Effect 1 and Effect 2 with the search fx and plays back the mixture.

In this way, in the artist search mode, the portable playback apparatus 100 sequentially plays back the artist-name sound data while sequentially switching the artist's name to be selected.

Accordingly, the portable playback apparatus 100 can allow the user to easily search for the desired artist's name while recognizing the selected artist's name.

In the artist search mode, the portable playback apparatus 100 repeatedly plays back the sound effect data (search fx) representing the switching interval of the tracks at an interval shorter than the playback interval in the climax search mode.

Accordingly, the portable playback apparatus 100 can allow the user to search for the artist's name while recognizing that the switching of the tracks is more rapid than that in the climax search mode.

Figure 13:
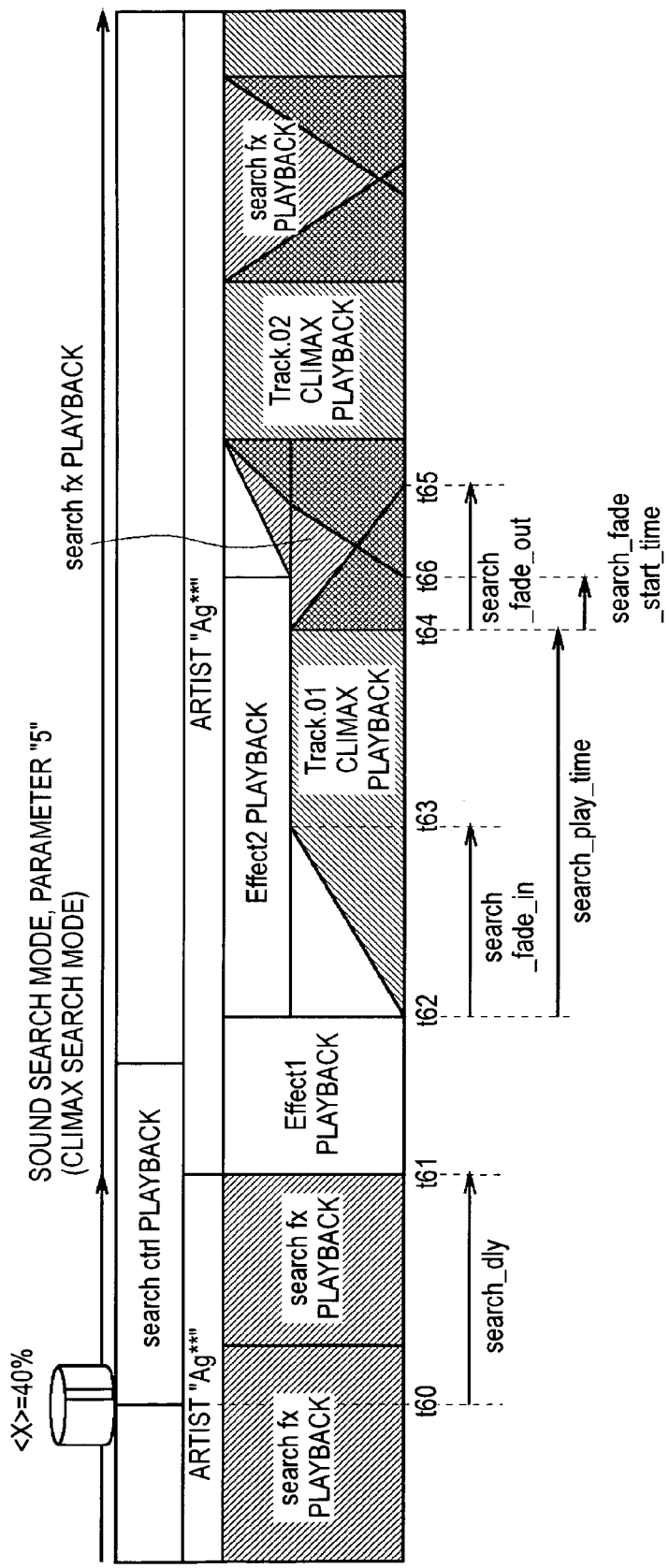
FIG. 13 is a timing diagram illustrating the playback control (7) in the sound search mode.

As shown in FIG. 13, at time t60 in the course of selecting the artist's name "Ag**" in the artist search mode and playing back the search fx, it is assumed that the rotational operation unit 102 is rotationally operated from a position corresponding to an amount of rotation of about 90% to a position corresponding to an amount of rotation of about 40% by the user.

Since the parameter output from the parameter output unit 113 at this time is changed from "12" to "5", the selection unit 114 and the playback unit 115 detect the rotation of the rotational operation unit 102. Then, the playback unit 115 mixes the sound effect data (search ctrl) for notifying that the rotation of the rotational operation unit 102 is detected with the search fx in the current playback and plays back the mixture.

The selection unit 114 waits from time t60 to time t61 specified by the search_dly. In the meantime, the playback unit 115 continuously plays back the search fx.

When it is determined that the user rotationally operates the rotational operation unit 102 to use the sound search mode on the basis of the fact that the parameter has a value of "1" or more between time t60 and time t61, the selection unit 114 and the playback unit 115 accept the rotating operation at time t61.

When the parameter has a value of "5", the selection unit 114 and the playback unit 115 change the artist search mode to the climax search mode on the basis of the fact that the corresponding search_status has a value of "1", representing the climax search mode.

The selection unit 114 selects the first track (Track. 01) of the first album title out of the album titles grouped into the artist's name "Ag**" selected in the artist search mode at time t61.

Then, the playback unit 115 plays back the sound effect data (Effect 1) for notifying the switching of the group at time t61.

The playback unit 115 plays back the album-title sound data (Effect 2) corresponding to the album title selected by the selection unit 114 at time t62 when the playback of Effect 1 is ended.

In this way, the portable playback apparatus 100 can allow the user to recognize the switched album title by sequentially playing back Effect 1 and Effect 2.

The playback unit 115 starts the playback of the climax part of Track. 01 selected by the selection unit 114 while playing back Effect 2 at time t62. The playback unit 115 performs the fade-in process by increasing the playback volume of the climax part from a value of 0 to a value specified by the search_track_volume between time t62 to time t63 specified by the search_fade_in.

Thereafter, the playback unit 115 continuously plays back the climax part of Track. 01 without changing the playback volume from time t63 to time t64 specified by the search_play_time.

When the playback of Effect 2 overlaps with the playback of the climax part of Track. 01, the playback volume of the climax part is temporarily suppressed so that the announcement due to Effect 2 is well heard in spite of the sound of the climax part.

At time t64, the playback unit 115 mixes the sound effect data (search fx) for notifying the switching of the track with Track. 01 in the current climax playback and plays back the mixture. The playback unit 115 plays back the search fx with the playback volume specified by the search_fx_volume.

At this time, when the playback of Effect 2 overlaps with the playback of the search fx, the playback volume of the search fx is temporarily suppressed so that the announcement due to Effect 2 is well heard in spite of the sound effect of the search fx.

When the playback of Effect 2 is ended, the playback volume of the climax part and the playback volume of the search fx are slowly returned to the values of the search_track_volume and the search_fx_volume with the fade-in.

The playback unit 115 performs the fade-out process by decreasing the playback volume of the climax part of Track. 01 up to 0 between time t64 and time t65 specified by the search_fade_out while playing back the search fx. The playback unit 115 ends the playback of the climax part of Track. 01 at time t65.

The selection unit 114 selects subsequent music data (for example, Track. 02) between time t64 and time t66 specified by the search_fade_start_time. Then, the playback unit 115 starts the playback of the climax part of Track. 02 selected by the selection unit 114 at time t66.

In this way, when the artist search mode is changed to the climax search mode, the portable playback apparatus 100 selects one track grouped into the artist's name selected in the artist search mode and sequentially plays back the climax parts from the selected track.

Accordingly, the portable playback apparatus 100 can allow the user to smoothly progress from the search of the desired artist's name to the search of the desired track grouped into the desired artist's name.

Although it has been described that the artist search mode is changed to the climax search mode, the processes after time t61 in FIG. 13 are also performed when the tracks grouped into a certain artist's name are switched to the tracks grouped into the next artist's name in the climax search mode.

The invention is not limited to the case, but the above-mentioned processes are performed when the tracks grouped into a certain album title are switched to the tracks grouped into the next album title in the climax search mode.

Figure 14:
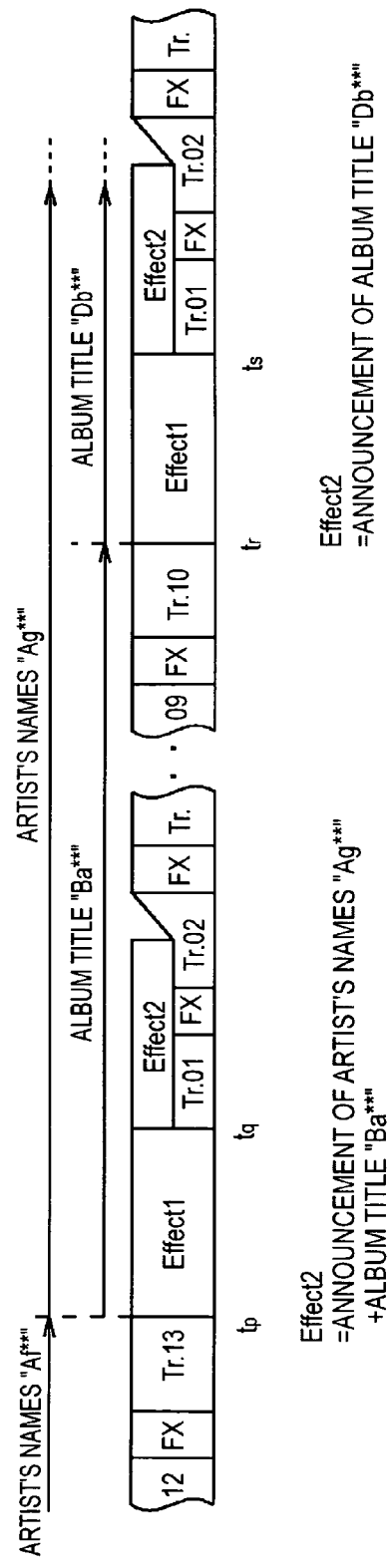
FIG. 14 is a timing diagram illustrating the playback control (8) in the sound search mode.

For example, as schematically shown in FIG. 14, the track selected by the selection unit 114 in the climax search mode is switched from the track grouped into the artist's name "Af" to the track grouped into the next artist's name "Ag" at time tp. At this time, the selection unit 114 selects the first track (Tr. 01) of the first album title "Ba" grouped into the artist's name "Ag".

Then, the playback unit 115 plays back the sound effect data (Effect 1) for notifying the switching of the group. The playback unit 115 starts the playback of the climax part of Tr. 01 selected by the selection unit 114 at time tq when the playback of Effect 1 is ended. The playback unit 115 plays back the sound data (Effect 2) for announcing the album title "Ba" into which Tr. 01 is grouped and the artist's name "Ag" into which the album title "Ba**" is grouped along with Tr. 01 at time tq.

In this case, Effect 2 includes the artist-name sound data and the album-title sound data. By playing back Effect 2 along with the climax part of the track when the group of the tracks is switched, the portable playback apparatus 100 can allow the user to easily recognize what track of what album of what artist the track is switched to.

Thereafter, the selection unit 114 sequentially switches the tracks selected in the track number order and the playback unit 115 sequentially switches the climax playback of the tracks.

It is assumed that the track selected by the selection unit 114 is switched from the track grouped into the album title "Ba" to the track grouped into the next album title "Db" at time tr. In this case, the selection unit 114 selects the first track (Tr. 01) of the album title "Db**".

Then, the playback unit 115 plays back the sound effect data (Effect 1) for notifying the switching of the group. The playback unit 115 starts the playback of the climax part of Tr. 01 selected by the selection unit 114 at time ts when the playback of Effect 1 is ended. The playback unit 115 plays back the sound data (Effect 2) for announcing the album title "Db**" into which Tr. 01 is grouped along with Tr. 01 at time ts.

In this case, Effect 2 includes only the album-title sound data. By playing back Effect 2 along with the climax part of the track when the group of the tracks is switched, the portable playback apparatus 100 can allow the user to easily recognize what track of what album title the track is switched to.

In this way, when the group of the track to be selected is switched in the climax search mode, the portable playback apparatus 100 plays back the sound data for announcing the group along with the climax part of the track. Accordingly, the portable playback apparatus 100 can allow the user to easily recognize what track of what album of what artist the track is switched to.

As described above, since Effect 2 includes the artist-name sound data or the album-title sound data, the playback time is determined by the length of the artist's name or the album title.

Therefore, as the length of the artist's name or the album title increases, the playback time of Effect 2 is elongated. When the playback time of Effect 2 is elongated, there may occur that the playback of the climax part of all the tracks belonging to a certain album is ended before the playback of Effect 2 is ended.

Figure 15:
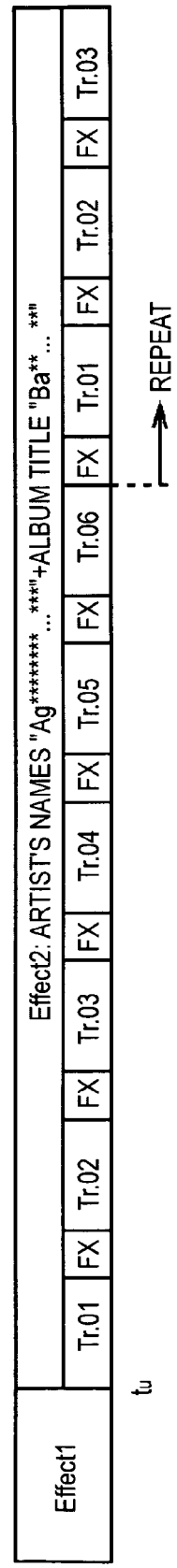
FIG. 15 is a timing diagram illustrating the playback control (9) in the sound search mode.

Accordingly, in order to avoid this problem, the portable playback apparatus 100 continuously plays back the climax part until the playback of Effect 2 is ended, as shown in FIG. 15.

That is, the playback unit 115 of the portable playback apparatus 100 plays back the climax part of the first track (for example, Tr. 01) of the album when the playback of the climax part of the final track (for example, Tr. 06) of a certain album is ended before the playback of Effect 2 is ended. In this way, the playback unit 115 repeats the playback of the climax parts until the playback of Effect 2 is ended. In this case, the playback volume of the climax part is suppressed in the course of playing back Effect 2.

Accordingly, in the portable playback apparatus 100, it is possible to prevent the playback of the track corresponding to the announcement from ending in the course of playing back the announcement based on Effect 2.

Figure 16:
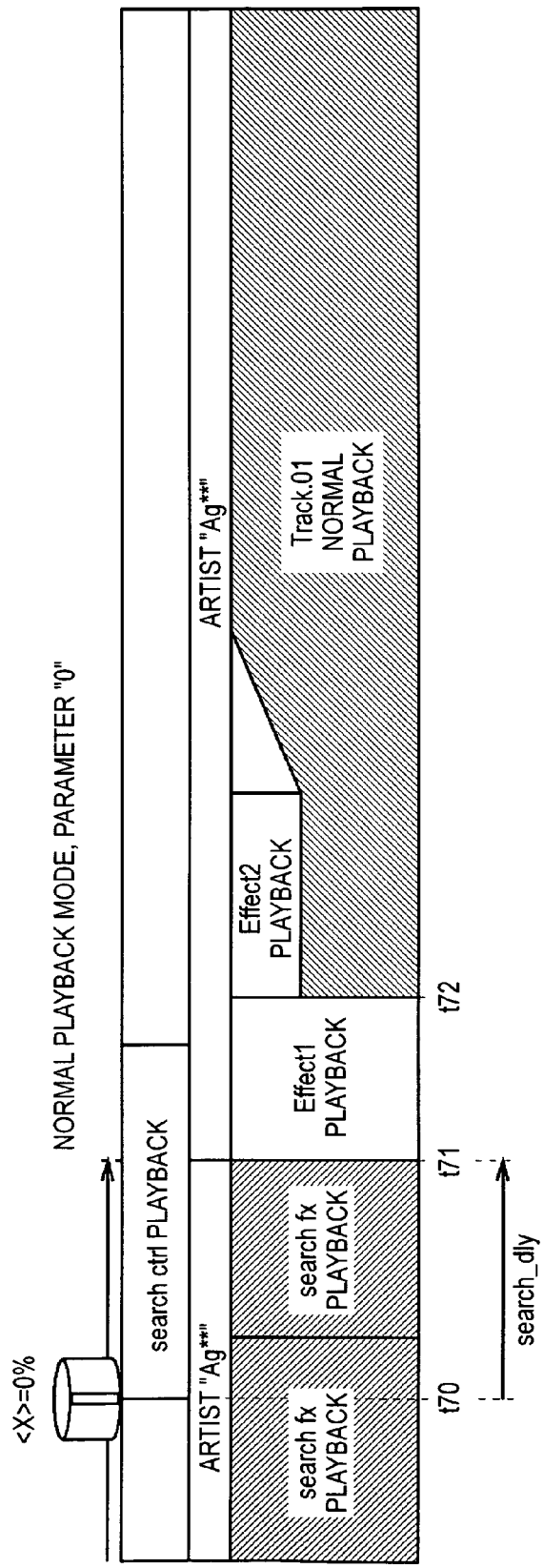
FIG. 16 is a timing diagram illustrating the playback control (10) in the sound search mode.

As shown in FIG. 16, at time t70 in the course of selecting the artist's name "Ag" in the artist search mode and playing back the search fx, it is assumed that the rotational operation unit 102** is returned from a position corresponding to an amount of rotation of about 90% to the reference position by the user.

Since the parameter output from the parameter output unit 113 at this time is changed from a value of "12" to "0", the selection unit 114 and the playback unit 115 detect the rotation of the rotational operation unit 102. Then, the playback unit 115 mixes the sound effect data (search ctrl) for notifying that the rotation of the rotational operation unit 102 is detected with the search fx in the current playback and plays back the mixture.

The selection unit 114 waits from time t70 to time t71 specified by the search_dly. In the meantime, the playback unit 115 continuously plays back the search fx.

When it is determined that the user rotationally operates the rotational operation unit 102 to use the normal playback mode on the basis of the fact that the parameter has a value of "0" at time t71, the selection unit 114 and the playback unit 115 accepts the rotating operation at time t71. The selection unit 114 and the playback unit 115 are changed from the artist search mode to the normal playback mode.

The selection unit 114 selects the first track (Track. 01) of the first album title out of the album titles grouped into the artist's name "Ag" selected in the artist search mode at time t71**.

Then, the playback unit 115 plays back the sound effect data (Effect 1) for notifying the switching of the group at time t71.

The playback unit 115 plays back the album-title sound data (Effect 2) corresponding to the album title selected by the selection unit 114 at time t72 when the playback of Effect 1 is ended.

In this way, the portable playback apparatus 100 can allow the user to recognize the switched album title by sequentially playing back Effect 1 and Effect 2.

The playback unit 115 starts the normal playback of Track. 01 selected by the selection unit 114 while playing back Effect 2 at time t72. In the part where the playback of Effect 2 overlaps with the playback of Track. 01, the playback volume of Track. 01 is temporarily suppressed so that the announced sound due to Effect 2 is well heard in spite of the playback of Track. 01.

When the playback of Effect 2 is ended, the playback volume of Track. 01 is slowly returned to the values of the original volume with the fade-in.

In this way, when the artist search mode is changed to the normal playback mode, the portable playback apparatus 100 selects one track grouped into the artist's name selected in the artist search mode and sequentially plays back the selected track.

Accordingly, the portable playback apparatus 100 can allow the user to smoothly progress from the search of the desired artist's name to the playback of the track grouped into the artist's name.

Figure 17:
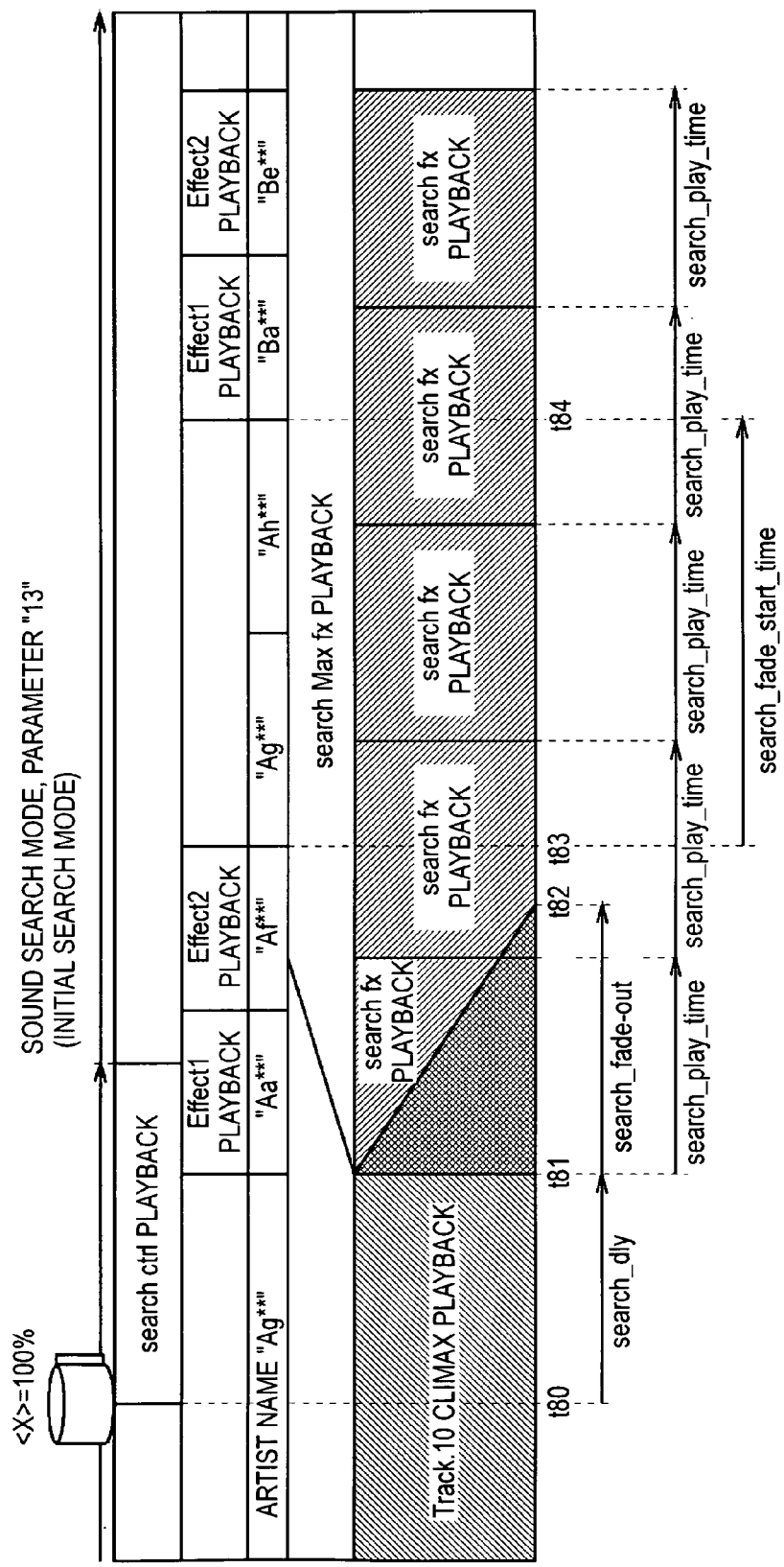
FIG. 17 is a timing diagram illustrating the playback control (11) in the sound search mode.

As shown in FIG. 17, at time t80 in the course of playing back the climax part of Track. 10 grouped into the artist's name "Ag" in the climax search mode, it is assumed that the rotational operation unit 102** is rotationally operated up to a position corresponding to an amount of rotation of about 100% by the user.

Since the parameter output from the parameter output unit 113 at this time is changed to "13", the selection unit 114 and the playback unit 115 detect the rotation of the rotational operation unit 102. Then, the playback unit 115 mixes the sound effect data (search ctrl) for notifying that the rotation of the rotational operation unit 102 is detected with Track. 10 of which the climax is currently played back and plays back the mixture.

The selection unit 114 waits from time t80 to time t81 specified by the search_dly. In the meantime, the playback unit 115 continuously plays back the climax of Track. 10.

When it is determined that the user rotationally operates the rotational operation unit 102 to use the sound search mode on the basis of the fact that the parameter has a value of "1" or more between time t80 and time t81, the selection unit 114 and the playback unit 115 accepts the rotating operation at time t81.

When the parameter has a value of "13", the selection unit 114 and the playback unit 115 operate in the initial search mode on the basis of the fact that the corresponding search_status is a value of "3", representing the initial search mode.

The selection unit 114 selects the initial "A" into which the artist's name "Ag" of Track. 10 of which the climax part is played back is grouped at time t81. The playback unit 115 sequentially plays back the sound effect data (Effect 1) for notifying the switching of the group and the initial sound data (Effect 2) corresponding to the initial selection by the selection unit 114** at time t81.

In this way, the portable playback apparatus 100 can allow the user to recognize what initial it is switched to by sequentially playing back Effect 1 and Effect 2.

The playback unit 115 repeatedly plays back the search fx for notifying the switching of the track at time t81 at the interval specified by the search_play_time. The search_play_time is a value corresponding to the parameter ("13" in this case) output from the parameter output unit 113.

Since the switching of the track is not carried out in the initial search mode, the search fx is not to notify the switching of the track, but to notify that the switching of the track is more rapid than that in the artist search mode. Therefore, the playback interval of the search fx is set to be shorter than the playback interval in the artist search mode.

The playback unit 115 performs the fade-out process by decreasing the playback volume of the climax part of Track. 10 to 0 between time t81 and time t82 specified by the search_fade_out. The playback unit 115 ends the playback of the climax part of Track. 10 at time t82. Since the search_fade_out is invalid in the artist search mode, the search_fade_out in the climax search mode just before being switched to the artist search mode is used.

The playback unit 115 starts the playback of the sound effect data (also referred to as "search_MAX_fx") for notifying the initial search mode, that is, the search mode with the highest speed, at time t81 and performs the fade-in process.

The playback unit 115 mixes Effect 1 and Effect 2 with the search fx, the climax part of Track. 10, and the search_MAX_fx and plays back the mixture.

Thereafter, when the playback of Effect 2 by the playback unit 115 is ended at time t83, the selection unit 114 selects the next initial "B" between time t83 and time t84 specified by the search_fade_start_time. The search_fade_start_time is a value corresponding to the parameter ("13" in this case) output from the parameter output unit 113.

The switching interval of the initial specified by the search_fade_start_time is set to be longer than the switching interval of the track specified by the search fx.

The playback unit 115 sequentially plays back the sound effect data (Effect 1) for notifying the switching of the initial and the initial sound data (Effect 2) corresponding to the initial selected by the selection unit 114 at time t84.

The playback unit 115 mixes Effect 1 and Effect 2 with the search fx and the search_MAX_fx and plays back the mixture.

In this way, in the initial search mode, the portable playback apparatus 100 sequentially plays back the initial sound data while sequentially switching the initial to be selected.

Accordingly, the portable playback apparatus 100 can allow the user to easily search for the desired initial while recognizing the selected initial with the sound.

In the initial search mode, the portable playback apparatus 100 repeatedly plays back the sound effect data (search fx) representing the switching interval of the tracks at an interval shorter than the playback interval in the artist search mode.

Accordingly, the portable playback apparatus 100 can allow the user to search for the artist's name while recognizing that the switching of the tracks is more rapid than that in the artist search mode.

Actually, the playback interval of the search fx is set to decrease as the amount of rotation of the rotational operation unit 102 increases. Therefore, the portable playback apparatus 100 can allow the user to recognize that the switching of the tracks is rapid as the amount of rotation of the rotational operation unit 102 increases, and thus can provide the more intuitive search operation to the user.

Figure 18:
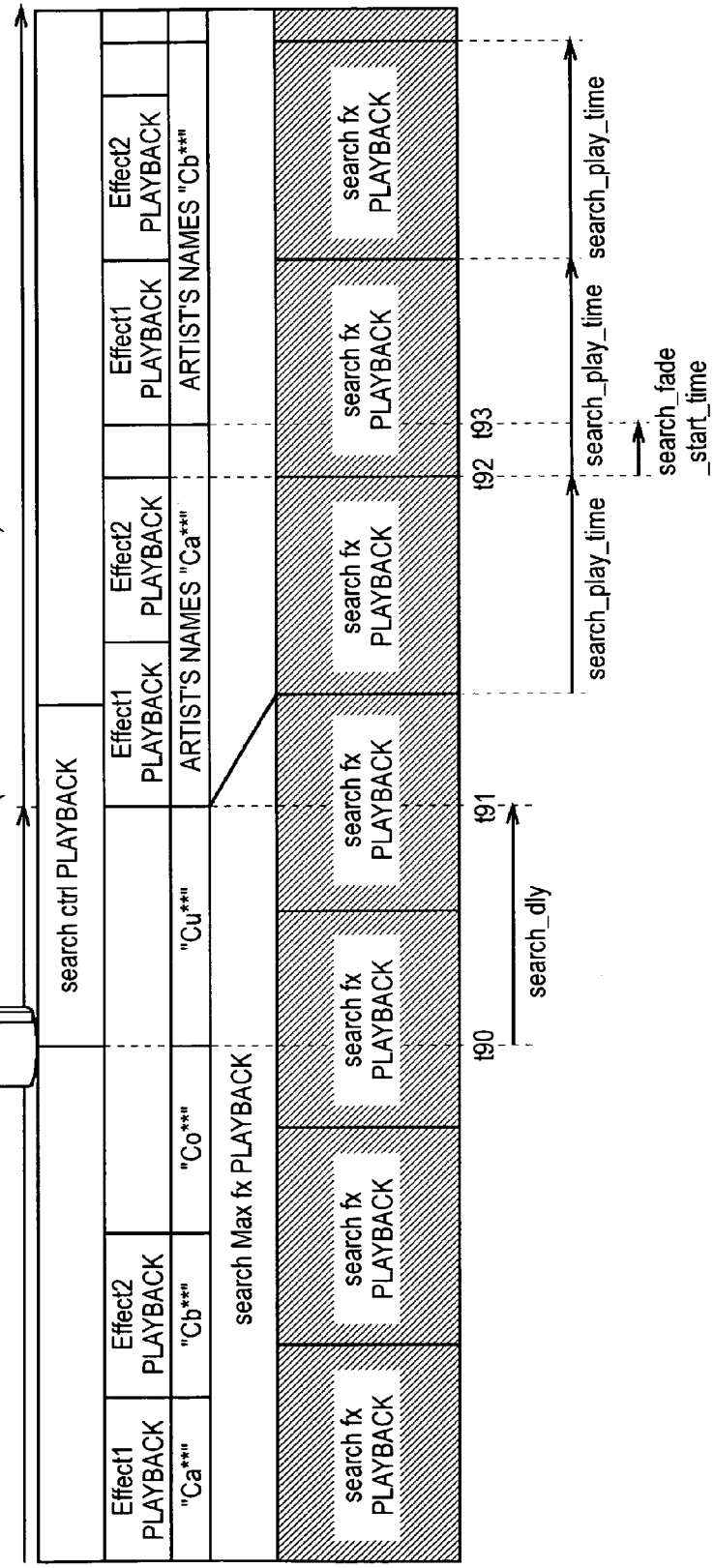
FIG. 18 is a timing diagram illustrating the playback control (12) in the sound search mode.

As shown in FIG. 18, at time t90 in the course of selecting the initial "C" in the initial search mode and playing back the search fx and the search_MAX_fx, it is assumed that the rotational operation unit 102 is rotationally operated from a position corresponding to an amount of rotation of about 100% to a position corresponding to an amount of rotation of about 90%.

Since the parameter output from the parameter output unit 113 at this time is changed from a value of "13" to "12", the selection unit 114 and the playback unit 115 detect the rotation of the rotational operation unit 102. Then, the playback unit 115 mixes the sound effect data (search ctrl) for notifying that the rotation of the rotational operation unit 102 is detected with the search fx and the search_MAX_fx in the current playback and plays back the mixture.

The selection unit 114 waits from time t90 to time t91 specified by the search_dly. In the meantime, the playback unit 115 continuously plays back the search fx and the search_MAX_fx.

When it is determined that the user rotationally operates the rotational operation unit 102 to use the sound search mode on the basis of the fact that the parameter has a value of "1" or more between time t90 and time t91, the selection unit 114 and the playback unit 115 accepts the rotating operation at time t91.

When the parameter has a value of "12", the selection unit 114 and the playback unit 115 change the initial search mode to the artist search mode on the basis of the fact that the corresponding search_status has a value of "2", representing the artist search mode.

The selection unit 114 selects the first artist's name (for example, "Ca**") out of the initials grouped into the initial "C" selected in the initial search mode at time t91.

The playback unit 115 sequentially plays back the sound effect data (Effect 1) for notifying the switching of the group and the artist-name sound data (Effect 2) corresponding to the artist's name selected by the selection unit 114 at time t91.

In this way, the portable playback apparatus 100 can allow the user to recognize what artist's name it is switched to by sequentially playing back Effect 1 and Effect 2.

The playback unit 115 performs the fade-out process of the search_MAX_fx at time t91 and ends the playback of the search_MAX_fx.

The playback unit 115 repeatedly plays back the search fx for notifying the switching of the track after time t91 at the interval specified by the search_play_time. The search_play_time is a value corresponding to the parameter ("12" in this case) output from the parameter output unit 113.

Therefore, the playback interval of the search fx is set to be longer than the playback interval in the initial search mode.

Thereafter, when the playback of Effect 2 by the playback unit 115 is ended at time t92, the selection unit 114 selects the next artist's name "Cb**" between time t92 and time t93 specified by the search_fade_start_time. The search_fade_start_time is a value corresponding to the parameter ("12" in this case) output from the parameter output unit 113.

The playback unit 115 sequentially plays back the sound effect data (Effect 1) for notifying the switching of the artists' names and the artist-name sound data (Effect 2) corresponding to the artist's name selected by the selection unit 114 at time t93.

The playback unit 115 mixes Effect 1 and Effect 2 with the search fx and plays back the mixture.

In this way, when the initial search mode is changed to the artist search mode, the portable playback apparatus 100 selects one artist's name grouped into the initial selected in the initial search mode and sequentially plays back the artist-name sound data.

Accordingly, the portable playback apparatus 100 can allow the user to smoothly progress from the search of the initial to the search of the artist's name grouped into the initial.

Figure 19:
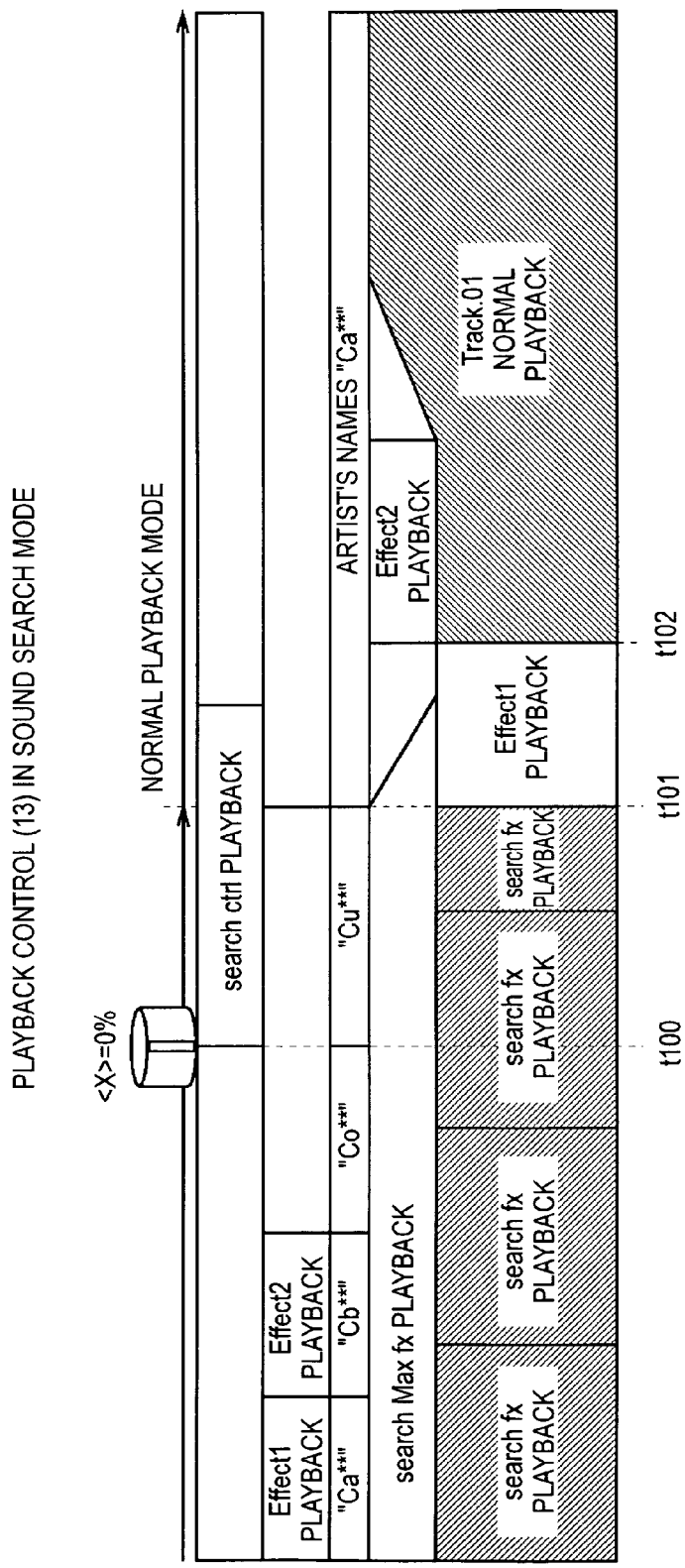
FIG. 19 is a timing diagram illustrating the playback control (13) in the sound search mode.

As shown in FIG. 19, at time t100 in the course of selecting the initial "C" in the initial search mode and playing back the search fx and the search_MAX_fx, it is assumed that the rotational operation unit 102 is rotationally operated from a position corresponding to an amount of rotation of about 100% to the reference position.

Since the parameter output from the parameter output unit 113 at this time is changed from a value of "13" to "0", the selection unit 114 and the playback unit 115 detect the rotation of the rotational operation unit 102. Then, the playback unit 115 mixes the sound effect data (search ctrl) for notifying that the rotation of the rotational operation unit 102 is detected with the search fx and the search_MAX_fx in the current playback and plays back the mixture.

The selection unit 114 waits from time t100 to time t101 specified by the search_dly. In the meantime, the playback unit 115 continuously plays back the search fx and the search_MAX_fx.

When it is determined that the user rotationally operates the rotational operation unit 102 to use the normal playback mode on the basis of the fact that the parameter has a value of "0" at time t101, the selection unit 114 and the playback unit 115 accepts the rotating operation at time t101. The selection unit 114 and the playback unit 115 change the initial search mode to the normal playback mode.

The selection unit 114 selects the first track (Track. 01) of the first album title with the first artist's name (for example, "Ca**") grouped into the initial "C" selected in the initial search mode at time t101.

The playback unit 115 sequentially plays back the sound effect data (Effect 1) for notifying the switching of the group at time t101 and performs the fade-out process of the search_MAX_fx and ends the playback of the search_fx.

The playback unit 115 plays back the sound data (Effect 2) corresponding to the artist's name and the album title selected by the selection unit 114 at time t102 when the playback of Effect 1 is ended. That is, Effect 2 includes the artist-name sound data and the album-title sound data.

In this way, the portable playback apparatus 100 can allow the user to recognize what album title of what artist's name the track is switched to by sequentially playing back Effect 1 and Effect 2.

The playback unit 115 starts the normal playback of Track. 01 selected by the selection unit 114 while playing back Effect 2 at time t102. In the part where the playback of Effect 2 overlaps with the playback of Track. 01, the playback volume of Track. 01 is temporarily suppressed so that the announcement sound due to Effect 2 is well heard in spite of the playback of Track. 01.

When the playback of Effect 2 is ended, the playback volume of Track. 01 is slowly returned to the values of the original volume with the fade-in.

In this way, when the initial search mode is changed to the normal playback mode, the portable playback apparatus 100 selects one track grouped into the artist's name of the initial selected in the initial search mode and normally plays back the selected track.

Accordingly, the portable playback apparatus 100 can allow the user to smoothly progress from the search of the initial to the playback of the track grouped into the artist's name of the initial.

As described above, the portable playback apparatus 100 changes the search mode and the playback time, the playback interval, and the playback volume of various sound data depending on the amount of rotation of the rotational operation unit 102.

1-2-4. Mode Switching Process Flow

Figure 20:
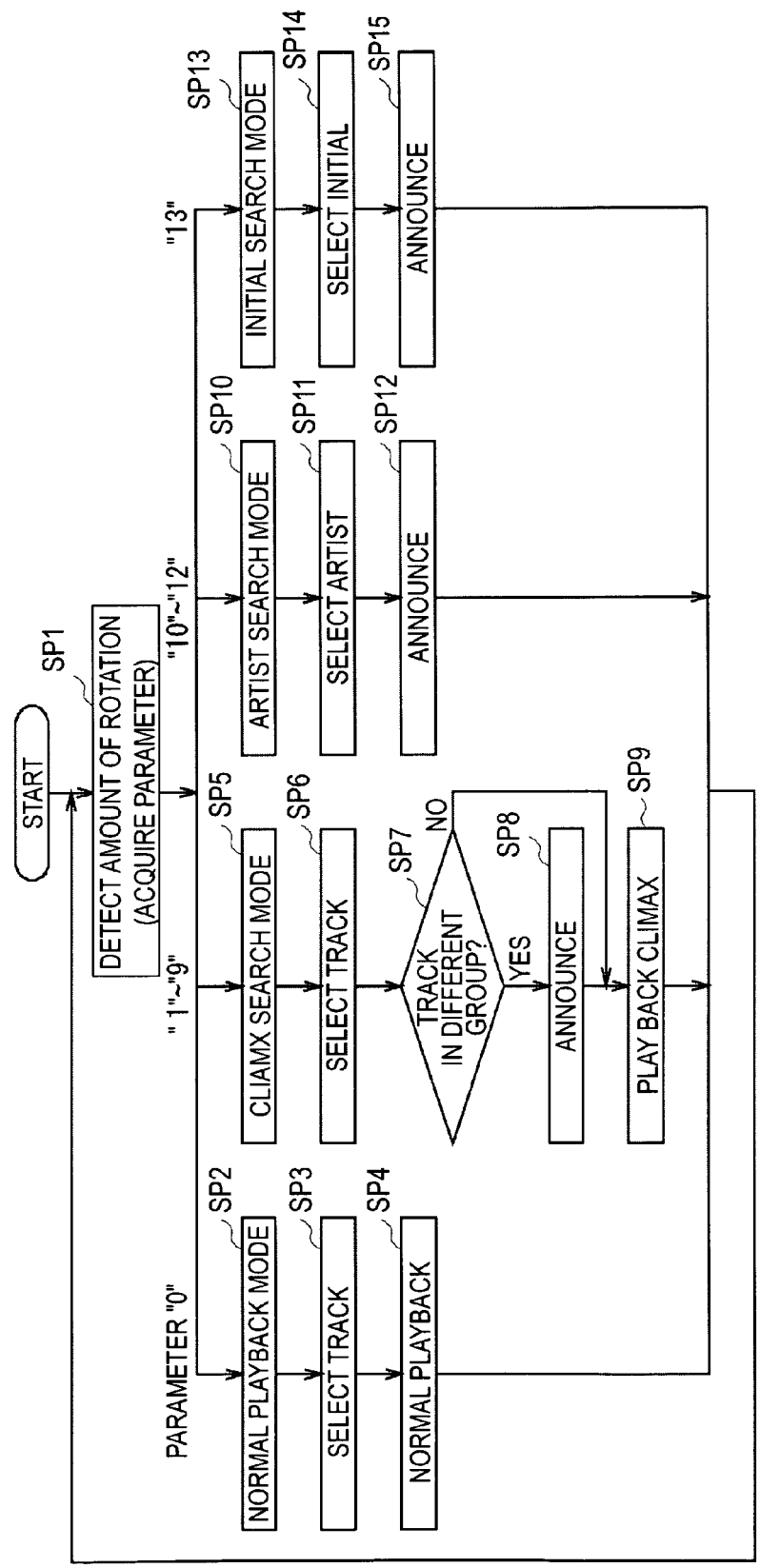
FIG. 20 is a flowchart illustrating the flow of a mode switching process.

A process flow (referred to as "mode switching process flow") RT1 of switching a mode (normal playback mode, climax search mode, artist search mode, initial search mode) in the portable playback apparatus 100 will be described in brief with reference to the flowchart shown in FIG. 20. The details of this process refer to the above-mentioned description.

The control unit 110 of the portable playback apparatus 100 starts the mode switching process flow RT1 when the portable playback apparatus 100 is started up. When the mode switching process flow RT1 is started, the selection unit 114 and the playback unit 115 of the portable playback apparatus 100 acquire the parameter representing the amount of rotation of the rotational operation unit 102 from the parameter output unit 113 in step SP1.

When the parameter has a value of "0", the selection unit 114 and the playback unit 115 are in the normal playback mode in step SP2. In step SP3, the selection unit 114 selects a track. In step SP4, the playback unit 115 starts the normal playback of the track. The selection unit 114 and the playback unit 115 perform the process of step SP1 again.

When the parameter is a value in the range of "1" to "9", the selection unit 114 and the playback unit 115 are in the climax search mode of the sound search mode in step SP5. In step SP6, the selection unit 114 selects a track. In step SP7, the playback unit 115 determines whether the selected track belongs to a group (a different artist's name or a different album title) different from the previously selected track.

When the determination result in step SP7 is positive, the playback unit 115 starts the playback of the announcement of the sound data corresponding to the group of the selected track in step SP8 and then performs the process of step SP9.

On the contrary, when the determination result in SP7 is negative on the basis of the fact that the selected track belongs to the same group as the previously selected track, the playback unit 115 performs the process of step SP9 without playing back the announcement of the sound data.

In step SP9, the playback unit 115 starts the playback of the climax part of the selected track. The selection unit 114 and the playback unit 115 perform the process of step SP1 again.

When the parameter is a value in the range of "10" to "12", the selection unit 114 and the playback unit 115 are in the artist search mode of the sound search mode in step SP10. In step SP11, the selection unit 114 selects an artist's name. In step SP12, the playback unit 115 starts the playback of the announcement of the sound data corresponding to the artist's name. The selection unit 114 and the playback unit 115 perform the process of step SP1 again.

When the parameter has a value of "13", the selection unit 114 and the playback unit 115 are in the initial search mode of the sound search mode in step SP13. In step SP14, the selection unit 114 selects an initial. In step SP15, the playback unit 115 starts the playback of the announcement of the sound data corresponding to the initial. The selection unit 114 and the playback unit 115 perform the process of step SP1 again.

The portable playback apparatus 100 can switch the mode by the use of the mode switching process flow RT1.

1-2-5. Operations and Advantages of First Embodiment

When the rotational operation unit 102 is rotationally operated, the parameter output unit 113 of the portable playback apparatus 100 outputs the parameter representing the amount of rotation.

The selection unit 114 and the playback unit 115 of the portable playback apparatus 100 operate in the climax search mode when the parameter has a value in the range of "1" to "9".

That is, in the climax search mode, the selection unit 114 sequentially selects the tracks on the basis of the relevant information database Db stored in the storage unit 112. On the other hand, the playback unit 115 notifies the user what track is selected by playing back the climax parts of the tracks sequentially selected by the selection unit 114.

The selection unit 114 and the playback unit 115 of the portable playback apparatus 100 operate in the artist search mode when the parameter has a value in the range of "10" to "12".

That is, in the artist search mode, the selection unit 114 sequentially selects the artists' names grouping the tracks on the basis of the relevant information database Db stored in the storage unit 112. On the other hand, the playback unit 115 notifies the user which artist's name is selected by playing back the announcement of the sound data of the artists' names sequentially selected by the selection unit 114.

The selection unit 114 and the playback unit 115 operate in the initial search mode when the parameter has a value of "13".

That is, in the initial search mode, the selection unit 114 sequentially selects the initials grouping the artists' names on the basis of the relevant information database Db stored in the storage unit 112. On the other hand, the playback unit 115 notifies the user what initial is selected by playing back the announcement of the sound data of the initials sequentially selected by the selection unit 114.

Accordingly, the portable playback apparatus 100 can switch the selection target to the tracks or the artist's names grouping the tracks or the initials thereof depending on the amount of rotation by the use of only the rotational operation of the rotational operation unit 102. The portable playback apparatus 100 can switch the tracks, the artists' names, or the initials to be selected while allowing the user to recognize the selected track, artist's name, or initial with a sound.

In the portable playback apparatus 100, it is assumed in the climax search mode that the track selected by the selection unit 114 is switched from the track grouped into a certain album title to the track grouped into another album title.

Then, the playback unit 115 normally plays back the track while playing back the album-title sound data corresponding to the album title of the track. That is, the playback unit 115 mixes the track with the album-title sound data and plays back the mixture.

Accordingly, the portable playback apparatus 100 can allow the user to easily recognize the album title of the album to which the music piece belongs while listening to the music piece.

According to the above-mentioned configuration, the portable playback apparatus 100 can switch the selection target to the tracks or the artists' names in which the tracks are arranged or the initials thereof depending on the amount of rotation by a single operation of rotating the rotational operation unit 102. The portable playback apparatus 100 can sequentially select the tracks, the artists' names, or the initials while it allows the user to recognize the selected track, artist's name or initial with a sound. In this way, the portable playback apparatus 100 can allow the user to search for a desired track (music data) with only a simple operation and a sound and can allow the user to more easily search for the desired track (music data).

2. Second Embodiment

A second embodiment of the invention will be described. In the second embodiment, a part (to be described later in detail) of the playback control of the portable playback apparatus 100 according to the first embodiment is applied to an apparatus having an operation unit different from the portable playback apparatus 100.

2-1. Outer Configuration of Portable Playback Apparatus

Figure 21:
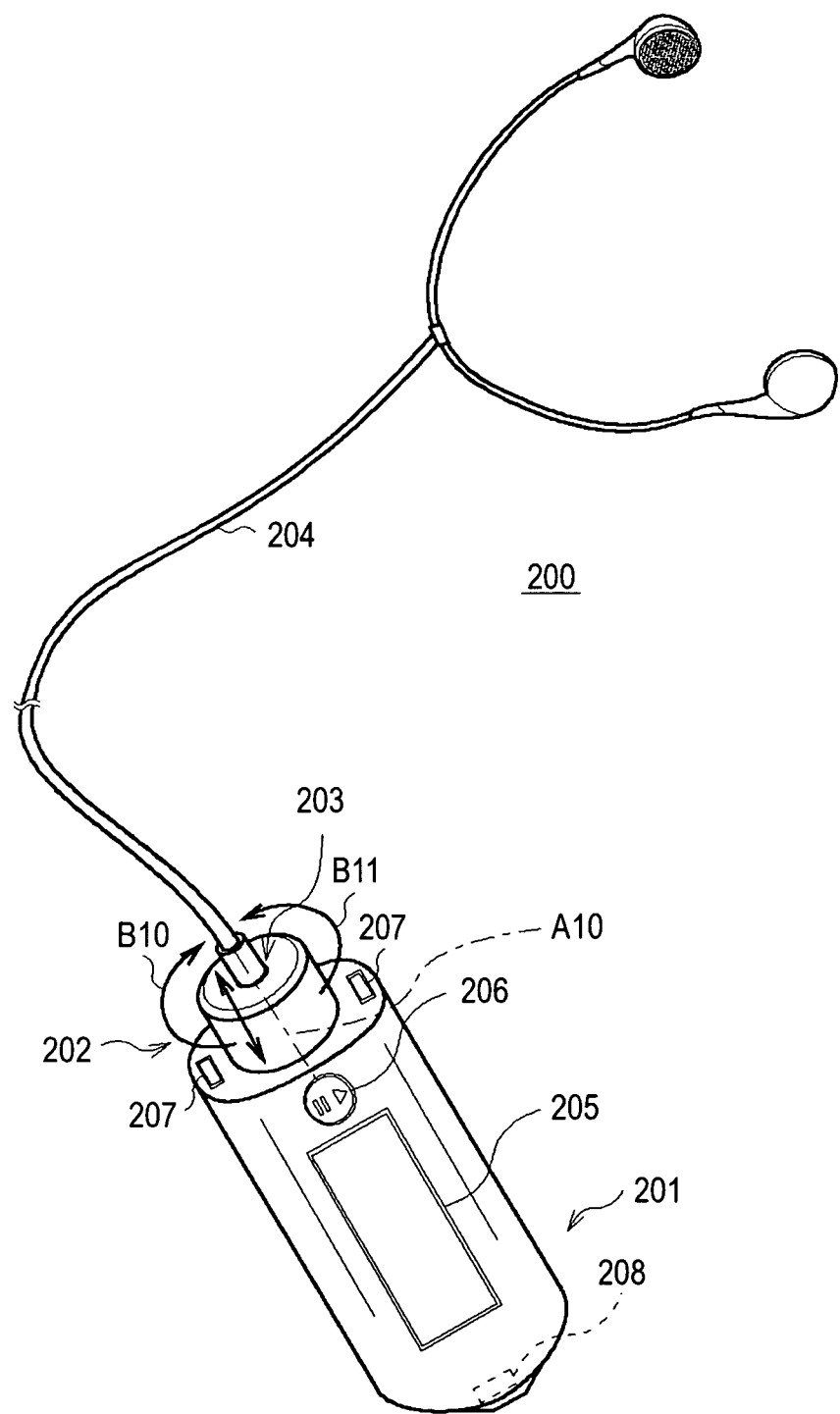
FIG. 21 is a diagram schematically illustrating the outer configuration of a portable playback apparatus according to a second embodiment of the invention.

In FIG. 21, reference numeral 200 represents the outer configuration of a portable playback apparatus according to the second embodiment.

The portable playback apparatus 200 includes a chassis 201 having a substantially flat rectangular shape rounded as a whole. An end portion of the chassis 201 is provided with a rotational operation unit 202 having a substantially columnar shape. The portable playback apparatus 200 has such a size that it can be grasped as a whole, for example, with one hand with the chassis 201 and the rotational operation unit 202.

The rotational operation unit 202 is mounted on the chassis 201 so as to rotate in the clockwise rotating direction indicated by arrow B10 and in the counterclockwise rotating direction indicated by arrow B11 about the center axis A10 in the longitudinal direction of the chassis 201 as the rotational operation unit 202 is viewed from above.

The rotational operation unit 202 is urged to a predetermined reference position by an inner urging member (for example, a spring) and can rotate, for example, in the range of ±30 degrees from the reference position by the user's operation. Here, the counterclockwise rotating direction indicted by arrow B11 is the + direction and the clockwise rotating direction indicated by arrow B10 is the − direction.

The rotational operation unit 202 can be pulled out to a predetermined position in the direction moving away from the chassis 201 and can be pushed in to the original position from the pulled-out position.

The rotational operation unit 202 can perform two types of operations of the rotating operation and the pulling-out and pushing-in operation.

The end portion of the rotational operation unit 202 is provided with an earphone terminal 203 and earphones 204 can be connected to the earphone terminal 203.

The chassis 201 is provided with a display unit 205 for displaying relevant information of the music data, a play/pause button 206, a volume adjusting button 207, and an external connection terminal 208 for connection to an external apparatus (for example, a personal computer).

The portable playback apparatus 200 can be connected to the external apparatus via a cable (not shown) connected to the external connection terminal 208.

When music data is transmitted from the external apparatus connected thereto via the cable, the portable playback apparatus 200 stores the transmitted music data in a storage unit (not shown) in the chassis 201. At this time, like the first embodiment, the relevant information of the music data is also transmitted from the external apparatus and the portable playback apparatus 200 stores the relevant information.

Thereafter, when the cable is separated and the play/pause button 206 is pushed, the portable playback apparatus 200 starts the playback of the music data stored in the storage unit of the chassis 201.

The portable playback apparatus 200 outputs from the earphones 204 connected to the earphone terminal 203 a sound based on a sound signal obtained by playing back the music data. In this way, the portable playback apparatus 200 plays back the music data.

The portable playback apparatus 200 displays the music title, the album title, the artist's name, and the playback time of the music data on the display unit 205 on the basis of the relevant information of the music data in playback.

The portable playback apparatus 200 can switch the selection target from the tracks (music data) to the albums or reversely by the pulling-out and pushing-in operations of the rotational operation unit 202. For example, the selection target is the album title when the rotational operation unit 202 is pulled out and the selection target is the track when it is pushed in.

When the rotational operation unit 202 rotates by a predetermined amount in the state where the rotational operation unit 202 is pulled out, the portable playback apparatus 200 selects the next album title, that is, switches the album title to be selected to the next album title.

When the rotational operation unit 202 rotates by a predetermined amount in the state where the rotational operation unit 202 is pushed in, the portable playback apparatus 200 selects the next track, that is, switches the track to be selected to the next track.

The portable playback apparatus 200 notifies the user what album title it is switched to by playing back the announcement of the sound data, similarly to the first embodiment, at the time of switching the album titles or switching the tracks of the album titles.

Figure 22:
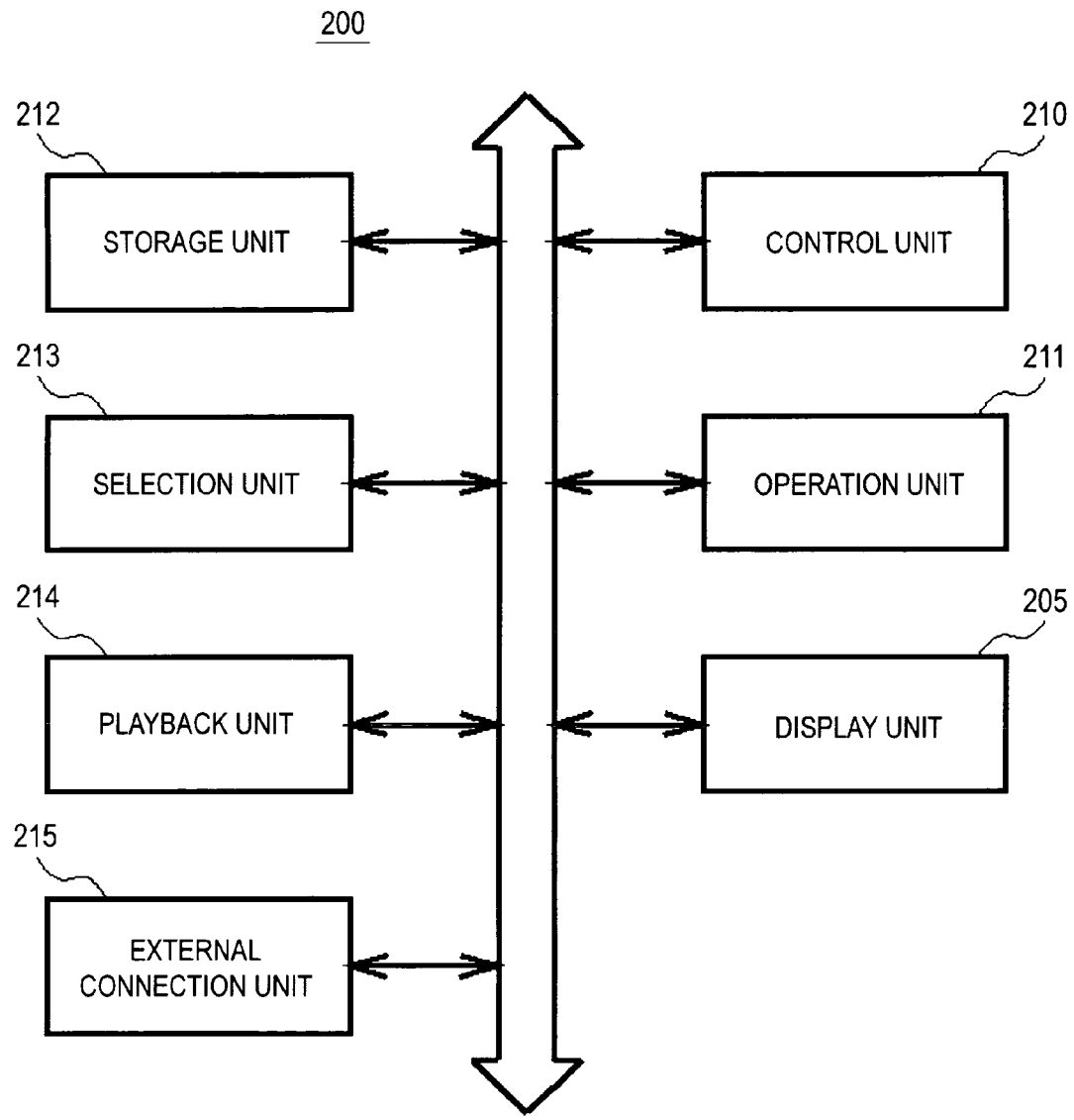
FIG. 22 is a diagram schematically illustrating the inner configuration of the portable playback apparatus according to the second embodiment.

2-2. Inner Configuration (Functional Configuration) of Portable Playback Apparatus The inner configuration of the portable playback apparatus 200 will be described now. As shown in FIG. 22, the portable playback apparatus 200 includes a control unit 210, an operation unit 211, a storage unit 212, a selection unit 213, a playback unit 214, a display unit 205, and an external connection unit 215.

The operation unit 211 includes the above-mentioned rotational operation unit 202, the above-mentioned play/pause button 206, and a volume adjusting button 207. The playback unit 214 includes the above-mentioned earphone terminal 203. The external connection unit 215 includes the above-mentioned external connection terminal 208.

When music data is transmitted from the external apparatus in the state where it is connected to the external apparatus via the external connection unit 215 and the cable, the portable playback apparatus 200 stores the transmitted music data in the storage unit 212.

At this time, relevant information on the music data is transmitted along with the music data from the external apparatus. The portable playback apparatus 200 also stores the relevant information in the storage unit 212. The relevant information includes attribute information such as music titles of the music pieces based on the music data, artists' names, album titles of the music pieces, jacket images, track numbers of the album, and climax positions of the music pieces.

In the portable playback apparatus 200, the control unit 210 constructs the relevant information database Db on the basis of the relevant information, similarly to the portable playback apparatus 100.

The relevant information includes the album-title sound data for announcing the album titles.

Thereafter, when the cable is separated and the play/pause button 206 of the operation unit 211 is pushed, the selection unit 213 of the portable playback apparatus 200 selects one piece of the music data stored in the storage unit 212. Then, the playback unit 214 starts playing back the music data.

The playback unit 214 outputs from the earphones 204 the sound (that is, the music sound) based on the sound signal obtained by playing back the music data. In this way, the portable playback apparatus 200 can allow a user to listen to the music sound based on the music data.

The playback unit 214 adjusts the playback volume of the music data when the volume adjusting button 207 of the operation unit 211 is pushed.

The control unit 210 displays the relevant information of the music data to be played back on the display unit 205.

The selection unit 213 switches the album title or the track to be selected by the rotating operation of the rotational operation unit 202 of the operation unit 210.

Specifically, when the rotational operation unit 202 rotates by a predetermined amount in the state where it is pushed in, the selection unit 213 switches the track to be selected to the next track. Then, the playback unit 214 starts playing back the track selected by the selection unit 213.

Here, the track to be selected by the selection unit 213 is switched from the track grouped into a certain album title to the track grouped into another album title. Then, the playback unit 214 plays back the album-title sound data corresponding to the album title of the track while playing back the selected track.

The playback control at this time is equal to the playback control in the portable playback apparatus 100. That is, the playback unit 214 performs the same playback control as the playback control shown in the timing diagram of FIG. 14.

Specifically, when the track grouped into a certain album title is switched to the track grouped into another album title, the playback unit 214 plays back Effect 1 representing the switching. Thereafter, the playback unit 214 starts the playback of the album-title sound data (Effect 2) corresponding to the album title of the track and starts the normal playback of the track (Track. 01). That is, the playback unit 214 mixes the track with the album-title sound data and plays back the mixture.

When the rotational operation unit 202 rotates by a predetermined amount in the state where it is pulled out, the selection unit 213 switches the album title to be selected to the next album title. Then, the playback unit 214 plays back the album-title sound data corresponding to the album title selected by the selection unit 213. The playback unit 214 sequentially plays back the climax parts of the tracks grouped into the album title while playing back the album-title sound data.

The playback control at this time is equal to the playback control in the portable playback apparatus 100. That is, the playback unit 214 performs the same playback control as the playback control shown in the timing diagram of FIGS. 14 and 15.

Specifically, when a certain album title is switched to another album title, the playback unit 214 plays back Effect 1 representing the switching. Thereafter, the playback unit 214 starts the playback of the album-title sound data (Effect 2) corresponding to the album title of the track and sequentially plays back the climax parts of the tracks grouped into the album title. The playback unit 214 mixes the climax part of the track with the album-title sound data and plays back the mixture.

The playback unit 214 repeatedly plays back the climax parts of the tracks, as shown in the timing diagram of FIG. 15, until the playback of the album-title sound data is ended.

In this way, at the time of switching the album title, the portable playback apparatus 200 plays back the tracks grouped into the album title while announcing the switched album title.

Accordingly, the portable playback apparatus 200 can simultaneously announce the album title and play back the music of the track grouped into the album title.

2-3. Selection Process Flow

Figure 23:
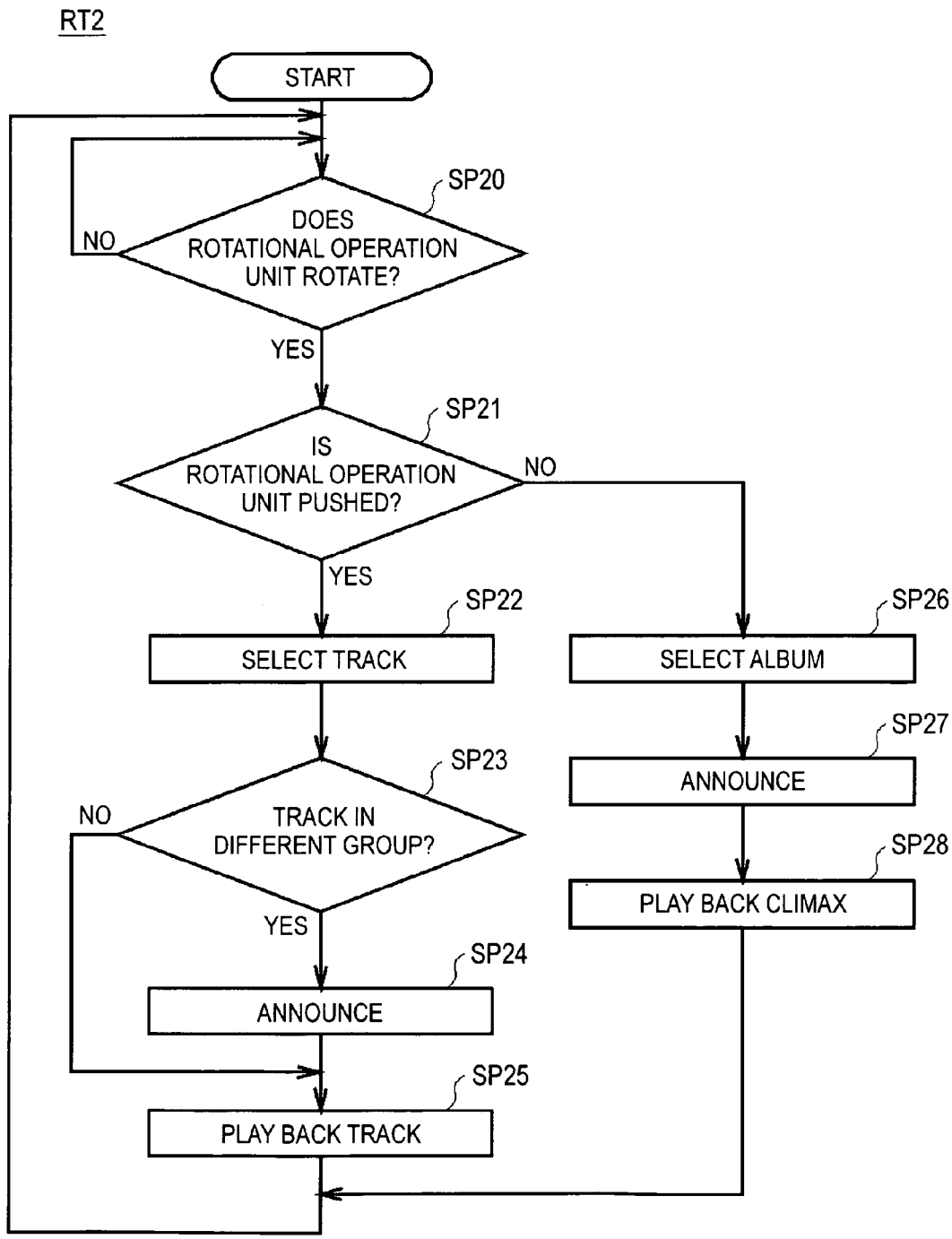
FIG. 23 is a flowchart illustrating the flow of a selection process according to the second embodiment.

A process flow (referred to as "selection process flow") RT2 of selecting the tracks and the albums in the portable playback apparatus 200 will be described in brief with reference to the flowchart shown in FIG. 23. The details of this process are referred to the above-mentioned description.

The control unit 210 of the portable playback apparatus 200 starts the selection process flow RT2 when the portable playback apparatus 200 is started up. When the selection process flow RT2 is started, the control unit 210 of the portable playback apparatus 200 waits for the rotation of the rotational operation unit 202 in step SP20.

When the rotational operation unit 202 rotates, the control unit 210 performs the process of step SP21. In step SP21, the control unit 210 determines whether the rotational operation unit 202 is pushed in.

When the determination result of step SP21 is positive, the control unit 210 notifies the selection unit 213 that the rotational operation unit 202 rotates in the state where it is pushed in.

When it is notified that the rotational operation unit 202 rotates in the state where it is pushed in, the selection unit 213 selects a track in step SP22. In step SP23, the playback unit 214 determines whether the selected track belongs to a group (a different album title) different from the previously selected track.

When the determination result in step SP23 is positive, the playback unit 214 starts the playback of the announced sound data corresponding to the album title of the selected track in step SP24 and then performs the process of step SP25.

On the contrary, when the determination result in SP23 is negative on the basis of the fact that the selected track belongs to the same album title as the previously selected track, the playback unit 214 performs the process of step SP25 without playing back the announced sound data.

In step SP25, the playback unit 214 starts the playback of the selected track. The selection unit 213 and the playback unit 214 perform the process of SP20 again.

When the determination result of step SP21 is negative, the control unit 210 notifies the selection unit 213 that the rotational operation unit 202 rotates in the state where it is pulled out.

When it is notified that the rotational operation unit 202 rotates in the state where it is pulled out, the selection unit 213 selects an album title in step SP26. In step SP27, the playback unit 214 starts the playback of the announced sound data corresponding to the selected album title and then performs the process of step SP28.

In step SP28, the playback unit 214 starts the climax playback of the tracks grouped into the selected album title from the first track. The selection unit 213 and the playback unit 214 perform the process of step SP20 again.

Along this selection process flow RT2, the portable playback apparatus 200 performs the processes for selecting the track and the album.

2-4. Operation and Advantage of Second Embodiment

The selection unit 213 of the portable playback apparatus 200 having the above-mentioned configuration switches the track to be selected when the rotational operation unit 202 rotates in the state where it is pushed in and switches the album title to be selected when it rotates in the state where it is pulled out.

Here, it is assumed that the track selected by the selection unit 213 is switched from the track grouped into a certain album title to the track grouped into another album title.

Then, the playback unit 214 normally plays back the track while playing back the album-title sound data corresponding to the album title of the track. That is, the playback unit 214 mixes the track with the album-title sound data and plays back the mixture.

It is assumed that the album title selected by the selection unit 213 is switched to another album title.

Then, the playback unit 214 sequentially plays back the climax parts of the tracks grouped into the album title from the first track while playing back the album-title sound data corresponding to the album title. That is, the playback unit 214 mixes the climax part of the track with the album-title sound data and plays back the mixture.

Accordingly, the portable playback apparatus 200 can allow the user to easily recognize the album title of the album to which the music piece belongs while allowing the user to listen to the music piece.

According to the above-mentioned configuration, the portable playback apparatus 200 can allow the user to easily recognize the album title of the album to which the music piece belongs while allowing the user to listen to the music piece, thereby further improving the degree of convenience in use.

3. Third Embodiment

A third embodiment of the invention will be described now. In the third embodiment, the portable playback apparatus 100 according to the first embodiment and the playback apparatus 200 according to the second embodiment are embodied by hardware.

Figure 24:
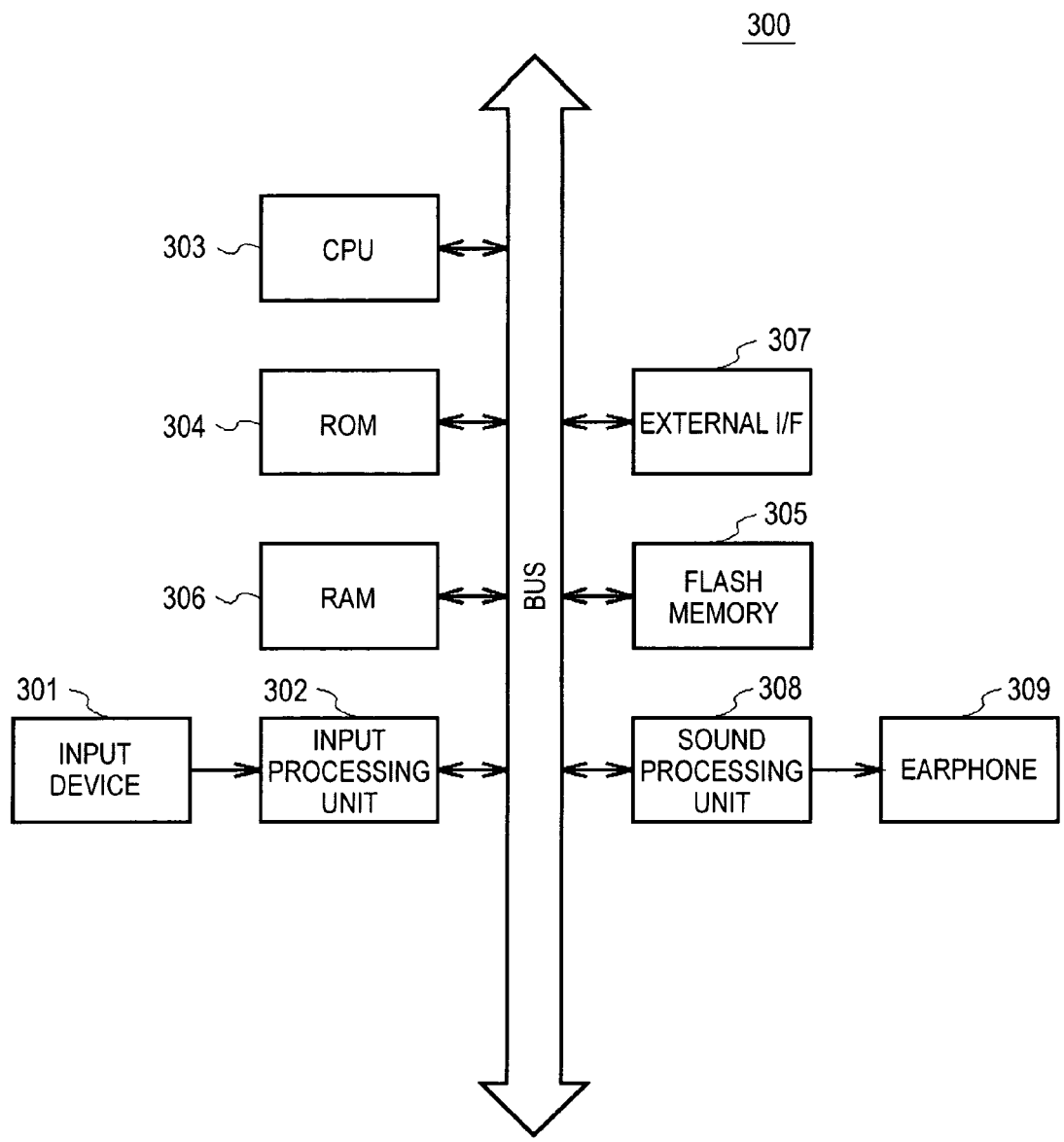
FIG. 24 is a diagram schematically illustrating the hardware configuration (1) of a portable playback apparatus according to a third embodiment of the invention.

A portable playback apparatus 300 shown in FIG. 24 is obtained by embodying the functional configuration of the portable playback apparatus 100 according to the first embodiment by hardware.

When an input device 301 is operated by a user, the portable playback apparatus 300 recognizes the operation by the use of the input device 301 and sends an operation input signal corresponding to the operation to an input processing unit 302.

The input processing unit 302 converts the supplied operation input signal into an operation command and sends the operation command to a CPU (Central Processing Unit) 303 via a bus.

The CPU 303 loads various programs stored in a ROM (Read Only Memory) 304 or a flash memory 305 in advance to a RAM (Random Access Memory) 306 via the bus.

The CPU 303 performs various processes (such as the mode switching process) corresponding to the operation command sent from the input processing unit 302 by controlling the entire units in accordance with various programs loaded to the RAM 306.

Specifically, the CPU 303 stores in the flash memory 305 various data such as music data or announced sound data transmitted from an external apparatus connected thereto via an external interface 307.

The CPU 303 reads the music data or the announced sound data from the flash memory 305 in accordance with the operation command sent from the input processing unit 302 and inputs the data to the sound processing unit 308.

The sound processing unit 308 outputs a music piece or an announced sound obtained by playing back the input music data or the input announced sound data via an earphone 309.

In the portable playback apparatus 300, as described above, the CPU 303 performs various processes in accordance with various programs stored in advance in the ROM 304 or the flash memory 305.

Therefore, by properly selecting various programs to be stored in the ROM 304 or the flash memory 305 depending on the functions and processes of the portable playback apparatus 100, the CPU 303 can serve as the control unit 110 of the portable playback apparatus 100. The CPU 303 can serve as the selection unit 114 of the portable playback apparatus 100.

The input device 301 can serve as the operation unit 111 of the portable playback apparatus 100. The input processing unit 302 can serve as the parameter output unit 113 of the portable playback apparatus 100. Here, it is assumed that the input device 301 is selected so as to operate in the same way as the operation unit 111 of the portable playback apparatus 100. It is assumed that the input processing unit 302 is selected so as to output the parameter in the same way as the parameter output unit 113.

The flash memory 305 can serve as the storage unit 112 of the portable playback apparatus 100. The sound processing unit 308 and the earphone 309 can serve as the playback unit 115 of the portable playback apparatus 100. The external interface 307 can serve as the external connection unit 116 of the portable playback apparatus 100.

Therefore, the portable playback apparatus 300 can realize various functions of the portable playback apparatus 100 having the functional configurations by the hardware configuration shown in FIG. 24 and thus the same advantage as the first embodiment can be obtained.

In the third embodiment, the CPU 303 of the portable playback apparatus 300 performs various processes in accordance with various programs stored in advance in the ROM 304 or the flash memory 305.

The invention is not limited to this configuration, but various programs may be recorded on a recording medium such as a CD (Compact Disc) or a DVD (Digital Versatile Disc) and the CPU 303 may read various program from the recording medium and perform various processes.

In this case, a drive (not shown) can be connected to the external interface 307 and the CPU 303 can read various programs from the recording medium via the drive. Various programs may be installed in the flash memory 305 from the recording medium.

On the other hand, a portable playback apparatus 400 shown in FIG. 25 is obtained by embodying the functional configuration of the portable playback apparatus 200 according to the second embodiment by hardware.

The portable playback apparatus 400 has a hardware configuration obtained by adding a display processing unit 401 and a display 402 to the hardware configuration of the portable playback apparatus 300.

That is, when an input device 301 is operated by a user, the portable playback apparatus 400 recognizes the operation by the use of the input device 301 and sends an operation input signal corresponding to the operation to an input processing unit 302.

The input processing unit 302 converts the supplied operation input signal into an operation command and sends the operation command to a CPU (Central Processing Unit) 303 via a bus.

The CPU 303 loads various programs stored in a ROM (Read Only Memory) 304 or a flash memory 305 in advance to a RAM (Random Access Memory) 306 via the bus.

The CPU 303 performs various processes (such as the selection process) corresponding to the operation command sent from the input processing unit 302 by controlling the entire units in accordance with various programs loaded to the RAM 306.

Specifically, the CPU 303 stores in the flash memory 305 various data such as music data or relevant information thereof or announced sound data transmitted from an external apparatus connected thereto via an external interface 307.

The CPU 303 reads the music data or the announced sound data from the flash memory 305 in accordance with the operation command sent from the input processing unit 302 and inputs the data to the sound processing unit 308.

The sound processing unit 308 outputs a music piece or an announced sound obtained by playing back the input music data or the input announced sound data via an earphone 309.

The CPU 303 displays relevant information on the music data in the playback on the display 402 by sending the relevant information to the display processing unit 401.

In the portable playback apparatus 400, as described above, the CPU 303 performs various processes in accordance with various programs stored in advance in the ROM 304 or the flash memory 305.

Therefore, by properly selecting various programs to be stored in the ROM 304 or the flash memory 305 depending on the functions and processes of the portable playback apparatus 200, the CPU 303 can serve as the control unit 210 of the portable playback apparatus 200. The CPU 303 can serve as the selection unit 213 of the portable playback apparatus 200.

The input device 301 and the input processing unit 302 can serve as the operation unit 211 of the portable playback apparatus 200. Here, it is assumed that the input device 301 is selected so as to operate in the same way as the operation unit 211 of the portable playback apparatus 200.

The flash memory 305 can serve as the storage unit 212 of the portable playback apparatus 200. The sound processing unit 308 and the earphone 309 can serve as the playback unit 214 of the portable playback apparatus 200. The external interface 307 can serve as the external connection unit 215 of the portable playback apparatus 200.

The display processing unit 401 and the display 402 can serve as the display unit 205 of the portable playback apparatus 200.

Therefore, the portable playback apparatus 400 can realize various functions of the portable playback apparatus 200 having the functional configurations by the hardware configuration shown in FIG. 25 and thus the same advantage as the second embodiment can be obtained.

In the third embodiment, the CPU 303 of the portable playback apparatus 400 performs various processes in accordance with various programs stored in advance in the ROM 304 or the flash memory 305.

The invention is not limited to this configuration, but various programs may be recorded on a recording medium such as a CD or a DVD and the CPU 303 may read various program from the recording medium and perform various processes.

In this case, a drive (not shown) can be connected to the external interface 307 and the CPU 303 can read various programs from the recording medium via the drive. Various programs may be installed in the flash memory 305 from the recording medium.

4. Fourth Embodiment

A fourth embodiment of the invention will be described now. In the fourth embodiment, the sound search by the portable playback apparatus 100 according to the first embodiment is applied to a GUI for searching for image data.

4-1. Outer Configuration of Portable Image Display Apparatus

Figure 26A:
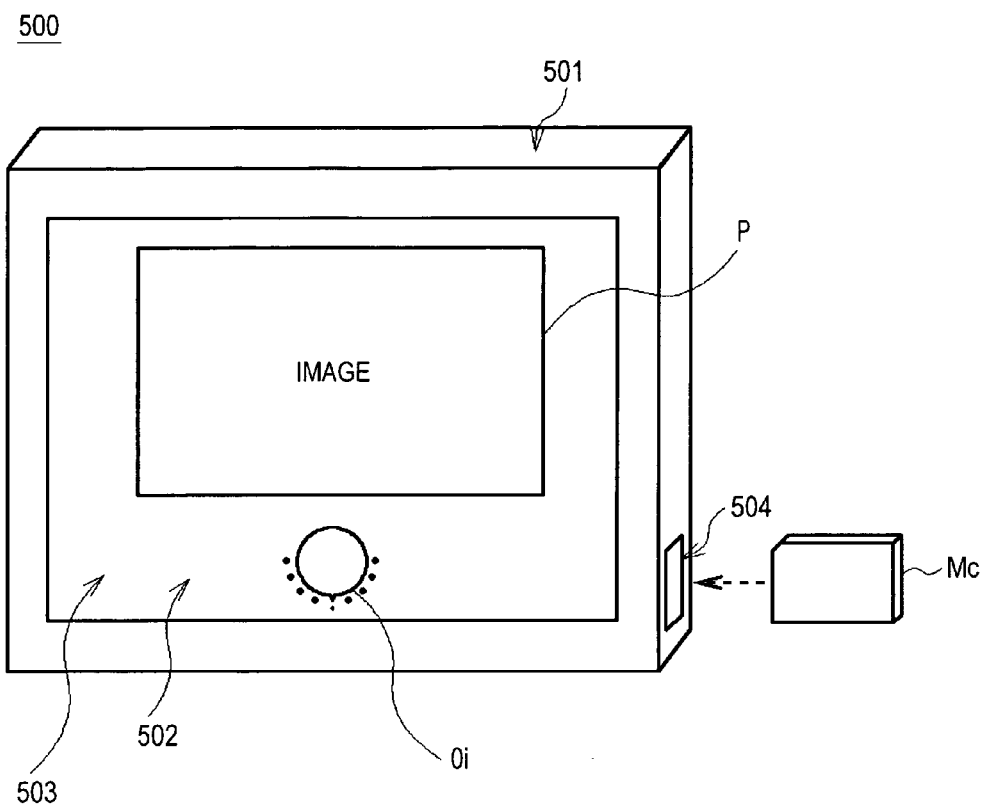
FIGS. 26A and 26B are diagrams schematically illustrating the outer configuration of a portable image display apparatus according to a fourth embodiment of the invention.

In FIG. 26A, reference numeral 500 represents the outer configuration of a portable image display apparatus according to the fourth embodiment of the invention. The portable image display apparatus 500 includes a chassis 501 having a substantially flat rectangular shape with such a size that it can be grasped with one hand. A rectangular display unit 502 is disposed in front of the chassis 501. The display unit 502 is provided with a touch panel 503 so as to cover the surface thereof.

When a user comes in contact with the touch panel 503 while coming in contact with the display unit 502, the portable image display apparatus 500 accepts the contact as an operation input and converts the contact into various commands.

A slot 504 for a memory card Mc is disposed on the side surface of the chassis 501. The portable image display apparatus 500 reads image data stored in the memory card Mc inserted into the slot 504 and displays an image P based on the image data on the display unit 502.

The portable image display apparatus 500 displays a knob-shaped operation icon (referred to as "knob icon") Oi, which has a shape obtained by viewing the rotational operation unit 102 of the portable playback apparatus 100 from the just above, on the display unit 502 in addition to the image P.

Figure 26B:
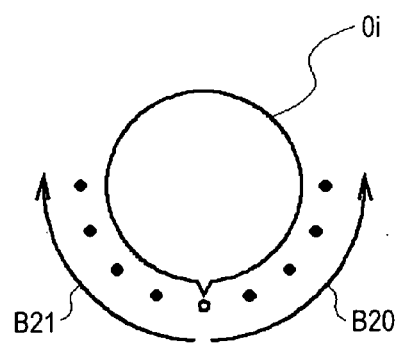

The knob icon Oi can rotate in the range of, for example, ±90 degree from a predetermined reference position by a touch operation (referred to as "rotating operation") for rotating the knob icon Oi, as shown in FIG. 26B. Here, the counterclockwise rotating direction indicated by arrow B20 is the +direction and the clockwise rotating direction indicated by arrow B21 is the − direction.

The portable image display apparatus 500 sequentially selects and displays the image data stored in the memory card Mc by the rotating operation on the knob icon Oi.

Figure 27:
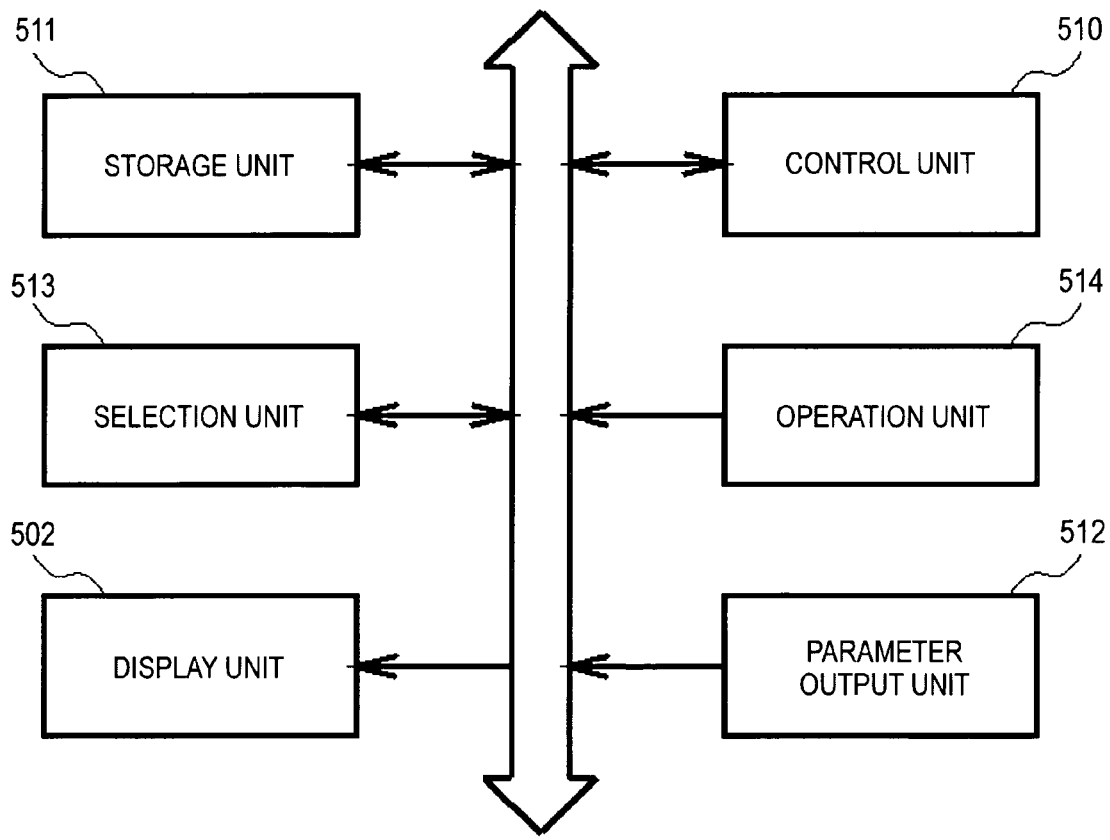
FIG. 27 is a diagram schematically illustrating the inner configuration of the portable image display apparatus according to the fourth embodiment.

4-2. Inner Configuration (Functional Configuration) of Portable Image Display Apparatus The inner configuration of the portable image display apparatus 500 will be described now. As shown in FIG. 27, the portable image display apparatus 500 includes a display unit 502, a control unit 510, a storage unit 511, the parameter output unit 512, a selection unit 513, and an operation unit 514. The storage unit 511 includes the slot 504 and the memory card Mc described above. The operation unit 514 includes the above-mentioned touch panel 503.

Along with the image data, the relevant information on the image data is stored in the memory card Mc. The relevant information includes attribute information such as image titles and shooting times (year, month, date, O'clock, minute, and second) of images based on the image data.

Figure 28:
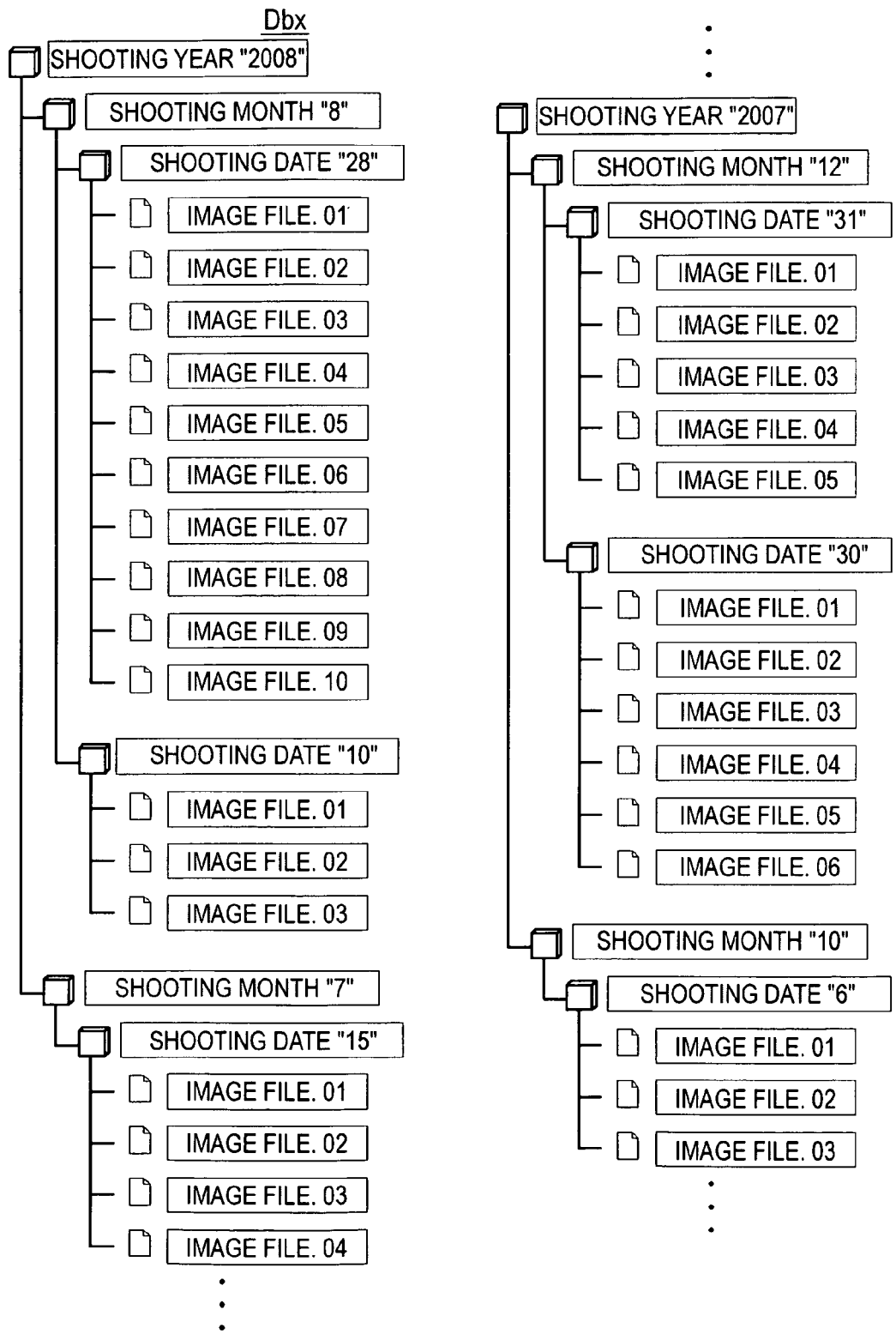
FIG. 28 is a diagram schematically illustrating the configuration of a relevant information database according to the fourth embodiment.

In the portable image display apparatus 500, the control unit 510 constructs a relevant information database Dbx having a hierarchical structure shown in FIG. 28 on the basis of the relevant information. The relevant information database Dbx has a structure in which the shooting years of the shooting time are arranged in the uppermost layer and the shooting months of the respective shooting years are arranged in the layer just below the shooting years. In the structure of the relevant information database Dbx, the shooting dates of the respective shooting months are arranged in the layer just below the shooting months. In the structure of the relevant information database Dbx, the image files photographed on the shooting dates are arranged in the lowermost layer just below the shooting dates.

The layers of the relevant information database Dbx can be sorted individually. For example, at the initial setting, the shooting years, the shooting months, the shooting dates, and the image data are sorted in the order of the shooting times going to the past.

That is, all the image files are grouped in the order of the shooting years, the shooting months, and the shooting dates in the relevant information database Dbx and are arranged in a line in the order of the shooting times going to the past.

Figure 29A:
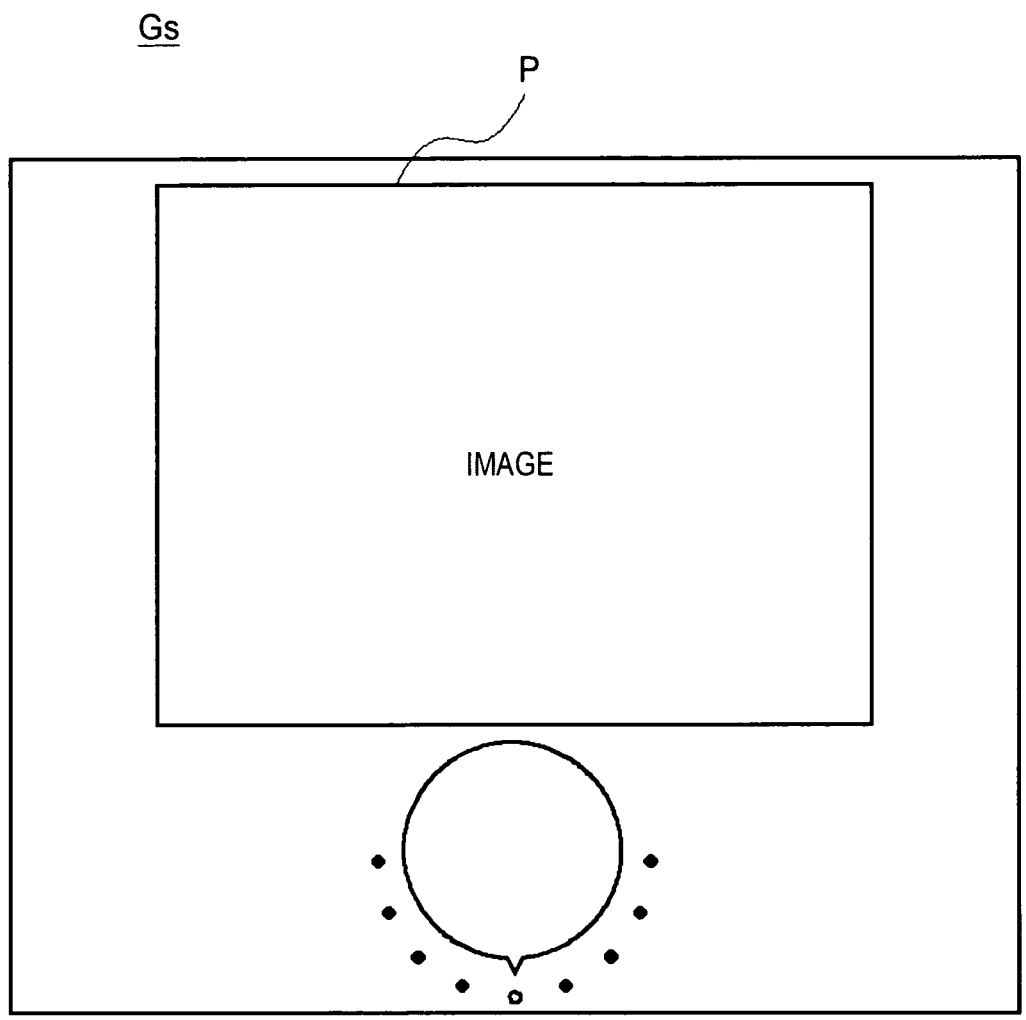
FIGS. 29A and 29B are diagrams schematically illustrating the configuration (1) of a GUI picture.

The control unit 510 creates GUI picture data in which the knob icon Oi is arranged and displays the GUI picture Gs based on the GUI picture data on the display unit 502 as shown in FIG. 29A. The control unit 510 displays an image P based on the image data selected by the selection unit 513 on the GUI picture Gs.

In addition, the portable image display apparatus 500 is in the search mode and can search for the image data, when the knob icon Oi is rotationally operated.

Specifically, in the portable image display apparatus 500, when the knob icon Oi is rotationally operated, the parameter representing the amount of rotation is output from the parameter output unit 512 and the parameter is sent to the control unit 510 and the selection unit 513.

Figure 30:
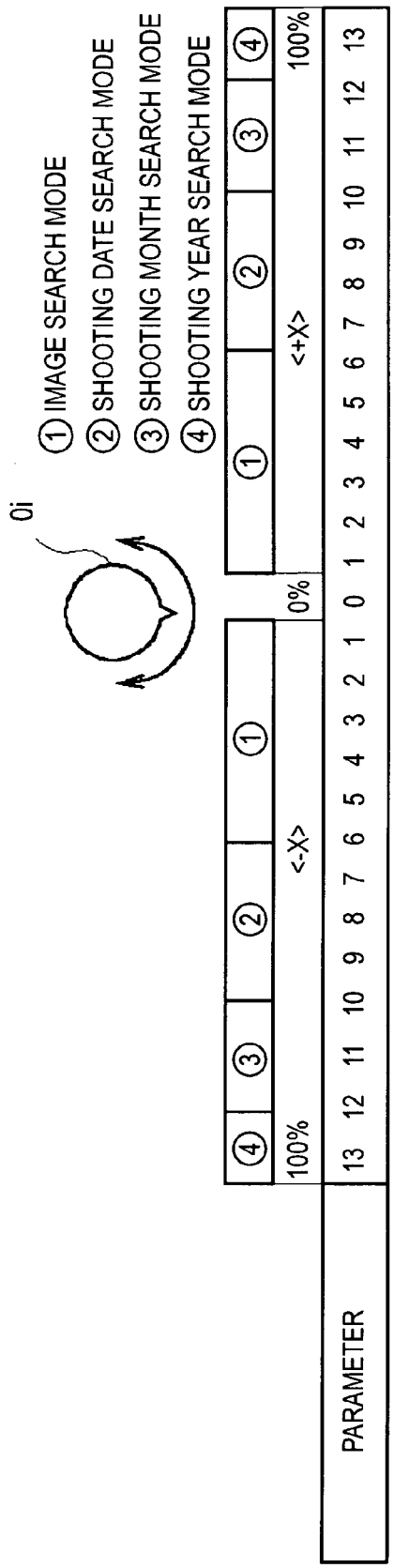
FIG. 30 is a diagram schematically illustrating the relation between an amount of rotation of a knob icon and the parameter.

Here, as shown in FIG. 30, the parameter output unit 512 outputs "0" as the parameter when the knob icon Oi is located at the reference position, and outputs "13" as the parameter when the knob icon Oi is located at the position of +90 degree. In addition, the parameter output unit 512 outputs one of "1" to "12" as the parameter depending on the amount of rotation when the knob icon Oi is located between the reference position to the position of +90 degree.

That is, when the knob icon Oi is rotationally operated in the + direction, the parameter output unit 512 outputs the 14-stepped parameters of "0" to "13" depending on the amount of rotation (between 0% (reference position) and 100% (+90 degree).

When the knob icon Oi is rotationally operated in the − direction, the parameter output unit 512 outputs the 14-stepped parameters of "0" to "13" depending on the amount of rotation (between 0% (reference position) and 100% (−90 degree).

In order to distinguish the rotation in the + direction and the rotation in the − direction from each other, the parameter output unit 512 attaches the sign of + to the parameter representing the amount of rotation in the + direction and attaches the sign of − to the parameter representing the amount of rotation in the − direction.

The selection unit 513 switches the selection target (that is, the search range) depending on the parameter (that is, the amount of rotation of the knob icon Oi) output from the parameter output unit 512 using the relevant information database Dbx stored in the storage unit 511.

That is, when the parameter is in the range of "1" to "5", the selection unit 513 sets the image files in the lowermost layer registered in the relevant information database Dbx as the selection target and selects the image files every predetermined time (for example, several seconds) in the sorted order.

Here, the image files registered in the relevant information database Dbx are grouped in the order of the shooting year, the shooting month, and the shooting date and are arranged in a line in the order of the shooting times going to the past.

Therefore, the selection unit 513 sequentially selects the image files arranged in a line. In this case, the selection unit 513 recognizes the first image file as the next image file of the final image file.

Figure 31A:
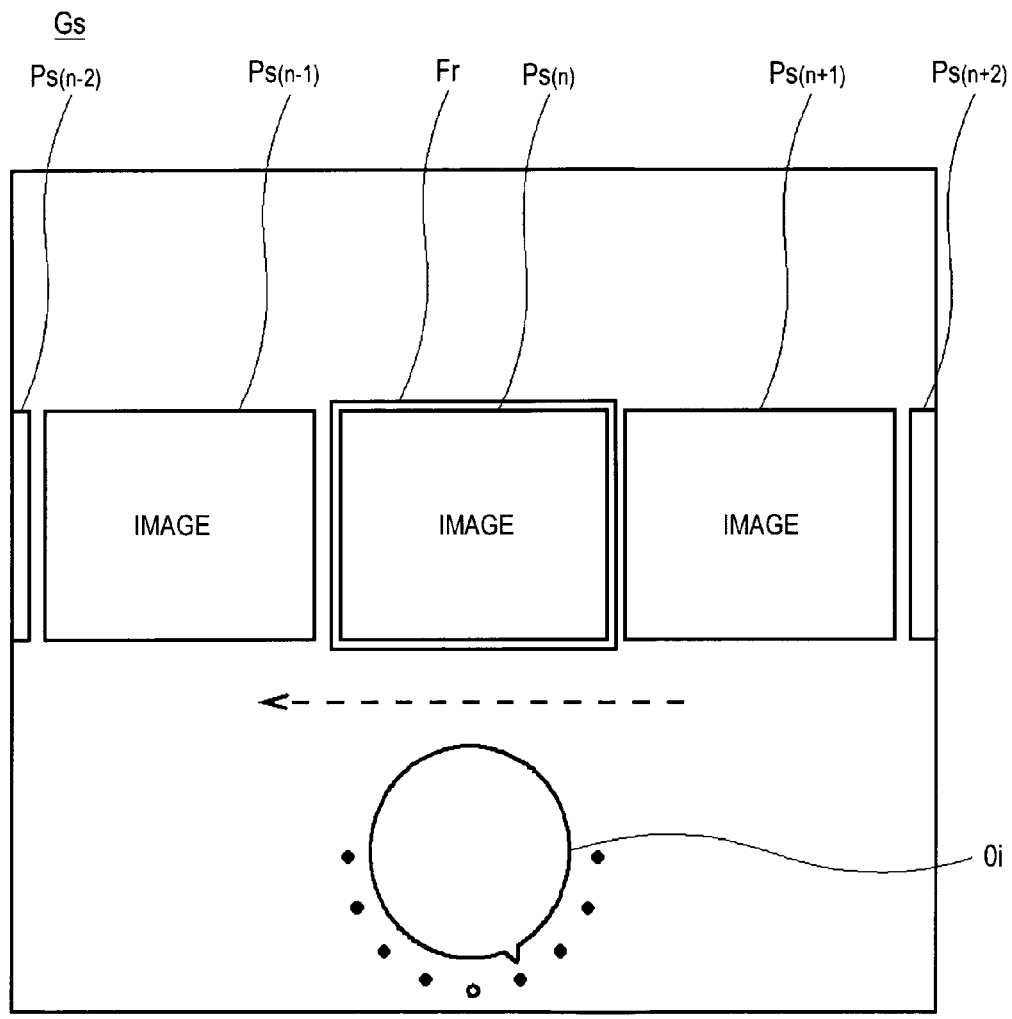
FIGS. 31A and 31B are diagrams schematically illustrating the configuration (2) of the GUI picture.
Figure 31B:
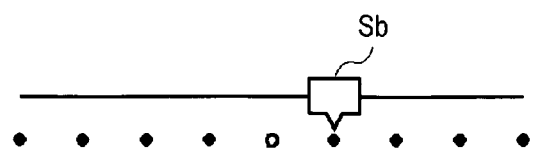

At this time, the control unit 510 displays a reduced image of an image based on the image file selected by the selection unit 513 and reduced images of images based on the image files before and after the selected image file on the GUI picture Gs. The GUI picture Gs is shown in FIG. 31A. The control unit 510 recognizes the first image file as the next image file of the final image file.

The reduced image Ps(n) based on the image file selected by the selection unit 513 is displayed in a central selection frame Fr of the GUI picture Gs. In the GUI picture Gs, the just previous reduced image Ps(n−1) is displayed on the left of the reduced image Ps(n) and a part of the previous and previous reduced image Ps(n−2) is displayed on the left thereof.

In the GUI picture Gs, the just successive reduced image Ps(n+1) is displayed on the right of the reduced image Ps(n) and a part of the successive and successive reduced image Ps(n+2) is displayed on the right thereof.

That is, in the GUI picture Gs, the previous and successive reduced images Ps(n−2), Ps(n−1), Ps(n+1), and Ps(n+2) are arranged in a horizontal line centered on the reduced image Ps(n) based on the image file selected by the selection unit 513.

When the image file selected by the selection unit 513 is switched to the next image file, plural reduced images Ps arranged in the horizontal line are scrolled in the left direction and the image Ps(n) displayed in the selection frame Fr is switched to the next Ps(n+1). In addition, as the value of the parameter increases, the speed at which the image is switched increases.

In this way, when the parameter output from the parameter output unit 512 is in the range of "1" to "5", the portable image display apparatus 500 sequentially selects the image files and displays the reduced image based on the selected image file and the reduced images based on the previous and successive image files thereof.

That is, the portable image display apparatus 500 can allow the user to search for the desired image by sequentially displaying the reduced images based on the image files. In this way, it is called an image search that a desired image is searched for by displaying the reduced images based on the image files, and the portable image display apparatus 500 is in the image search mode of the search mode.

When the parameter is in the range of "6" to "9", the selection unit 513 sets the shooting dates in the layer above the image files registered in the relevant information database Dbx as the selection target and selects the shooting dates every predetermined time in the sorted order.

Figure 32A:
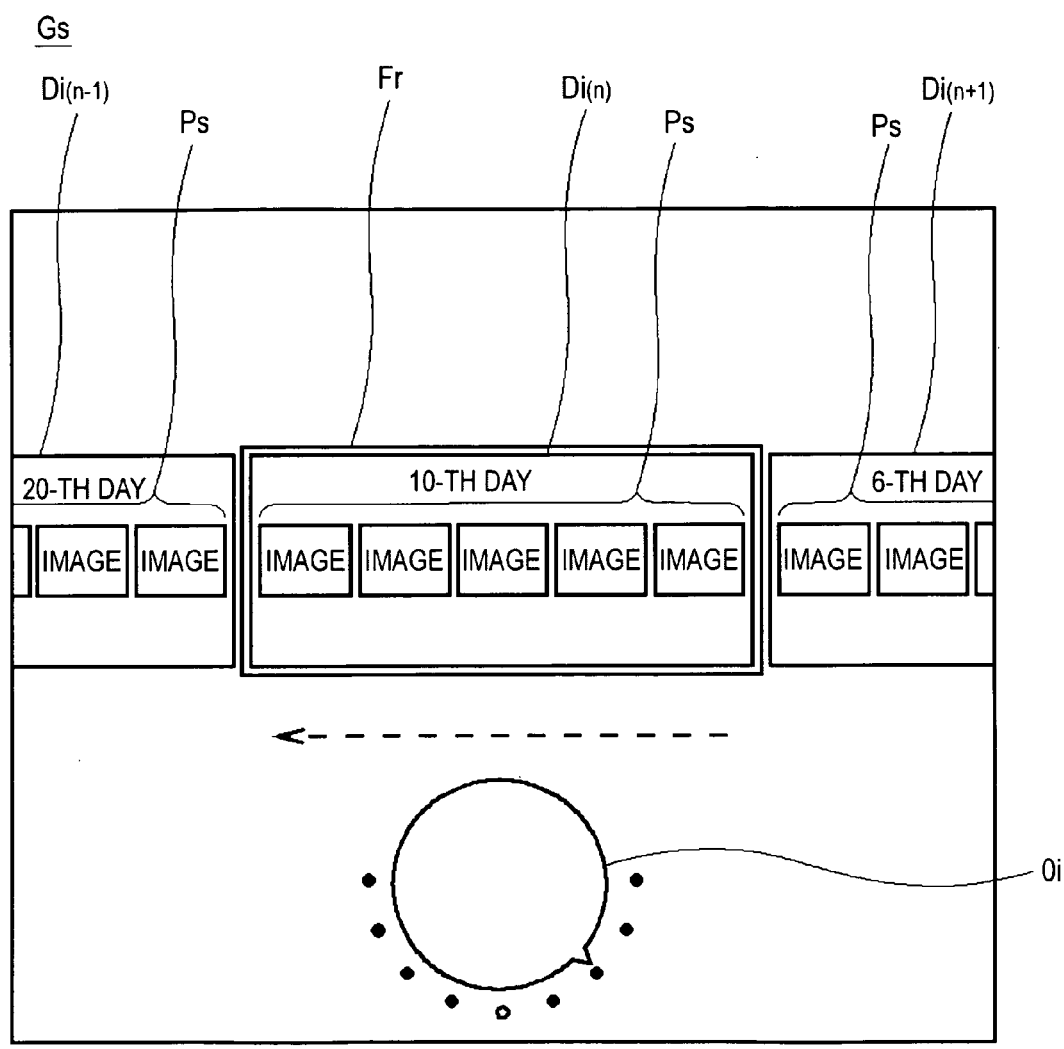
FIGS. 32A and 32B are diagrams schematically illustrating the configuration (3) of the GUI picture.
Figure 32B:
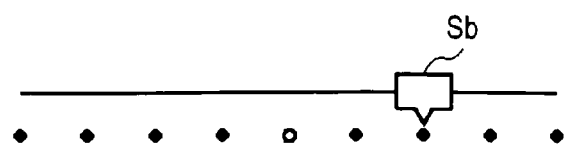

At this time, the control unit 510 displays the shooting date selected by the selection unit 513 and the shooting dates previous and successive thereto on the GUI picture Gs. The GUI picture Gs is shown in FIG. 32A.

In the GUI picture Gs, a shooting date icon Di(n) in which the shooting date (for example, "10-th day") selected by the selection unit 513 is displayed in the selection frame Fr at the center. The reduced image Ps based on the image file grouped into the shooting date (that is, the image file photographed on the shooting date) is displayed in the shooting date icon Di(n). Here, when plural image files grouped into the shooting date exist, the plural reduced images Ps are arranged in a horizontal line in the order of the shooting times going to the present time from the right in the shooting date icon Di(n).

In the GUI picture Gs, at least a part of the shooting date icon Di(n−1) in which the previous shooting date (for example, "20-th day") is recorded is displayed on the left of the shooting date icon Di(n). The reduced image Ps based on the image file grouped into the shooting date is displayed in the shooting date icon Di(n−1). Here, when plural image files grouped into the shooting date exist, the plural reduced images Ps are arranged in a horizontal line in the order of the shooting times going to the present time from the right in the shooting date icon Di(n−1).

In the GUI picture Gs, a part of the shooting date icon Di(n+1) in which the successive shooting date (for example, "6-th day") is recorded is displayed on the right of the shooting date icon Di(n). The reduced image Ps based on the image file grouped into the shooting date is displayed in the shooting date icon Di(n+1). Here, when plural image files grouped into the shooting date exist, the plural reduced images Ps are arranged in a horizontal line in the order of the shooting times going to the past from the left in the shooting date icon Di(n+1).

That is, in the GUI picture Gs, centered on the shooting date icon Di(n) in which the shooting date selected by the selection unit 513 is recorded, the shooting date icons Di(n−1) and Di(n+1) in which the previous and successive shooting dates are recorded are arranged in the horizontal line.

In the GUI picture Gs, the reduced images Ps based on the image files grouped into the shooting date selected by the selection unit 513 and the reduced images Ps based on the image files grouped into the previous and successive shooting dates are displayed in a list of the horizontal line.

When the shooting date selected by the selection unit 513 is switched to the next shooting date, the plural shooting date icons Di arranged in the horizontal line are scrolled in the left direction and the shooting date icon Di(n) displayed in the selection frame Fr is switched to the next shooting date icon Di(n+1). In addition, as the value of the parameter increases, the speed at which the shooting date is switched increases.

When the parameter output from the parameter output unit 512 is in the range of "6" to "9", the portable image display apparatus 500 sequentially selects the shooting dates and displays the selected shooting date and the previous and successive shooting dates along with the images (reduced images Ps) photographed on the shooting dates.

That is, the portable image display apparatus 500 can allow the user to search for the desired shooting date by sequentially displaying the shooting dates along with the images (reduced images Ps) photographed on the shooting dates. It is called a shooting date search that a desired shooting date is searched for by displaying the shooting dates along with the images (reduced images Ps) photographed on the shooting dates, and the portable image display apparatus 500 is in the shooting date search mode of the search mode.

When the parameter is in the range of "10" to "12", the selection unit 513 sets the shooting months in the layer above the shooting dates registered in the relevant information database Dbx as the selection target and selects the shooting months every predetermined time in the sorted order.

Figure 33A:
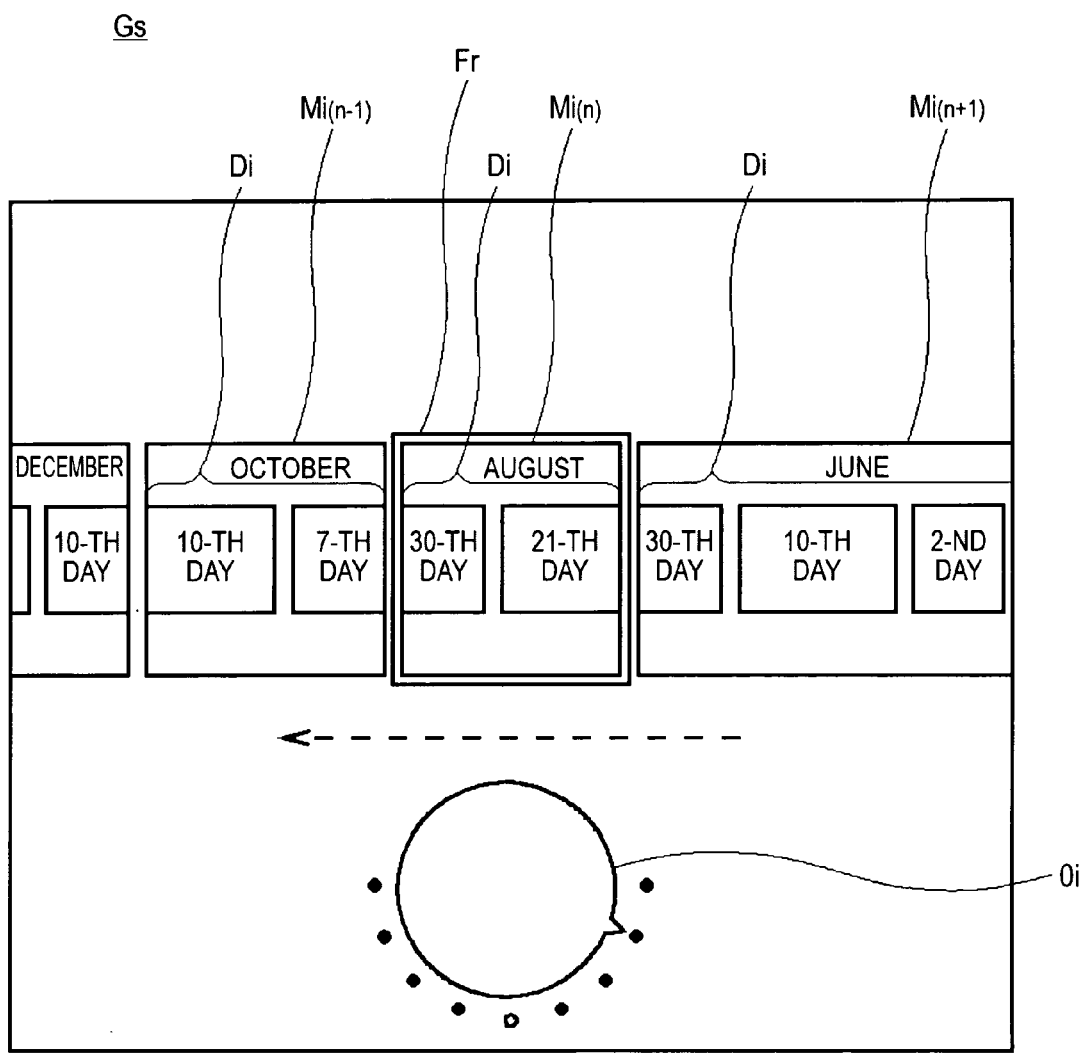
FIGS. 33A and 33B are diagrams schematically illustrating the configuration (4) of the GUI picture.
Figure 33B:
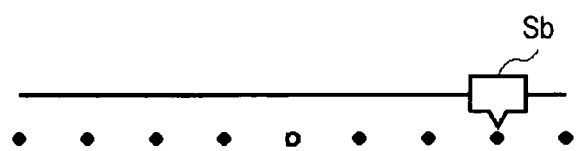

At this time, the control unit 510 displays the shooting month selected by the selection unit 513 and the shooting months previous and successive thereto on the GUI picture Gs. The GUI picture Gs is shown in FIG. 33A.

In the GUI picture Gs, a shooting month icon Mi(n) in which the shooting month (for example, "August") selected by the selection unit 513 is recorded is displayed in the selection frame Fr at the center. The shooting date icon Di in which the shooting date grouped into the shooting month (that is, the shooting date on which an image is photographed in the shooting month) is recorded is displayed in the shooting month icon Mi(n). Here, when plural shooting dates grouped into the shooting month exist, the plural shooting date icons Di are arranged in a horizontal line in the order of the shooting dates going to the present time from the right in the shooting month icon Mi(n).

In the GUI picture Gs, at least a part of the shooting month icon Mi(n−1) in which the previous shooting month is recorded is displayed on the left of the shooting month icon Mi(n). The shooting date icon Di in which the shooting date grouped into the shooting month is recorded is displayed in the shooting month icon Mi(n−1). Here, when plural shooting dates grouped into the shooting month exist, the plural shooting date icons Di are arranged in a horizontal line in the order of the shooting dates going to the present time from the right in the shooting month icon Mi(n−1).

In the GUI picture Gs, at least a part of the shooting month icon Mi(n+1) in which the successive shooting month is recorded is displayed on the right of the shooting month icon Mi(n). The shooting date icon Di in which the shooting date grouped into the shooting month is recorded is displayed in the shooting month icon Mi(n+1). Here, when plural shooting dates grouped into the shooting month exist, the plural shooting date icons Di are arranged in a horizontal line in the order of the shooting dates going to the past from the left in the shooting month icon Mi(n+1).

That is, in the GUI picture Gs, centered on the shooting month icon Mi(n) in which the shooting month selected by the selection unit 513 is recorded, the shooting month icons Mi(n−1) and Mi(n+1) in which the previous and successive shooting months are recorded are arranged in a list of the horizontal line.

In the GUI picture Gs, the shooting date icon Di in which the shooting date grouped into the shooting month selected by the selection unit 513 is recorded and the shooting date icons Di in which the shooting dates grouped into the previous and successive shooting months are recorded are displayed in a list of the horizontal line. Here, as the number of images photographed on the shooting date increases, the horizontal width of the shooting date icon Di increases. Accordingly, the user can be made to easily recognize how many images are photographed on the shooting date.

When the shooting month selected by the selection unit 513 is switched to the next shooting month, the plural shooting month icons Mi arranged in the horizontal line are scrolled in the left direction and the shooting month icon Mi(n) displayed in the selection frame Fr is switched to the next shooting month icon Mi(n+1). In addition, as the value of the parameter increases, the speed at which the shooting month is switched increases.

When the parameter output from the parameter output unit 512 is in the range of "10" to "12", the portable image display apparatus 500 sequentially selects the shooting months and displays the selected shooting month and the previous and successive shooting months along with the shooting dates in the shooting months.

That is, the portable image display apparatus 500 can allow the user to search for the desired shooting month by sequentially displaying the shooting months along with the shooting dates in the shooting months. It is called a shooting month search that a desired shooting month is searched for by displaying the shooting months along with the shooting dates in the shooting months, and the portable image display apparatus 500 is in the shooting month search mode of the search mode.

When the parameter is "13", the selection unit 513 sets the shooting years in the layer above the shooting months registered in the relevant information database Dbx as the selection target and selects the shooting years every predetermined time in the sorted order.

Figure 34A:
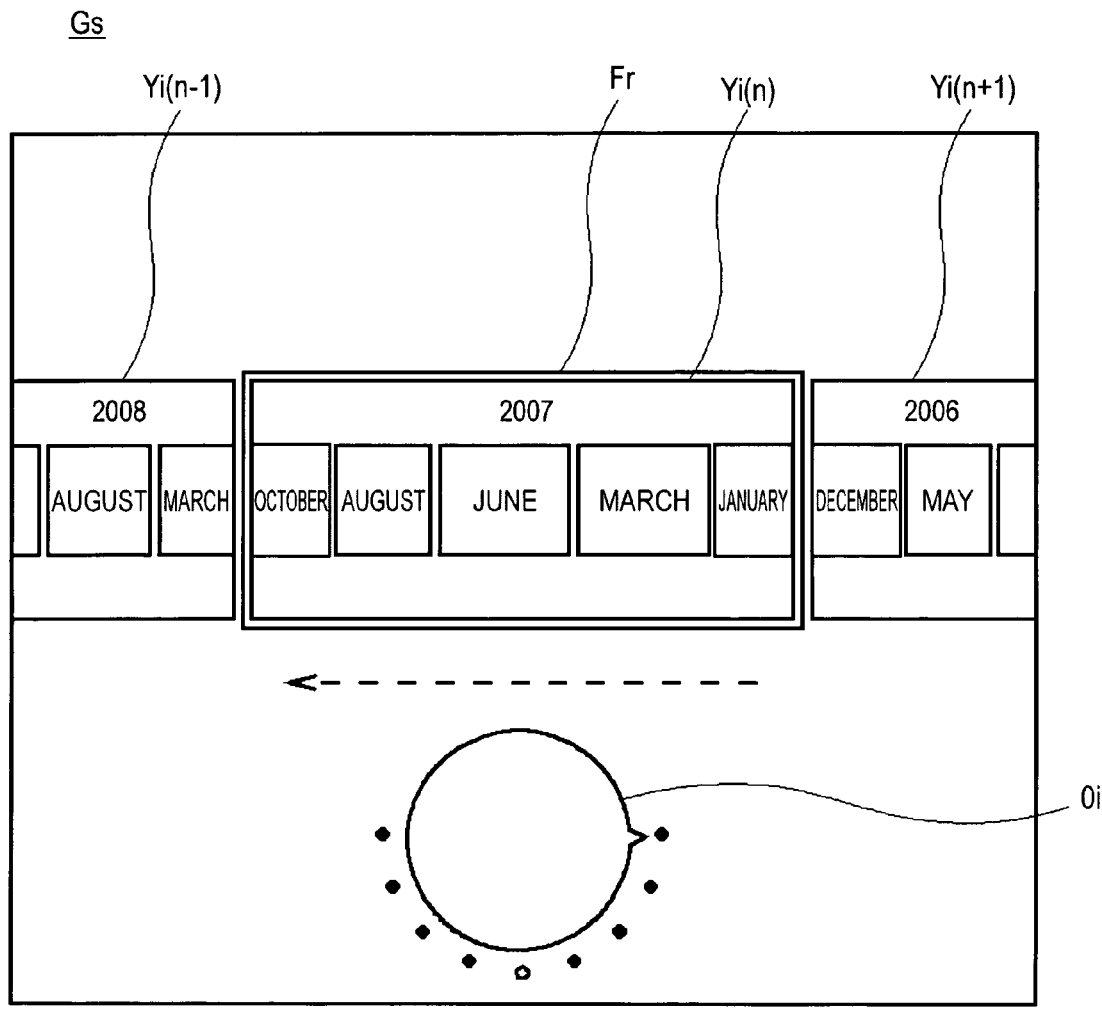
FIGS. 34A and 34B are diagrams schematically illustrating the configuration (5) of the GUI picture.
Figure 34B:
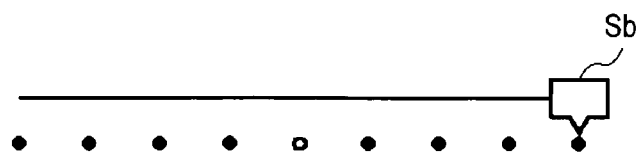

At this time, the control unit 510 displays the shooting year selected by the selection unit 513 and the shooting years previous and successive thereto on the GUI picture Gs. The GUI picture Gs is shown in FIG. 34A.

In the GUI picture Gs, a shooting year icon Yi(n) in which the shooting year (for example, "2007") selected by the selection unit 513 is recorded is displayed in the selection frame Fr at the center. The shooting month icon Mi in which the shooting month grouped into the shooting year (that is, the shooting month on which an image is photographed in the shooting year) is recorded is displayed in the shooting year icon Yi(n). Here, when plural shooting months grouped into the shooting year exist, the plural shooting month icons Mi are arranged in a horizontal line in the order of the shooting months going to the present time from the right in the shooting year icon Yi(n).

In the GUI picture Gs, at least a part of the shooting year icon Yi(n−1) in which the previous shooting year is recorded is displayed on the left of the shooting year icon Yi(n). The shooting month icon Mi in which the shooting month grouped into the shooting year is recorded is displayed in the shooting year icon Yi(n−1). Here, when plural shooting months grouped into the shooting year exist, the plural shooting month icon Mi are arranged in a horizontal line in the order of the shooting months going to the present time from the right in the shooting year icon Yi(n−1).

In the GUI picture Gs, at least a part of the shooting year icon Yi(n+1) in which the successive shooting year is recorded is displayed on the right of the shooting year icon Yi(n). The shooting month icon Mi in which the shooting month grouped into the shooting year is recorded is displayed in the shooting year icon Yi(n+1). Here, when plural shooting months grouped into the shooting year exist, the plural shooting month icon Mi are arranged in a horizontal line in the order of the shooting months going to the past from the left in the shooting year icon Yi(n+1).

That is, in the GUI picture Gs, centered on the shooting year icon Yi(n) in which the shooting year selected by the selection unit 513 is recorded, the shooting year icons Yi(n−1) and Yi(n+1) in which the previous and successive shooting years are recorded are arranged in a list of a horizontal line.

In the GUI picture Gs, the shooting month icon Mi in which the shooting month grouped into the shooting year selected by the selection unit 513 is recorded and the shooting month icons Mi in which the shooting months grouped into the previous and successive shooting years are recorded are displayed in a list of a horizontal line. Here, as the number of images photographed in the shooting month increases, the horizontal width of the shooting month icon Mi increases. Accordingly, the user can be made to recognize how many images are photographed in the shooting month.

When the shooting year selected by the selection unit 513 is switched to the next shooting year, the plural shooting year icons Yi arranged in a horizontal line are scrolled in the left direction and the shooting year icon Yi(n) displayed in the selection frame Fr is switched to the next shooting year icon Yi(n+1).

When the parameter output from the parameter output unit 512 is "13", the portable image display apparatus 500 sequentially selects the shooting years and displays the selected shooting year and the previous and successive shooting years along with the shooting months in the shooting years.

That is, the portable image display apparatus 500 can allow the user to search for the desired shooting year by sequentially displaying the shooting years along with the shooting months in the shooting years. It is called a shooting year search that a desired shooting year is searched for by displaying the shooting years along with the shooting months in the shooting years, and the portable image display apparatus 500 is in the shooting year search mode of the search mode.

Thereafter, when the knob icon Oi is returned to the reference position (that is, when the parameter output from the parameter output unit 512 is "0"), the portable image display apparatus 500 is returned to the normal playback mode from the search mode.

Figure 29B:
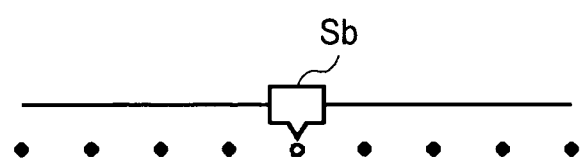

At this time, when an image file is selected just before returned to the normal playback mode, the selection unit 513 continuously selects the image file. The control unit 510 displays the image P based on the image file on the display unit 502 as shown in FIG. 29.

When the shooting date is selected just before returned to the normal playback mode, the selection unit 513 selects one (for example, an image file of which the shooting time is newest) of the image files grouped into the shooting date.

When the shooting month is selected just before returned to the normal playback mode, the selection unit 513 selects one (for example, an image file of which the shooting time is newest) of the image files grouped into the shooting month.

When the shooting year is selected just before returned to the normal playback mode, the selection unit 513 selects one (for example, an image file of which the shooting time is newest) of the image files grouped into the shooting year.

At this time, the control unit 510 displays the image P based on the image file selected by the selection unit 513 on the display unit 502.

When the image search mode is switched to the normal playback mode by returning the rotational operation unit 102 to the reference position, the portable image display apparatus 500 plays back the image data corresponding to the shooting year, the shooting month, and the shooting date selected just before the switching.

Accordingly, the portable image display apparatus 500 can allow the user, which has searched for the desired image data by the shooting year search, the shooting month search, the shooting date search, and the image search in the search mode, to view the image based on the image data at once.

The portable image display apparatus 500 can search for the image data while switching the search mode among the shooting year search mode, the shooting month search mode, the shooting date search mode, and the image search mode depending on the amount of rotation by a single operation of rotating the knob icon Oi.

Here, the portable image display apparatus 500 can perform a rough search such as the shooting year search as the amount of rotation of the knob icon Oi increases and can perform a detailed search such as the image search as the amount of rotation decreases. Accordingly, it is possible to provide a user with a more intuitive search operation.

Since the portable image display apparatus 500 can allow the user to recognize the shooting year, the shooting month, the shooting date, and the image selected with the GUI, it is possible to allow the user to easily recognize the selected one.

In this way, in the fourth embodiment, the sound search of the portable playback apparatus 200 according to the first embodiment is embodied by the GUI. Accordingly, the portable image display apparatus 500 according to the fourth embodiment can obtain the same advantages as the portable playback apparatus 100 according to the first embodiment by the use of the GUI.

The switching among the search modes is referred to the first embodiment, because it is technically equal to the sound search in the first embodiment. That is, for example, when the shooting year search mode is switched to the shooting month search mode in the state where a shooting year is selected, one of the shooting months grouped into the shooting year selected just before is selected. When the shooting month search mode is switched to the shooting year search mode in the state where a shooting month is selected, the shooting year including the shooting month selected just before is selected.

Accordingly, the portable image display apparatus 500 can allow the user to make a search while smoothly switching the search target from the search of the desired shooting year to the search of the shooting month grouped into the desired shooting year.

Here, the search target is switched depending on the operation on the knob icon Oi. The invention is not limited to this configuration, but for example, as shown in FIG. 29B and FIGS. 31B to 34B, a slide bar Sb may be displayed instead of the knob icon Oi and the search target may be switched depending on the operation on the slide bar Sb.

The slide bar Sb can slide from a predetermined reference position in a range of a predetermined distance on the left and right depending on a touch operation (referred to as "sliding operation") of making the slide bar Sb slide. Here, the right direction is the + direction and the left direction is the − direction. In this case, the parameter output unit 512 outputs the parameter corresponding to the amount of sliding of the slide bar Sb.

5. Fifth Embodiment

A fifth embodiment of the invention will be described now. In the fifth embodiment, the portable image display apparatus 500 according to the fourth embodiment is embodied by hardware.

Figure 35:
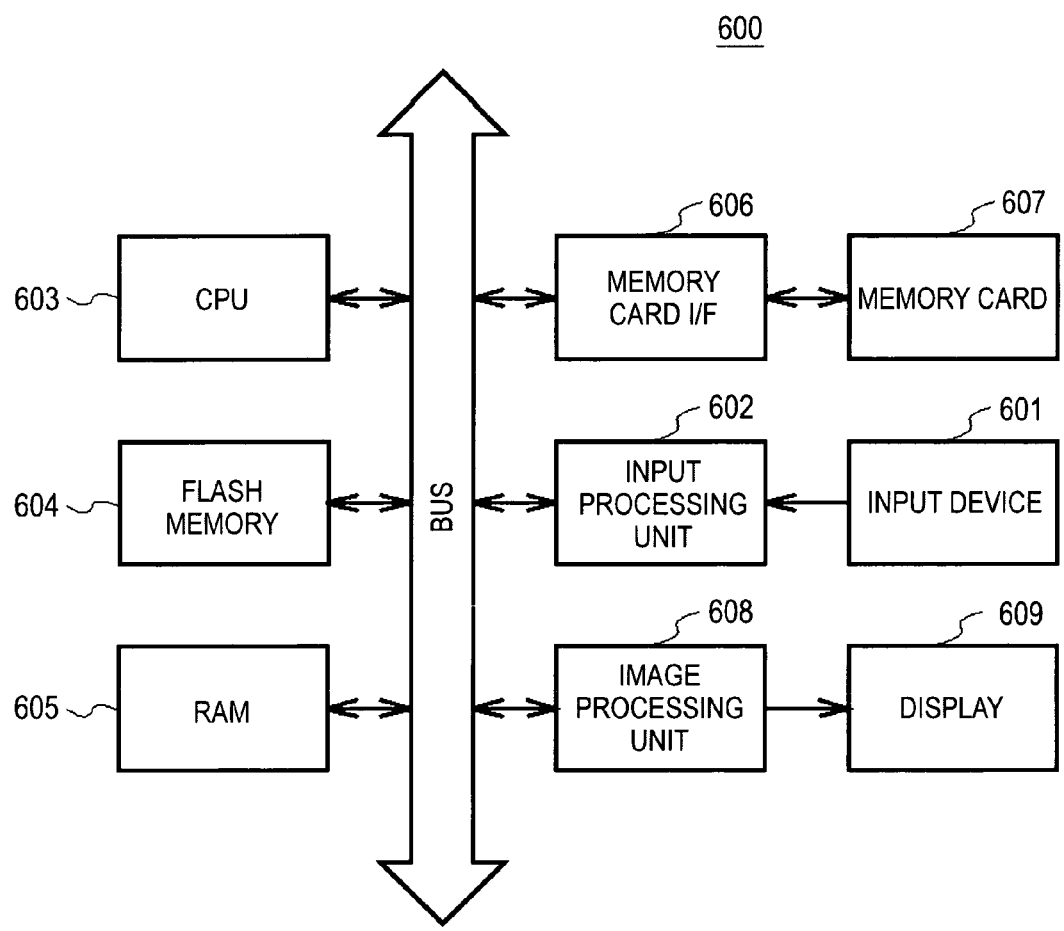
FIG. 35 is a diagram schematically illustrating the hardware configuration of a portable image display apparatus according to a fifth embodiment of the invention.

A portable image display apparatus 600 shown in FIG. 35 is obtained by embodying the functional configuration of the portable image display apparatus 500 according to the fourth embodiment by hardware.

When an input device 601 is operated by a user, the portable image display apparatus 600 recognizes the operation by the use of the input device 601 and sends an operation input signal corresponding to the operation to an input processing unit 602.

The input processing unit 602 converts the supplied operation input signal into an operation command and sends the operation command to a CPU 603 via a bus.

The CPU 603 loads various programs stored in a flash memory 604 in advance to a RAM 605 via the bus.

The CPU 603 performs various processes (such as the GUI displaying process) corresponding to the operation command sent from the input processing unit 602 by controlling the entire units in accordance with various programs loaded to the RAM 605.

Specifically, the CPU 603 reads the image data from a memory card 607 connected to a memory card interface 606 in accordance with the operation command sent from the input processing unit 602 and inputs the image data to an image processing unit 608.

The image processing unit 608 displays the image obtained by playing back the input image data on a display 609.

In the portable image display apparatus 600, as described above, the CPU 603 performs various processes in accordance with various programs stored in advance in the flash memory 604.

Therefore, by properly selecting various programs to be stored in the flash memory 604 depending on the functions of the portable image display apparatus 500, the CPU 603 can serve as the control unit 510 of the portable image display apparatus 500. The CPU 603 can serve as the selection unit 513 of the portable image display apparatus 500.

The input device 601 and the input processing unit 602 can serve as the operation unit 514 of the portable image display apparatus 500. Here, it is assumed that the input device 601 is selected so as to operate in the same way as the operation unit 514 of the portable image display apparatus 500.

The memory card 607 can serve as the storage unit 511 of the portable image display apparatus 500. The image processing unit 608 can serve as the control unit 510 of the portable image display apparatus 500. The display 609 can serve as the display unit 502 of the portable image display apparatus 500.

Therefore, the portable image display apparatus 600 can realize various functions of the portable image display apparatus 500 having the functional configurations by the hardware configuration shown in FIG. 35 and thus the same advantage as the fourth embodiment can be obtained.

In the fifth embodiment, the CPU 603 of the portable image display apparatus 600 performs various processes in accordance with various programs stored in advance in the flash memory 604.

The invention is not limited to this configuration, but various programs may be recorded on a recording medium such as the memory card 607 and the CPU 603 may read various programs from the recording medium and perform various processes.

Various programs may be installed in the flash memory 604 from the memory card 607.

6. Other Embodiments

6-1. Other Embodiment 1

Figure 36:
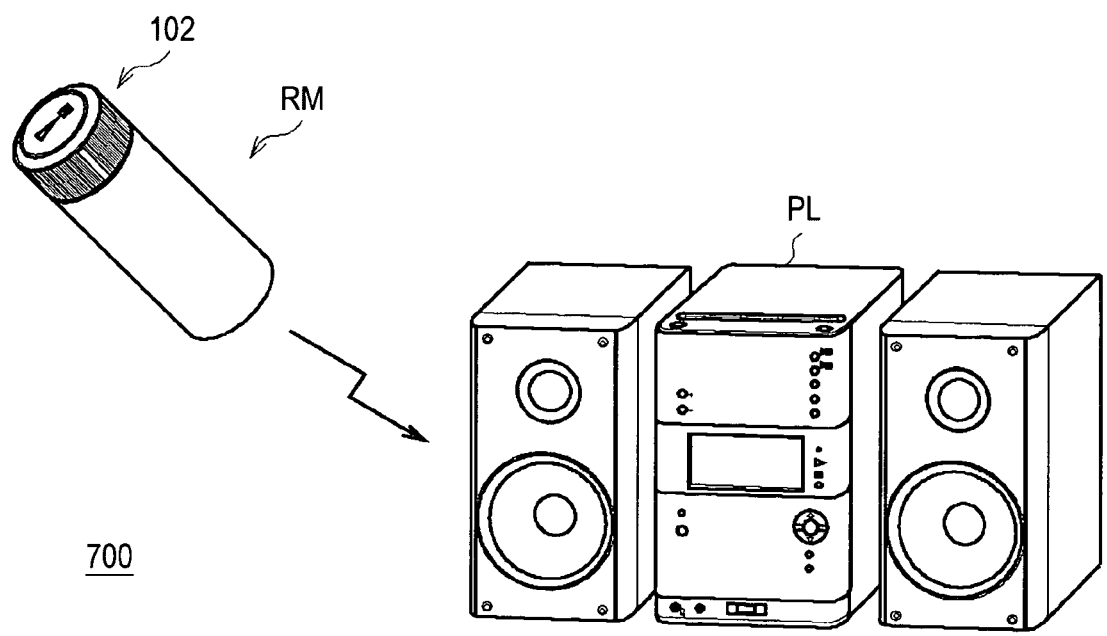
FIG. 36 is a diagram schematically illustrating the system configuration of a playback system according to another embodiment of the invention.

In the first embodiment, the portable playback apparatus 100 having a function of playing back music data has been described as a specific example. The invention is not limited to this, but for example, as shown in FIG. 36, the invention may be applied to a playback system 700 including a playback apparatus PL making the same playback control as the portable playback apparatus 100 and a remote controller RM having the rotational operation unit 102 of the portable playback apparatus 100.

In this case, as shown in FIG. 37, the remote controller RM includes a transmitter 701 in addition to the operation unit 111 and the parameter output unit 113 similar to those of the portable playback apparatus 100. The remote controller RM transmits the parameter output from the parameter output unit 113 from the transmitter 701 to the playback apparatus PL.

On the other hand, the playback apparatus PL includes a receiver 702 in addition to the control unit 110, the storage unit 112, the selection unit 114, the playback unit 115, and the external connection unit 116 similar to those of the portable playback apparatus 100. The playback apparatus PL receives the parameter transmitted from the remote controller RM by the use of the receiver 702 and makes the same playback control as the portable playback apparatus 100 on the basis of the parameter.

Accordingly, the same advantages as the first embodiment can be obtained in the playback system 700.

In addition, the communication between the remote controller RM and the playback apparatus PL may be made by wireless using infrared or wireless LAN or may be made by wire such as cable.

A sound output unit may be provided to the remote controller RM, the sound signal obtained by playing back the music data may be transmitted from the playback apparatus PL, and the music pieces may be listened to by the use of the remote controller RM.

6-2. Other Embodiment 2

In the first embodiment, the next artist's names is announced at the time of switching the artist's names and the next album title is announced at the time of switching the album title.

In order to realize the announcement, the announced sound data for announcing the artist's names and the album-title sound data for announcing the album title are included in the relevant information in advance.

The invention is not limited to this configuration, but for example, a character-sound converter for converting character data into sound data may be provided to the portable playback apparatus 100 and the character-sound converter may convert the artist's names or the album title included in the relevant information into the announced sound data.

In this case, when the processing speed of the character-sound converter has a margin, the artist's names or the album title may be converted into the announced sound data and may be played back at the time of switching the artist's names or the album title. When the relevant information is acquired, the announced sound data may be created and stored in the storage unit 112, and may be read and played back from the storage unit 112.

In this case, the announced sound data may not be included in the relevant information and the existing relevant information (that is, the relevant information not including the announced sound data) can be used as a result.

The announced sound data for general announcement such as "next artist" or "next album" may be stored in the storage unit 112 in advance and the announced sound data may be played back at the time of switching the artist's names or the album title.

In this case, even when the artist-name sound data or the album-title sound data are not provided, the switching of the artist's names or the switching of the album title can be notified to the user.

At the time of switching the track as well as at the time of switching the artist's names or switching the album title, the music title of the next track may be announced.

In this case, the relevant information may include music-title sound data for announcing the music title and the character-sound converter may create the music-title sound data by converting the music title included in the relevant information into a sound.

In the climax search mode, the music-title sound data may be played back instead of playing back the climax part of the track. Not limited to the climax search mode, when the tracks are sequentially played back according to a play list in the normal playback mode, the corresponding announced sound data may be played back at the time of switching the artist's names or switching the album title. The same is true in the second embodiment.

6-3. Other Embodiment 3

In the first embodiment, as shown in FIG. 15, the climax part is repeatedly played back in the climax search mode, so that the climax playback of the entire tracks of the album is not ended before the playback of the announced sound data (Effect2) is ended.

Figure 38A:
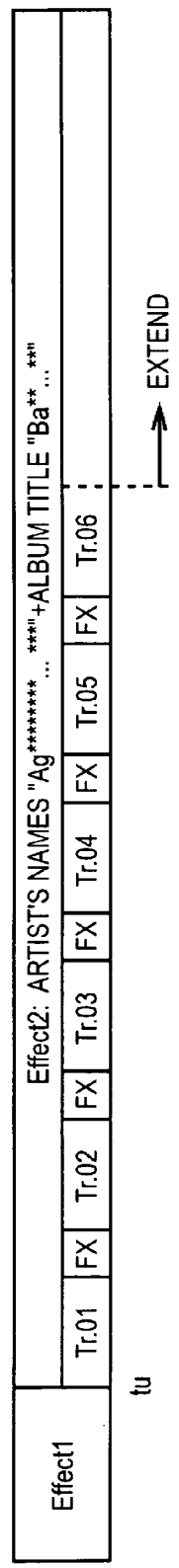
FIGS. 38A and 38B are timing diagrams illustrating the playback control according to another embodiment of the invention.

Not limited to this, as shown in FIG. 38A, when the end of the climax part of the final track in the album is played back in the course of playing back the announced sound data, the next part of the climax part of the final track may be continuously played back until the playback of the announced sound data is ended.

Not limited to this, one of the tracks grouped into the album corresponding to the announced sound data may be repeatedly played back from the start to the end of the playback of the announced sound data.

For example, when an artist's name is switched to an album title, the selection unit 114 of the portable playback apparatus 100 selects the track having the greatest number of playback times out of the tracks grouped into the album title. Then, the playback unit 115 announces the artist's names and the album title and plays back the track having the greatest number of playback times selected by the selection unit 114 until the announcement is ended.

The track selected by the selection unit 114 is not limited to the track having the greatest number of playback times, but for example, may be a track specified as a representative music piece of the album in the relevant information or a track randomly selected from the tracks of the album. The track may be a track played back the latest out of the tracks of the album.

The number of tracks selected by the selection unit 114 from the album may be one or more (for example, a predetermined number). When plural tracks are selected, for example, the tracks may be sequentially selected from the track having the greatest number of playback times or in the order of tracks of which the playback date goes to the past. The same is true in the second embodiment.

6-4. Other Embodiment 4

In the first embodiment, as shown in FIG. 15, at the time of switching the album title, the sound effect data (Effect1) for notifying the switching is played back and then the playback of the climax part of the track grouped into the next album title is started.

Figure 38B:
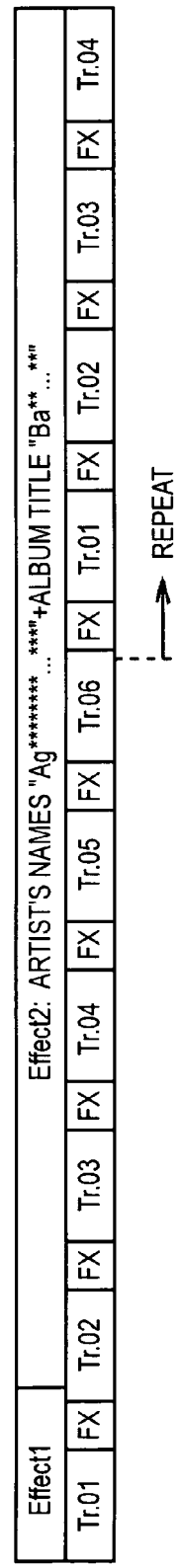

Not limited to this, for example, as shown in FIG. 38B, the playback of the climax part of the track may be started at the same time as the playback of the sound effect data (Effect1). The same is true in the second embodiment.

6-5. Other Embodiment 5

In the first embodiment, the portable playback apparatus 100 groups the music data in the order of units of initial, artist's names, and album title. The invention is not limited to this, but the music data may be grouped into various other groups (units) using the relevant information of the music data.

For example, the music data may be grouped in the order of genre, artist's names, and album title, may be grouped into only the album title, and may be grouped in the order of album sale year and album title.

The sort of the groups may be changed. For example, the tracks grouped into the album titles may be sorted in the alphabet order of the music titles or in the order of decreasing the number of playback times, not in the track number order.

By reflecting various combinations of group and sort in the relevant information database Db, the portable playback apparatus 100 can make a search on the basis of the combinations.

Not limited to this, plural types of combination patterns of group and sort may be stored in the storage unit 112 of the portable playback apparatus 100 in advance and the search may be made using the combination pattern selected therefrom.

Figure 39:
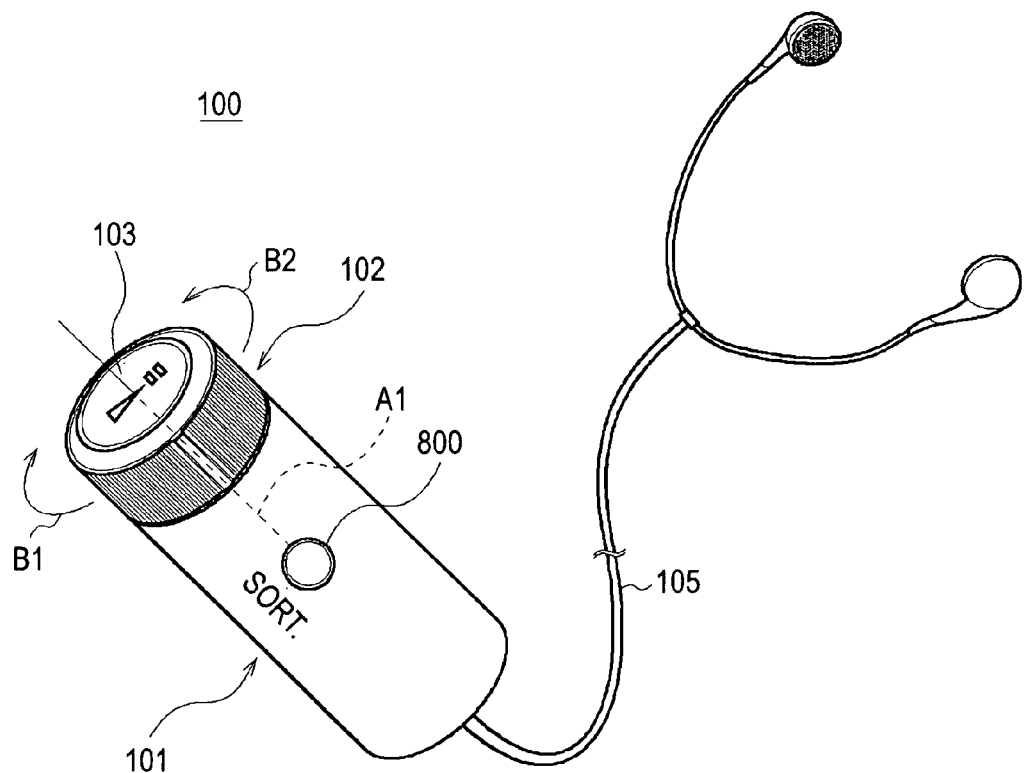
FIG. 39 is a diagram schematically illustrating the outer configuration of a portable playback apparatus according to another embodiment of the invention.

In this case, for example, as shown in FIG. 39, a switch button 800 for switching the combination pattern may be particularly provided in the chassis 101 of the portable playback apparatus 100 and the combination pattern may be switched whenever the switch button 800 is pressed.

6-6. Other Embodiment 6

In the first embodiment, as shown in FIG. 11, when the climax search mode is changed to the normal playback mode, the track of which the climax part is played back in the climax search mode is normally played back subsequent to the climax part in playback.

Not limited to this, when it is changed to the normal playback mode, the playback of the track of which the climax part is played back may be ended once, the sound effect data for notifying the change to the normal playback mode may be played back, and then the track of which the climax part is played back may be played back again from the head position thereof.

6-7. Other Embodiment 7

In the first embodiment, when the rotational operation unit 102 is rotationally operated and the rotational operation unit 102 is not returned to the reference position within the wait time specified by the search_dly, the rotation is accepted as an operation relating to the sound search mode.

Not limited to this, for example, when the rotational operation unit 102 is returned to the reference position within the wait time, it may be accepted as a music play (or music return) operation.

For example, in the portable playback apparatus 100, it is assumed that the rotational operation unit 102 rotates by a predetermined amount (for example, 45 degree or more) in the + direction and is returned to the reference position within the wait time in the normal playback mode. Then, the portable playback apparatus 100 switches the selected music data to the next music data (that is, selects the next track).

Accordingly, the music play (or music return) operation can be realized by only the rotating operation of the rotational operation unit 102.

6-8. Other Embodiment 8

In the first embodiment, the amount of rotation of the rotational operation unit 102 is expressed by the 14-stepped parameter. The invention is not limited to this, but the amount of rotation may be finely expressed by the 15-stepped or more parameter or the amount of rotation may be roughly expressed by the 13-stepped or less parameter.

In the first embodiment, the climax search mode, the artist search mode, and the initial search mode are provided which are switched depending on the range of the parameter. Not limited to this, for example, only the climax search mode and the artist search mode may be provided, or a particular album search mode may be provided.

Here, for example, when the parameter is in the range of "6" to "9", it is assumed that the album search mode is set. In the album search mode, the selection unit 114 sequentially selects the album titles. The playback unit 115 plays back the album-title sound at a corresponding to the album title selected by the selection unit 114.

The playback unit 115 may play back the climax parts of the tracks grouped into the album title selected by the selection unit 114 at an interval shorter than that in the climax search mode. The playback unit 115 may play back the representative track of the album. Several music pieces may be selected in the order of decreasing the number of playback times from the album title and the climax parts of the tracks corresponding to the music pieces may be played back. The same is true in the second embodiment.

In the artist search mode, the playback unit 115 may play back the climax parts of the tracks grouped into the artist selected by the selection unit 114 at an interval shorter than that in the album search mode.

In this case, the playback unit 115 may select several representative music pieces from the albums and may play back the climax parts of the tracks corresponding to the music pieces. Several music pieces may be selected in the order of decreasing the number of playback times from the album and the climax parts of the tracks corresponding to the music pieces may be played back.

6-9. Other Embodiment 9

In the first embodiment, as shown in FIG. 5, the search_fx_volume as a set value for adjusting the playback volume of the sound effect data is valid only in the climax search mode. Not limited to this, the search_fx_volume may be valid in the artist search mode and the initial search mode.

In this case, for example, as the parameter increases in the range of "1" to "13", the playback volume increases.

Set values other than the above-mentioned set value may be stored in the storage unit 112. For example, the set value (referred to as "search_fx_tune) representing the tune height of the sound effect data may be stored. The search_fx_tune is set so that the tune of the sound effect data increases as the parameter increases (that is, the search speed increases).

The playback unit 115 plays back the sound effect data with the tune height specified by the search_fx_tune.

The set value (referred to as "search_play_speed") representing the playback speed of the announced sound data may be stored. The search_play_speed is set so that the playback speed of the announced sound data increases as the parameter increases.

The playback unit 115 plays back the announced sound data at the speed specified by the search_play_speed. In this case, by reducing the silent part of the announced sound data, the playback speed may be changed. Plural pieces of announced sound data having different reading speeds may be prepared in advance and the playback speed may be changed by playing back the announced sound data corresponding to the speed specified by the search_play_speed.

The set value (referred to as "search_play_start_time") representing the playback start position of the climax part may be stored. The search_play_start_time is set so that the playback start position of the climax part is shifted backward as the parameter increases.

The playback unit 115 shifts the playback start position of the climax part from the climax start position included in the relevant information by the time specified by the search_play_start_time and plays back the climax part.

By shifting the playback start position of the climax part backward, the important part (for example, vocal part) of the climax part can be surely played back even when the playback time of the climax part is shortened.

6-10. Other Embodiment 10

In the fourth embodiment, the knob icon Oi is displayed on the display unit 502. As shown in FIG. 40, a number representing the mode may be further displayed in the knob icon Oi.

Specifically, for example, in the normal playback mode, number "0" is displayed in the knob icon Oi. In the image search mode, number "1" is displayed. In the shooting date search mode, number "2" is displayed. In the shooting month search mode, number "3" is displayed. In the shooting year search mode, number "4" is displayed.

Accordingly, it is possible to allow the user to easily recognize the current mode and the changed mode.

6-11. Other Embodiment 11

In the first embodiment, the climax part of a track is mixed with announced sound data and played back. Not limited to this, for example, the climax part of the track may be played back from the left channel of a stereo sound and the announced sound data may be played back from the right channel. The same is true in the second embodiment.

6-12. Other Embodiment 12

In the first to fifth embodiments, the rotational operation unit 102 as an operation device, the knob icon Oi as the GUI which can be operated with a touch panel, and the slide bar Sb are used as the operating object which can be displaced in a predetermined range by a user's operation. Not limited to this, various operation devices and GUIs may be used as the operating object, as long as they can be displaced in a predetermined range by the user's operation.

For example, instead of the rotational operation unit 102, a slide bar or an analog stick as the operation device may be provided in the chassis 101 of the portable playback apparatus 100.

6-13. Other Embodiment 13

In the first embodiment, the invention is applied to the portable playback apparatus 100 playing back music data. In the fourth embodiment, the invention is applied to the portable image display apparatus playing back image data. Not limited to these, the invention may be applied to apparatuses searching for various content data (for example, video data or text data). Specifically, the invention can be applied to a game machine, a personal computer, a television set, a video recorder, and the like.

6-14. Other Embodiment 14

The invention is not limited to the first to fifth embodiments and the other embodiments described hitherto, but may be embodied by an embodiment in which all or a part the embodiments are combined or an embodiment in which a part of the embodiments is extracted.

For example, by combining the first embodiment and the fourth embodiment, the search of music data and the search of album jacket images may be synchronized.

Specifically, the function of the portable playback apparatus 100 is added to the portable image display apparatus 500. The portable image display apparatus 500 makes the same sound search as the portable playback apparatus 100 depending on the amount of rotation of the knob icon Oi. The portable image display apparatus 500 displays the jacket image of the album including the music data of which the climax part is played back on the display unit 502 in the climax search mode. At this time, the jacket images of the previous and successive albums may be displayed together.

In the artist search mode, the selected artist's names and the jacket image of the album corresponding to the album title grouped into the artist's names is displayed together. At this time, the jacket images of the albums corresponding to the album titles grouped into the previous and successive artists' names may be displayed. In the initial search mode, the selected initial and the jacket image of the album corresponding to the album title grouped into the initial may be displayed together. At this time, the jacket images of the albums corresponding to the album titles grouped into the previous and successive initials may be displayed.

In this way, when the music data is searched for using the sounds and the images, the information amount is greater than that of the search using only the sounds or only the images, thereby more easily searching for the desired music data. It can be said that the music data can be searched for with the user amused.

The invention is not limited to this configuration, but for example, the portable image display apparatus 500 may be provided with the rotational operation unit 102 of the portable playback apparatus 100.

In addition, by combining the fourth embodiment with Other Embodiment 1, the remote controller RM of Other Embodiment 1 may be used as a remote controller of the portable image display apparatus 500.

The invention can be widely used as audio players having a music data searching function.

The present application contains subject matter related to that disclosed in Japanese Priority Patent Application JP 2008-258887 filed in the Japan Patent Office on Oct. 3, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing, apparatus comprising:
 a storage unit storing content data and first group identification information for identifying first groups in which the content data are arranged in a predetermined unit;
 a parameter output unit outputting a parameter having a value that corresponds solely to an amount of displacement of an operating object in response to an operation on the operating object which can be displaced in a predetermined range by a user's operation;
 a selection unit sequentially selecting the content data stored in the storage unit while the value of the parameter output from the parameter output unit is in a first range of values and sequentially selecting the first groups by sequentially selecting the first group identification information stored in the storage unit while the value of the parameter is in a second range of values;
 a notification unit notifying which content data is selected when the content data are selected by the selection unit and notifying what group is selected when the first groups are selected by the selection unit; and
 a playback unit for outputting the notified content data and first sound data corresponding to a title of the notified content data when the content data are selected by the selection unit and for outputting the notified group and second sound data corresponding to a title of the notified group when the first groups are selected by the selection unit,
 wherein the operating object is a rotatable operation unit, and wherein the parameter output unit outputs a parameter having a value that corresponds solely to an amount of rotation of the operation unit,
 wherein the content data are music data,
 wherein the notification unit notifies what music data is selected by playing back music data when the music data is selected by the selection unit,
 wherein the notification unit notifies what music data is selected by playing back a climax part of the selected music data, and
 wherein the notification unit changes the playback time for the climax part of the selected music data depending on the parameter output from the parameter output unit.

2. The information processing apparatus according to claim 1, wherein the storage unit stores the content data and the first group identification information in a hierarchical structure.

3. The information processing apparatus according to claim 1, wherein the notification unit notifies what group is selected by announcing a first group when the first group is selected by the selection unit.

4. The information processing apparatus according to claim 1, wherein the notification unit plays back the music data selected by the selection unit and plays back sound effect data for notifying the switching of music data to be played back when the music data is switched.

5. The information processing apparatus according to claim 1, wherein the notification unit sequentially plays back the music data belonging to a first group when the first group is selected by the selection unit.

6. The information processing apparatus according to claim 1, wherein the notification unit notifies that a selection target of the selection unit is switched when the parameter is changed from the first range of values to the second range of values and when the parameter is changed from the second range to the first range.

7. The information processing apparatus according to claim 1, wherein the selection unit sequentially selects the music data, from the music data having been selected when the value of the parameter is in the second range of values, belonging to the first group when the parameter is changed from the second range of values to the first range of values.

8. The information processing apparatus according to claim 1, wherein the music data is set in a predetermined order in advance, and wherein the selection unit sequentially selects the music data in the predetermined order.

9. The image processing apparatus according to claim 8, wherein the selection unit selects the first music data after selecting the final music data.

10. The information processing apparatus according to claim 1, further comprising a switching operation unit switching the unit in which the content data are arranged in the first groups.

11. The information processing apparatus according to claim 1, wherein the storage unit stores second group identification information for identifying second groups in which the first groups are arranged in a predetermined unit, wherein the selection unit sequentially selects the second groups by sequentially selecting the second group identification information stored in the storage unit while the value of the parameter output from the parameter output unit is in a third range of values, and wherein the notification unit notifies which group is selected when the second groups are selected by the selection unit.

12. The information processing apparatus according to claim 1, wherein the operation unit is rotatable in one direction and the opposite direction, wherein the value of the parameter output by the parameter output unit is a + valued parameter when the operation unit rotates in the one direction and is a − valued parameter when the operation unit rotates in the opposite direction, and wherein the selection unit inverts the order for selecting the music data and the first groups when the value of the parameter output from the parameter output unit is + and when the value of the parameter is −.

13. An information processing method, comprising:
 using a processor to carry out the following:
 storing in a storage unit content data and first group identification information for identifying first groups in which the content data are arranged in a predetermined unit,
 outputting from a parameter output unit a parameter having a value that corresponds solely to an amount of displacement of an operating object in response to an operation on the operating object which can be displaced in a predetermined range by a user's operation,
 using a selection unit to sequentially select the content data stored in the storage unit while the value of the parameter output from the parameter output unit is in a first range of values and to sequentially select the first groups by sequentially selecting the first group identification information stored in the storage unit while the value of the parameter is in a second range of values, using a notification unit to notify which content data is selected when the content data are selected by the selection unit and to notify what group is selected when the first groups are selected by the selection unit, and outputting from a playback unit the notified content data and first sound data corresponding to a title of the notified content data when the content data are selected by the selection unit, and outputting from the playback unit the notified group and second sound data corresponding to a title of the notified group when the first groups are selected by the selection unit, wherein the operating object is a rotatable operation unit, and wherein the parameter output unit outputs a parameter having a value that corresponds solely to an amount of rotation of the operation unit, wherein the content data are music data, wherein the notification unit notifies what music data is selected by playing back music data when the music data is selected by the selection unit, wherein the notification unit notifies what music data is selected by playing back a climax part of the selected music data, and wherein the notification unit changes the playback time for the climax part of the selected music data depending on the parameter output from the parameter output unit.

14. An information processing system, comprising:
an operation device, including:
an operation unit which can be displaced in a predetermined range by a user's operation,
a parameter output unit outputting a parameter having a value that corresponds solely to an amount of displacement of the operation unit in response to an operation on the operation unit, and
a transmitter transmitting the value of the parameter output from the parameter output unit to the outside; and
an information processing apparatus, including:
a receiver receiving the value of the parameter transmitted from the operation device,
a storage unit storing content data and first group identification information for identifying first groups in which the content data are arranged in a predetermined unit,
a selection unit sequentially selecting the content data stored in the storage unit while the value of the parameter received by the receiver is in a first range of values and sequentially selecting the first groups by sequentially selecting the first group identification information stored in the storage unit while the value of the parameter is in a second range of values,
a notification unit notifying which content data is selected when the content data are selected by the selection unit and notifying what group is selected when the first groups are selected by the selection unit, and
a playback unit for outputting the notified content data and first sound data corresponding to a title of the notified content data when the content data are selected by the selection unit and for outputting the notified group and second sound data corresponding to a title of the notified group when the first groups are selected by the selection unit, wherein the operating object is a rotatable operation unit, and wherein the parameter output unit outputs a parameter having a value that corresponds solely to an amount of rotation of the operation unit, wherein the content data are music data, wherein the notification unit notifies what music data is selected by playing back music data when the music data is selected by the selection unit, wherein the notification unit notifies what music data is selected by playing back a climax part of the selected music data, and wherein the notification unit changes the playback time for the climax part of the selected music data depending on the parameter output from the parameter output unit.

15. A processor encoded with an information processing program for performing an information processing method, the method comprising:

outputting from a parameter output unit a parameter having a value that corresponds solely to an amount of displacement of an operating object in response to an operation on the operating object which can be displaced in a predetermined range by a user's operation;

using a selection unit to sequentially select the content data stored in the storage unit while the value of the parameter output from the parameter output unit is in a first range of values and to sequentially select the first groups by sequentially selecting the first group identification information stored in the storage unit while the value of the parameter is in a second range of values;

using a notification unit to notify which content data is selected when the content data are selected by the selection unit and to notify what group is selected when the first groups are selected by the selection unit; and outputting from a playback unit a the notified content data and first sound data corresponding to a title of the notified content data when the content data are selected by the selection unit, and outputting from the playback unit the notified group and second sound data corresponding to a title of the notified group when the first groups are selected by the selection unit, wherein the operating object is a rotatable operation unit, and wherein the parameter output unit outputs a parameter having a value that corresponds solely to an amount of rotation of the operation unit, wherein the content data are music data, wherein the notification unit notifies what music data is selected by playing back music data when the music data is selected by the selection unit, wherein the notification unit notifies what music data is selected by playing back a climax part of the selected music data, and wherein the notification unit changes the playback time for the climax part of the selected music data depending on the parameter output from the parameter output unit.

* * * * *